United States Patent
Deleverio et al.

(10) Patent No.: US 11,039,031 B2
(45) Date of Patent: Jun. 15, 2021

(54) INFORMATION PROCESSING SYSTEM, INFORMATION PROCESSING METHOD, AND INFORMATION PROCESSING APPARATUS, TO EASILY CREATE A WORKFLOW THAT COORDINATES A PLURALITY OF TARGETS AND A PLURALITY OF PROCESSES

(71) Applicant: KYOCERA Document Solutions Inc., Osaka (JP)

(72) Inventors: Lianney Deleverio, Osaka (JP); Alexander Kenneth Go, Osaka (JP); Manuel Baricuatro, Jr., Osaka (JP); Gestoni Bacalso, Osaka (JP); Gervel Giva, Osaka (JP); Eliot Emerson Uy, Osaka (JP); Dennis Arriola, Osaka (JP); Joard Saquilon, Osaka (JP); Jelousy Saga, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/964,479

(22) PCT Filed: Jan. 25, 2018

(86) PCT No.: PCT/JP2018/002329
§ 371 (c)(1),
(2) Date: Jul. 23, 2020

(87) PCT Pub. No.: WO2019/146045
PCT Pub. Date: Aug. 1, 2019

(65) Prior Publication Data
US 2021/0058528 A1    Feb. 25, 2021

(51) Int. Cl.
*G06F 3/12* (2006.01)
*H04N 1/00* (2006.01)

(52) U.S. Cl.
CPC ..... *H04N 1/00949* (2013.01); *H04N 1/00411* (2013.01); *H04N 1/00413* (2013.01)

(58) Field of Classification Search
None
See application file for complete search history.

(56) References Cited

U.S. PATENT DOCUMENTS

2009/0019271 A1* 1/2009 Kawakami .......... G06Q 10/06
                                                         712/227
2010/0325610 A1   12/2010 Matsui ..................... 717/107
(Continued)

FOREIGN PATENT DOCUMENTS

JP    2011-008358 A    1/2011
JP    2014-179952 A    9/2014
JP    2015-060247 A    3/2015

Primary Examiner — Henok Shiferaw
(74) Attorney, Agent, or Firm — Stein IP, LLC

(57) ABSTRACT

This information processing system (100) includes an information processing device (1) and a display input device (2). The display input device (2) receives settings of a first target, first processing, a second target, and second processing. The information processing device (1) takes, as a condition, the execution of the set first processing by using the set first target, and, when the condition is satisfied, generates a workflow (5) for executing the set second processing by using the set second target.

15 Claims, 31 Drawing Sheets

(56) References Cited

U.S. PATENT DOCUMENTS

| | | | |
|---|---|---|---|
| 2011/0007356 A1* | 1/2011 | Matsuura | H04N 1/00244 |
| | | | 358/1.15 |
| 2011/0296439 A1* | 12/2011 | Kozaki | H04N 1/00938 |
| | | | 719/318 |
| 2014/0280445 A1 | 9/2014 | Hori | 709/201 |
| 2015/0077776 A1 | 3/2015 | Hori | 358/1.13 |
| 2017/0064120 A1* | 3/2017 | Chung | G06F 3/1275 |
| 2018/0359386 A1* | 12/2018 | Hayashi | G06F 3/1206 |
| 2018/0374007 A1* | 12/2018 | Hamada | H04N 1/32117 |
| 2019/0361712 A1* | 11/2019 | Nasu | G06F 9/466 |

* cited by examiner (Example1)   Address to Ebox (Example2)   Go Drive_Address_ID_Name_yymmdd (Example3)   GD_Ad_¥ID|yyyy/mm/dd (Example4)   GDriveandEB=Name¥mm/dd (Example5)   GDrive+TDrive+MFP=AD+EB-Name-yyyy/mm/dd (Example) When scanning using a printer, add it to network storage.
MFP is TASKbeta 307ci-10.191.21.193.
Network storage is Go Drive.

INFORMATION PROCESSING SYSTEM, INFORMATION PROCESSING METHOD, AND INFORMATION PROCESSING APPARATUS, TO EASILY CREATE A WORKFLOW THAT COORDINATES A PLURALITY OF TARGETS AND A PLURALITY OF PROCESSES

CROSS-REFERENCE TO RELATED APPLICATIONS

This application is a national stage of International Application No. PCT/JP2018/002329, filed Jan. 25, 2018, in the Japanese Patent Office, the disclosure of which is incorporated herein by reference.

TECHNICAL FIELD

The present invention relates to information processing systems, information processing methods, and information processing apparatuses used for clerical processing at offices.

BACKGROUND ART

Software often incorporates a plurality of functions (components). It is often allowed to select desired components out of one software package to build one piece of software. One example of technology that allows the building of component-based software is disclosed in Patent Document 1 identified below.

Specifically, Patent Document 1 discloses an information processing apparatus in which: for each component program that is created in advance as a program component, a set of function information indicating the function of the component program and the belonging group of the function and group information indicating belonging groups compatible with the component program is stored; after an icon to which one set out of respective sets for component programs is displayed on a display screen, sets having the function information on the function belonging to the belonging group indicated by the group information included in the one set that is set are searched for; set information indicating the found sets is displayed in a list on the display screen; an icon corresponding to the belonging group indicated by the group information included in one set is displayed as a subsequent icon; out of the set information displayed in a list on the display screen, one piece of set information is selected based on a selection instruction from a user; the set indicated by the selected piece of set information is set as the subsequent icon; and sets respectively set for icons are output as setting information for coupling together the component programs respectively corresponding to the sets. With this configuration, an environment for the building of component-based software is proposed (see Patent Document 1; claim 1, paragraph [0006], etc.).

CITATION LIST

Patent Literature

Patent Document 1: Japanese Unexamined Patent Application published as No. 2011-008358.

SUMMARY OF INVENTION

Technical Problem

At corporate and public offices, various kinds of work (clerical processing) are performed. There are kinds of work that involve a routine sequence of tasks. For example, one process is often followed by another which is supposed to be done next. A corporate or public office may have its routine procedure (sequence) of tasks (processing) with respect to creation, management, storage, and disposal of documents.

For example, consider a case where, after a job is executed on an image forming apparatus, the image data used in the job is stored on a cloud storage. In this case, the procedure of tasks is as follows: (1) set a job on the image forming apparatus; (2) execute the job on the image forming apparatus; (3) on completion of the job, start up software for using the cloud storage on a computer; and (4) operate the software to store the image data used in the job on the cloud storage. The person in charge follows the procedure to perform one process after the other.

For another example, consider a case where, after one process is performed by use of one service, another process is performed by use of a different service. In this case, the procedure of tasks is as follows: (1) start up software for using a first service; (2) perform a process by using the first service; (3) start up software for using a second service; and (4) perform another process by using the second service. The person in charge follows the procedure to perform one process after the other.

When performing tasks through a set procedure, a person in charge needs to perform the tasks (processes) involved in the procedure one by one. Achieving automatic coordination among an image forming apparatus, a computer, software, and services requires specialized expertise. Thus, a conventional problem is that it is difficult to attain coordination among different devices (such as an image forming apparatus and a computer), different pieces of software, and different services.

The technology disclosed in Patent Document 1 is directed to selecting components incorporated in one software package to build a piece of software one likes, and cannot cope with the above problem.

In view of the conventional problem mentioned above, an object of the present invention is to facilitate the creation of a program for achieving coordination among processes even when they are performed by use of different processing targets (devices, software packages, services), and thereby to increase the efficiency of clerical processing.

Solution to Problem

According to the present invention, an information processing system includes an information processing apparatus and a display input apparatus communicating with the information processing apparatus. The display input apparatus accepts setting of a first target, a first process, a second target, and a second process. The display input apparatus notifies the information processing apparatus of the first target, the first process, the second target, and the second process that are set. The information processing apparatus generates a workflow which is a program for performing, when the condition that the notified first process has been performed using the notified first target is met, the notified second process using the notified second target. The information processing apparatus stores the generated workflow at a prescribed storage location in a non-volatile manner.

Advantageous Effects of Invention

According to the present invention, it is possible to easily create a workflow that coordinates a plurality of targets and a plurality of processes even when different targets (devices, software packages, and services) are used for the processes.

DESCRIPTION OF EMBODIMENTS

Figure 55:
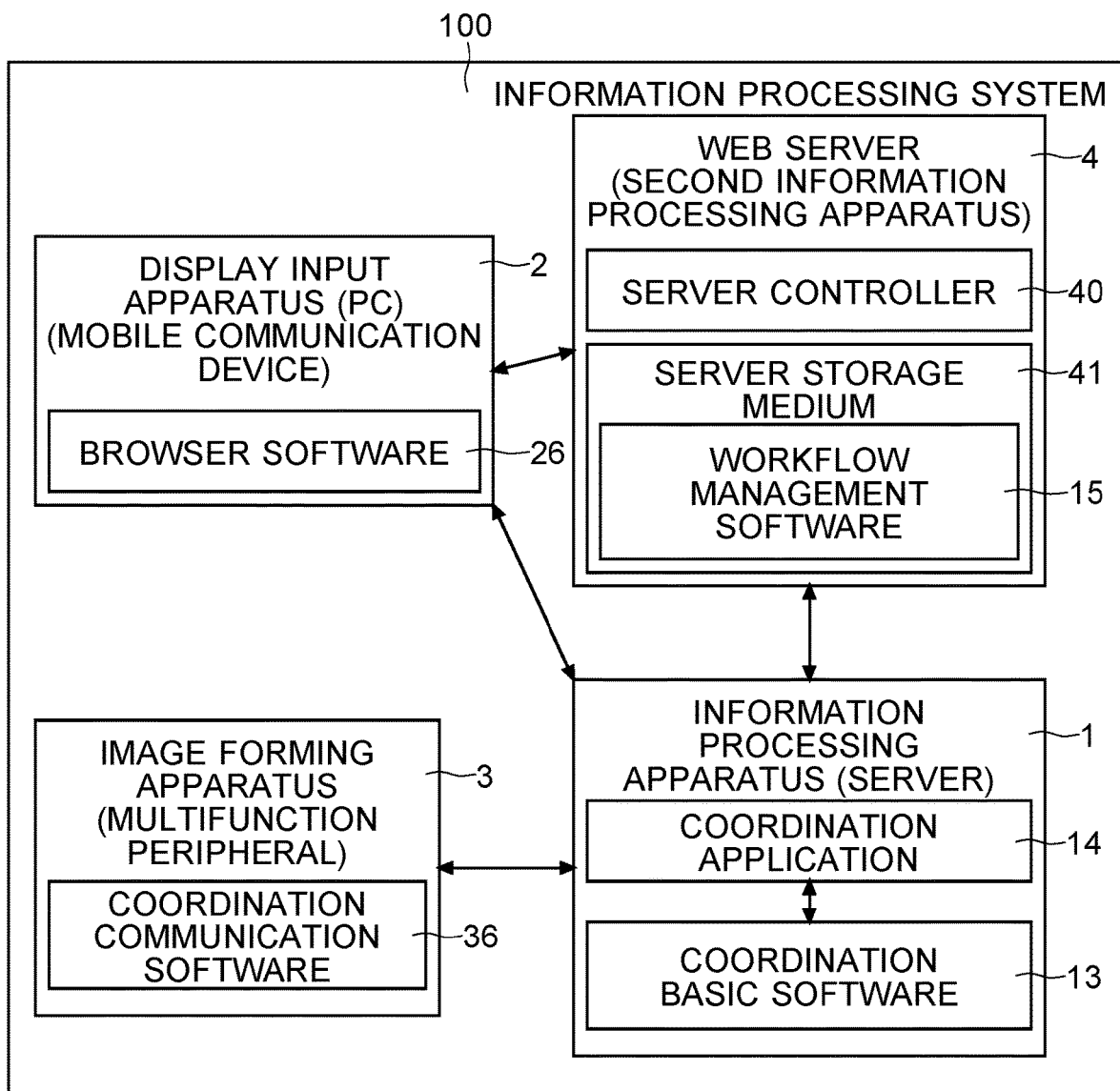
FIG. 55 is a diagram showing one example of a second modified example.

Hereinafter, with reference to FIGS. 1 to 55, an embodiment of the present invention will be described. It should however be noted that all the features described in connection with the embodiment in terms of structures, arrangements, and the like are merely examples and are not meant to limit the scope of the invention.

(Information Processing System 100)

Figure 1:
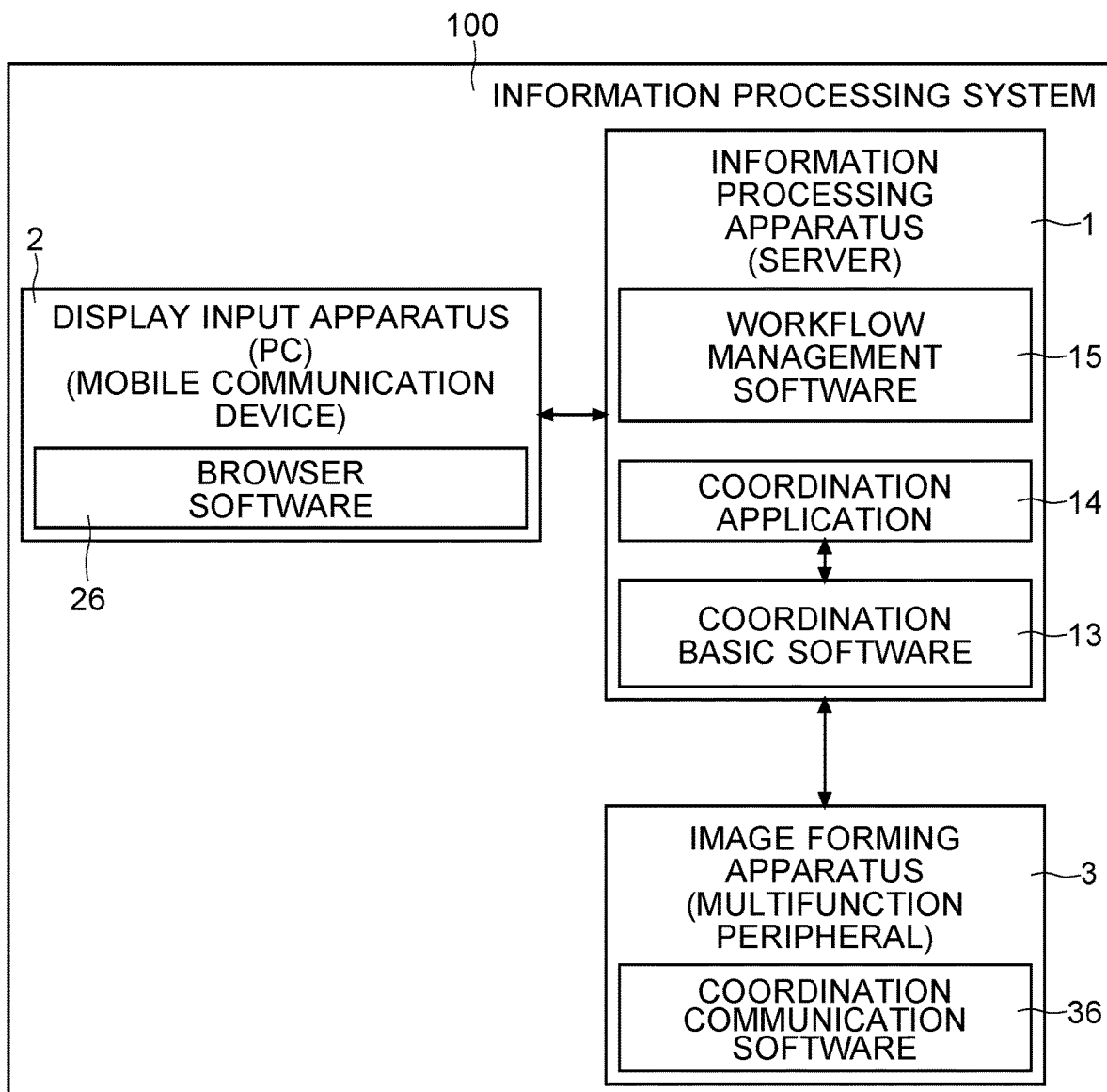
FIG. 1 is a diagram showing one example of an information processing system according to an embodiment.

With reference to FIG. 1, one example of an information processing system 100 according to the embodiment will be described. FIG. 1 is a diagram showing one example of the information processing system 100 according to the embodiment.

As shown in FIG. 1, the information processing system 100 includes an information processing apparatus 1 and a display input apparatus 2. The information processing system 100 may include an image forming apparatus 3. For example, the information processing apparatus 1, the display input apparatus 2, and the image forming apparatus 3 are provided within the same local network. There may be a plurality of display input apparatuses 2, a plurality of information processing apparatuses 1, and a plurality of image forming apparatuses 3. For the sake of convenience, one of each kind of apparatus is shown in FIG. 1. The display input apparatus 2, the information processing apparatus 1, and the image forming apparatus 3 can communicate with each other.

The information processing apparatus 1 is, for example, a server. The information processing apparatus 1 may be any computer other than a server. The information processing apparatus 1 stores data. The information processing apparatus 1 also transmits data to the display input apparatus 2 in response to requests from the display input apparatus 2.

The display input apparatus 2 is, for example, a PC. The display input apparatus 2 may be a mobile communication device. The mobile communication device is, for example, a smartphone or a tablet computer. The display input apparatus 2 displays a screen. The display input apparatus 2 also accepts operations.

The image forming apparatus 3 is, for example, a multifunction peripheral. The image forming apparatus 3 may be any image forming apparatus 3 other than a multifunction peripheral.

(Information Processing Apparatus 1)

Figure 2:
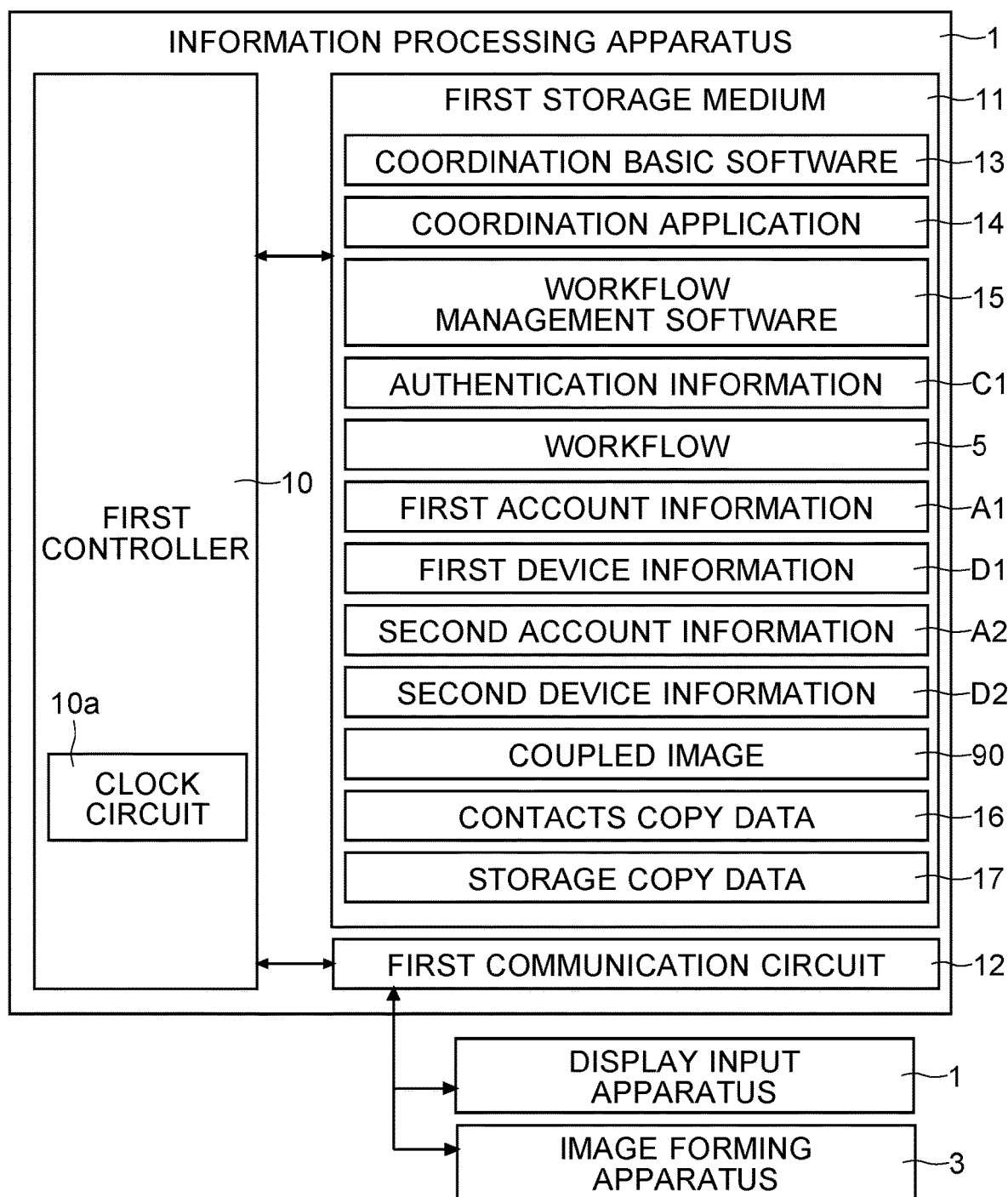
FIG. 2 is a diagram showing one example of an information processing apparatus according to the embodiment.

Next, with reference to FIG. 2, one example of the information processing apparatus 1 according to the embodiment will be described. FIG. 2 is a diagram showing one example of the information processing apparatus 1 according to the embodiment.

The information processing apparatus 1 includes a first controller 10, a first storage medium 11, and a first communication circuit 12. The first controller 10 is a control circuit board including a CPU. The first controller 10 performs calculation and processing. The first controller 10 controls the operation of the information processing apparatus 1. The first storage medium 11 includes a RAM, a ROM, and a storage (HDD). The first storage medium 11 can store data in a non-volatile manner. The first communication circuit 12 communicates with the display input apparatus 2 and the image forming apparatus 3 via a network. The first controller 10 makes the first storage medium 11 store data received by the first communication circuit 12 from the display input apparatus 2. The first controller 10 makes the first communication circuit 12 transmit data and information to a second communication circuit 24 (the display input apparatus 2) and to a third communication circuit 35 (the image forming apparatus 3).

(Display Input Apparatus 2)

Figure 3:
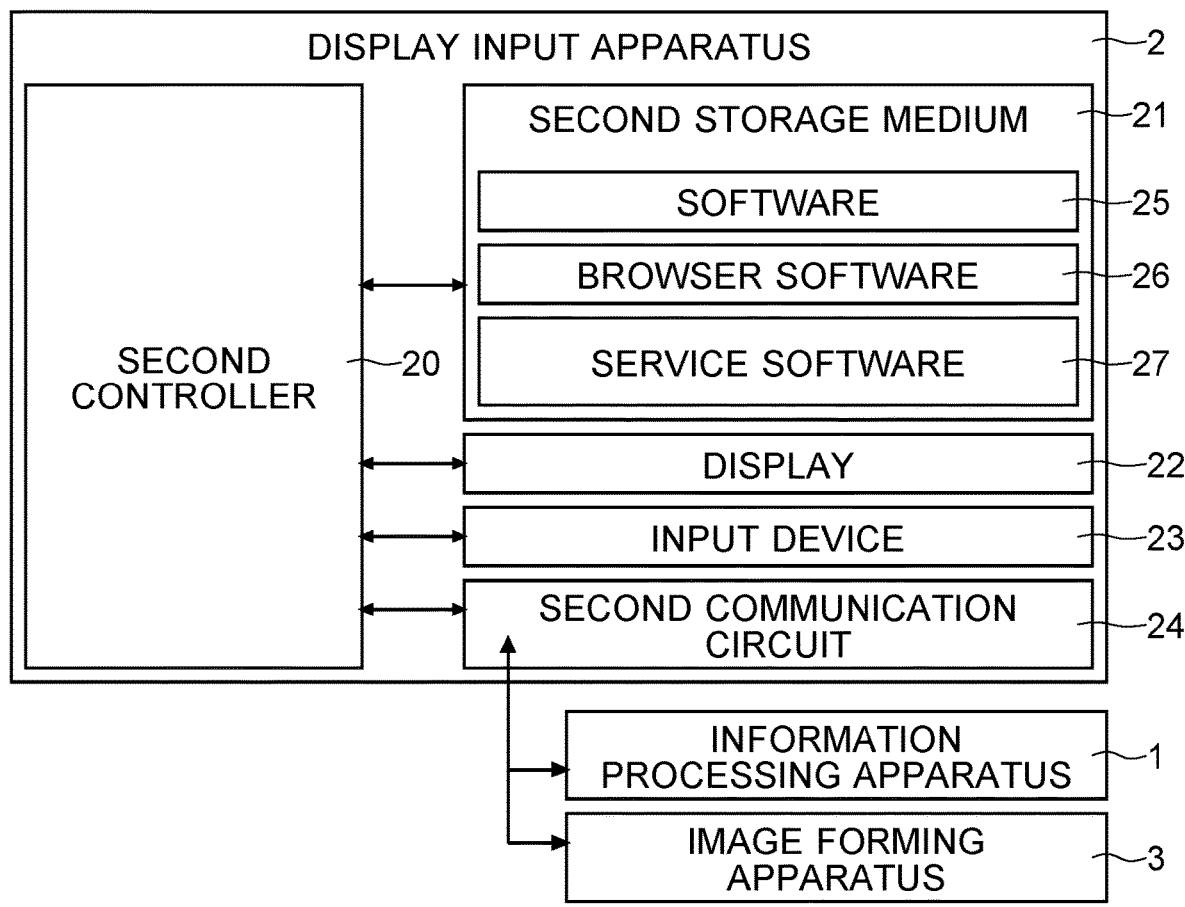
FIG. 3 is a diagram showing one example of a display input device according to the embodiment.

Next, with reference to FIG. 3, one example of the display input apparatus 2 according to the embodiment will be described. FIG. 3 is a diagram showing one example of the display input apparatus 2 according to the embodiment.

The display input apparatus 2 includes a second controller 20, a second storage medium 21, a display 22, an input device 23, and a second communication circuit 24.

The second controller 20 is an electronic circuit board including a plurality of circuits and circuit elements. The second controller 20 includes, for example, a CPU and a circuit for image processing. The second storage medium 21 stores an OS, data, programs, and various kinds of software in a non-volatile manner. The second storage medium 21 includes a flash ROM, an HDD, and a RAM. The second controller 20 controls the operation of the display input apparatus 2 based on the OS, data, programs, and various kinds of software. The second controller 20 controls different parts of the display input apparatus 2 in accordance with the content stored in the second storage medium 21.

The second controller 20 makes the display 22 display screens and information. The display 22 includes, for example, a liquid crystal panel or an organic EL panel. The input device 23 accepts user operations. The input device 23 is, for example, a keyboard and a mouse. The input device 23 may be a touch panel. Based on the output of the input device 23, the second controller 20 recognizes the content of operations. The second communication circuit 24 includes a communication circuit and communication software. The second communication circuit 24 communicates with the information processing apparatus 1 and the image forming apparatus 3 in response to instructions from the second controller 20. The second communication circuit 24 can communicate with those apparatuses by wireless or wired communication.

In the second storage medium 21 of the display input apparatus 2, software 25 is installed. The installed software 25 includes, for example, word-processing software, spreadsheet software, image data editing software, and OCR software. A user starts up the software 25. The user can create and edit a document file (data) using the input device 23.

In the second storage medium 21, browser software 26 (a browser application) is also installed. While the browser software 26 is running, the second controller 20 performs processing based on the browser software 26. For example, the second controller 20 makes the display 22 display a web site.

In the second storage medium 21, service software 27 (an application) for using a service can also be installed. Here, the term "service" means an on-line service via a network (the Internet). Available services include, for example, a network storage service. There are also on-line services that can be used from the browser software 26 without the use of a dedicated application.

(Image Forming Apparatus 3)

Figure 4:
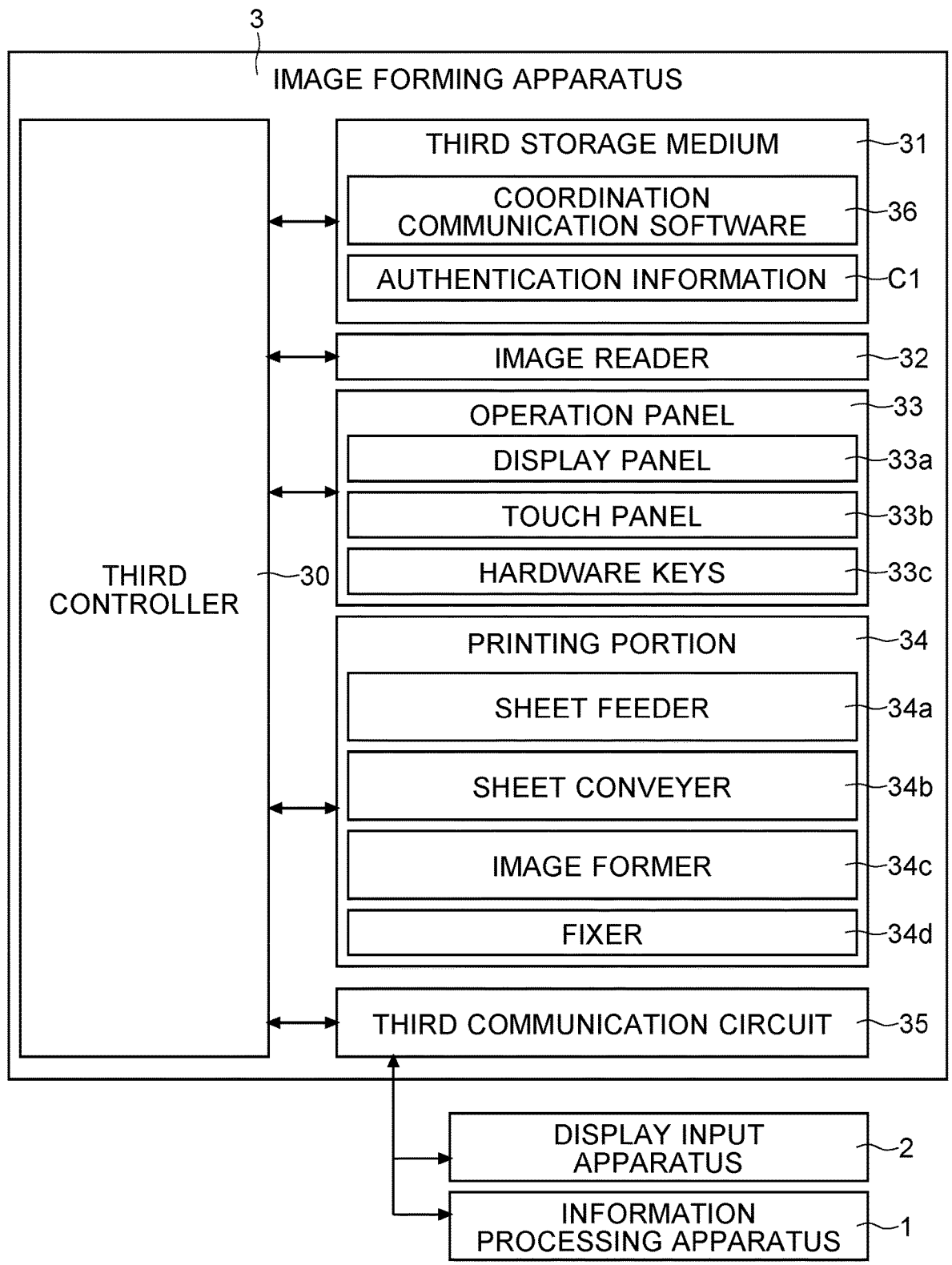
FIG. 4 is a diagram showing one example of an image forming apparatus according to the embodiment.

With reference to FIG. 4, one example of the image forming apparatus 3 according to the embodiment will be described. FIG. 4 is a diagram showing one example of the image forming apparatus 3 according to the embodiment.

As shown in FIG. 4, the image forming apparatus 3 includes a third controller 30, a third storage medium 31, an image reader 32, an operation panel 33, a printing portion 34, and a third communication circuit 35. The third controller 30 controls the operation of the image forming apparatus 3. The third controller 30 is a circuit board including a CPU and an image processing circuit. The third controller 30 performs control and calculation related to the image forming apparatus 3. The third controller 30 controls different parts of the image forming apparatus 3 and performs different kinds of calculation processing based on programs and data stored in the third storage medium 31. The third storage medium 31 includes a ROM, a RAM, and a storage (HDD). The third storage medium 31 stores setting data for controlling the image forming apparatus 3, image data, programs for control, and files.

During a job involving document reading such as a copy job, the third controller 30 makes the image reader 32 read a document. The image reader 32 generates image data of the document. For document reading and image data generation, the image reader 32 includes a light source (lamp), a lens, an image sensor (line sensor), and an A/D conversion circuit.

The operation panel 33 includes a display panel 33a, a touch panel 33b, and hardware keys 33c. The display panel 33a displays screens and images. The third controller 30 controls display on the display panel 33a. The third controller 30 makes the display panel 33a display operation images used for setting a job. The operation images are, for example, buttons and keys. The touch panel 33b accepts user operations. The touch panel 33b is provided on the top face of the display panel 33a. The touch panel 33b recognizes the touched position. Based on the output from the touch panel 33b, the third controller 30 recognizes the operated operation image. Based on the operated operation image, the third controller 30 recognizes the content of user operations. Also the hardware keys 33c accept user operations.

The image forming apparatus 3 (third storage medium 31) stores authentication information C1. The authentication information C1 is set in advance. The authentication information C1 includes the names of users authorized to use the image forming apparatus 3 and their login passwords. The operation panel 33 accepts entry of a user name and a login password. The third controller 30 checks whether the user has authority for use based on the entered information. Specifically, the third controller 30 checks the entered information against the authentication information C1. When the entered information matches the authentication information C1 of an authorized user, the third controller 30 judges that the user has authority for use. The third controller 30 recognizes the authenticated user.

The printing portion 34 includes a sheet feeder 34a, a sheet conveyer 34b, an image former 34c, and a fixer 34d. The third controller 30 controls the operation of these parts. The third controller 30 controls sheet feeding, sheet conveyance, toner image formation, transfer, and fixing. During a printing job, the third controller 30 makes the sheet feeder 34a feed one sheet after another. The third controller 30 makes the sheet conveyer 34b convey the fed sheet. The third controller 30 makes the image former 34c form a toner image based on print image data. The third controller 30 makes the image former 34c transfer the toner image to the conveyed sheet. The third controller 30 makes the fixer 34d fix the transferred toner image to the sheet. The third controller 30 makes the sheet conveyer 34b discharge the sheet after fixing out of the apparatus.

The third communication circuit 35 is communicably connected with a network. The third communication circuit 35 includes communication hardware (various types of sockets and communication circuits) and communication software. The communication portion can communicate with the display input apparatus 2 and the information processing apparatus 1 via the network.

(Coordination of the Image Forming Apparatus 3 with the Outside)

Next, with reference to FIG. 1, one example of coordination of the image forming apparatus 3 with the outside according to the embodiment will be described.

The information processing apparatus 1 functions as a server. The information processing apparatuses 1 functions as a platform for coordination between an external service and the image forming apparatus 3. For the purpose of coordination between the image forming apparatus 3 and an external service or a computer, the first storage medium 11 in the information processing apparatus 1 stores coordination basic software 13. The coordination basic software 13 provides a basis for coordination between the image forming apparatus 3 and the external service.

The first storage medium 11 in the information processing apparatus 1 stores a coordination application 14. The coordination application 14 operates based on the coordination basic software 13. Hierarchically, the coordination basic software 13 is in a lower layer. Being in a layer higher than the coordination basic software 13, the coordination application 14 needs it to operate.

The third storage medium 31 in the image forming apparatus 3 stores coordination communication software 36. The coordination communication software 36 is software for communicating with the information processing apparatus 1. The coordination communication software 36 is software for coordination with an external service via the information processing apparatus 1.

Now, one example of coordination between an external service and the image forming apparatus 3 will be described. A case where a cloud service is used will be taken as an example. Described first will be an example where data stored on the cloud service is read and the read data is printed. When the operation panel 33 accepts access to the cloud service, the image forming apparatus 3 (third controller 30), using the coordination communication software 36, makes the third communication circuit 35 transmit to the information processing apparatus 1 (first communication circuit 12) an access request to the cloud service.

The information processing apparatus 1 vicariously accesses the cloud service. The information processing apparatus 1 (first storage medium 11) stores the coordination application 14 for vicariously accessing the cloud service. Based on the coordination application 14, the information processing apparatus 1 (first controller 10) makes the first communication circuit 12 acquire the names of stored files and folders from the cloud service. The first controller 10 makes the first communication circuit 12 transmit the acquired file names to the image forming apparatus 3 (third communication circuit 35). The image forming apparatus 3 (third controller 30) makes the display panel 33a display the received file name.

The operation panel 33 accepts selection of a file to be acquired. The image forming apparatus 3 (third controller 30), using the coordination communication software 36, makes the third communication circuit 35 transmit to the information processing apparatus 1 (first communication circuit 12) an acquisition request for the selected file. Based on the coordination application 14, the information processing apparatus 1 (first controller 10) makes the first communication circuit 12 acquire the selected file. The first controller 10 makes the first communication circuit 12 transmit the acquired file to the image forming apparatus 3 (third communication circuit 35). The third controller 30 makes the printing portion 34 perform printing based on the received file.

The image forming apparatus 3 (third controller 30), using the coordination communication software 36, transmits an instruction given on the operation panel 33 in a format that can be understood by the information processing apparatus 1. The information processing apparatus 1 accesses the external service using the coordination basic software 13 and the coordination application 14. The information processing apparatus 1, using the coordination basic software 13 and the coordination application 14, transmits data and instructions to the image forming apparatus 3 in a format that can be understood by the image forming apparatus 3. The coordination basic software 13 (platform), the coordination application 14, and the coordination communication software 36 mediate (translate) communication between the image forming apparatus 3 and the information processing apparatus 1 and absorb differences in OS and hardware.

By use of the information processing apparatus 1, the coordination basic software 13 (platform), the coordination application 14, and the coordination communication software 36, the image forming apparatus 3 can be additionally provided with functions other than its standard functions. The coordination application 14 that conforms to the coordination basic software 13 simply needs to be added to the information processing apparatus 1. There is no interference with the software stored in the image forming apparatus 3. Functions can be easily added to the image forming apparatus 3. For example, it will then be possible to store on the cloud service the image data obtained through scanning by the image forming apparatus 3. For another example, it will then be possible to obtain, using an external OCR service, text data from the image data obtained through scanning by the image forming apparatus 3 and to return the obtained text data to the image forming apparatus 3.

The information processing apparatus 1 can store, as one of the coordination applications 14, workflow management software 15 (see FIG. 2). The workflow management software 15 is application software (an application) for creating, editing, deleting, and managing the operation of a workflow 5. The workflow management software 15 provides a service for creating, editing, deleting, and managing the operation of a workflow 5. Also the workflow management software 15 operates on top of the coordination basic software 13.

Here, the workflow 5 is a program that, when the condition that a first process has been performed using a first target is met, performs a second process using a second target. In other words, a workflow 5 is a program that, when a process taken as an if-condition has been performed, performs a predetermined process subsequent to the if-condition.

With a workflow 5, coordination between, for example, the software 25 and the image forming apparatus 3 is possible. Coordination between the software 25 and a service is possible. Coordination between a service and another service is possible. Coordination between a service and the image forming apparatus 3 is possible. Coordination between an image forming apparatus 3 and another image forming apparatus 3 is possible. With a workflow 5, coordination between various devices is possible across different kinds of software, services, and hardware.

(Use of Workflow Management Software 15)

Figure 5:
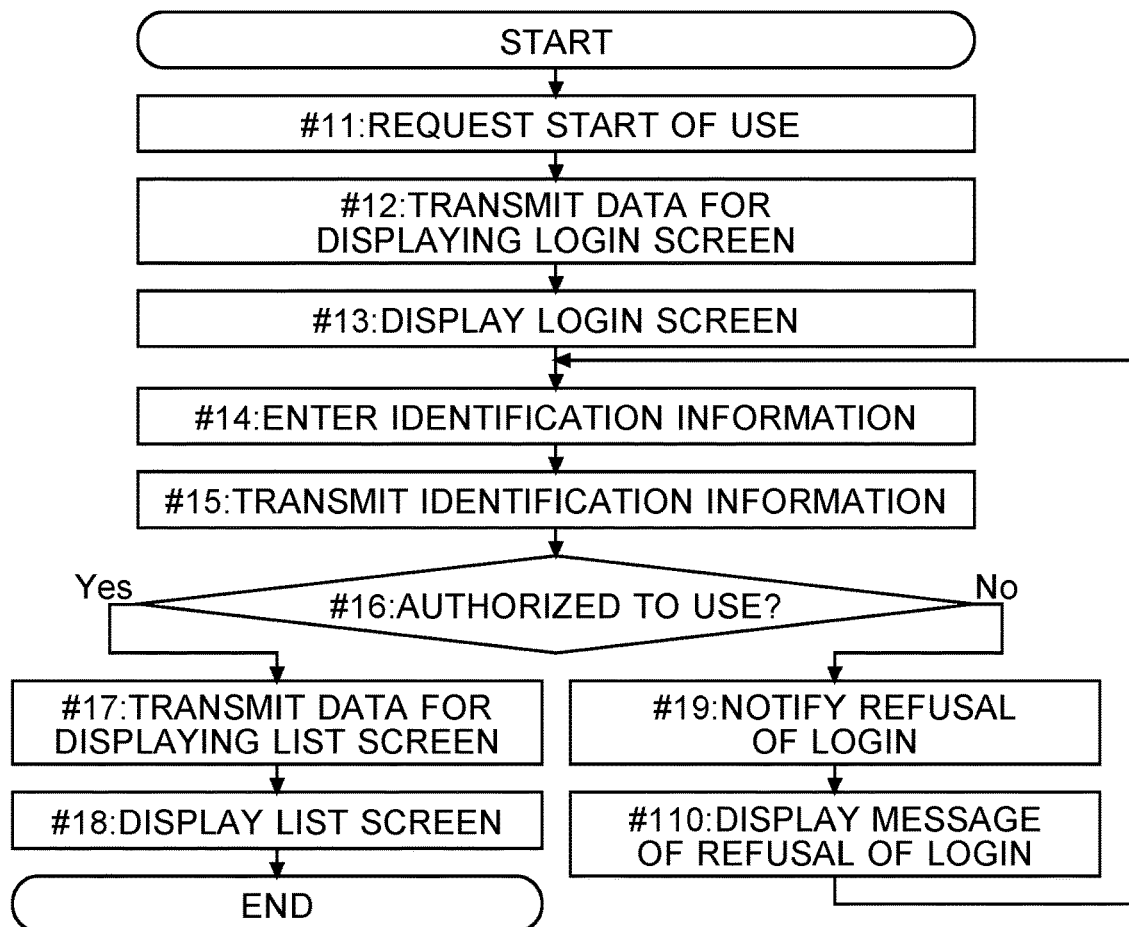
FIG. 5 shows one example of a procedure for logging in to a site for managing a workflow according to the embodiment.
Figure 6:
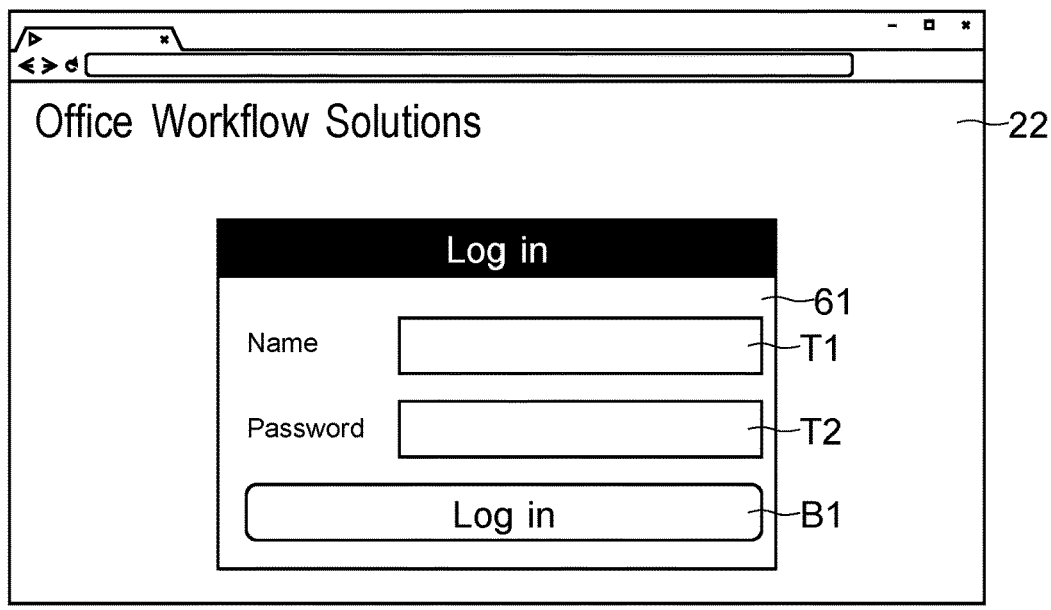
FIG. 6 shows one example of a login screen according to the embodiment.
Figure 7:
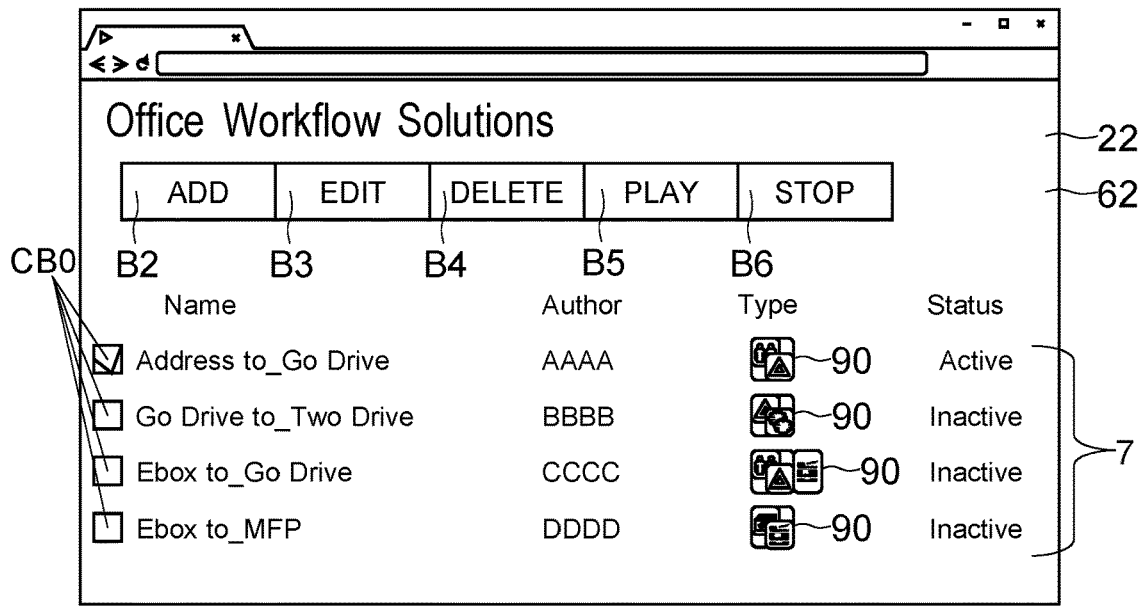
FIG. 7 is a diagram showing one example of a top page according to the embodiment.

Next, with reference to FIGS. 5 and 6, one example of use of the workflow management software 15 according to the embodiment will be described. FIG. 5 shows one example of the procedure of logging in to a site for managing a workflow 5 according to the embodiment. FIG. 6 shows one example of a login screen 61 according to the embodiment. FIG. 7 is a diagram showing one example of a top page 62 according to the embodiment.

A user can create, edit, add, and manage the operation of a workflow 5 using the display input apparatus 2. The display input apparatus 2 can create, edit, add, and set the operation of a workflow 5 using the browser software 26. When creating, editing, adding, or setting the operation of the workflow 5, a user starts up the browser software 26. The user, using the browser software 26, accesses a site for creating, editing, adding, and setting the operation of the workflow 5. The address of the site for the workflow 5 is prescribed.

The procedure in FIG. 5 starts when, after the browser software 26 is started up, access to the site for the workflow 5 with the browser software 26 is started. First, the display input apparatus 2 (second controller 20) makes the second communication circuit 24 transmit a use start request to the information processing apparatus 1 (first communication circuit 12) (step #11). The information processing apparatus 1 (first storage medium 11) stores data for displaying different screens of the site for the workflow 5. On receiving the use start request, the information processing apparatus 1 (first controller 10) makes the first communication circuit 12 transmit data for displaying the login screen 61 to the display input apparatus 2 (second communication circuit 24) (step #12). Based on the received data, the second controller 20 makes the display 22 display the login screen 61 (step #13).

FIG. 6 shows one example of the login screen 61. On the login screen 61, a name entry field T1, a login password entry field T2, and a Login button B1 are provided. A user, using an input device 23, enters a user name and a login password (step #14). The user name and the login password are identification information for identifying the user. After identification information is input, the user operates the Login button B1. When the Login button B1 is operated, the display input apparatus 2 (second controller 20) makes the second communication circuit 24 transmit the entered identification information to the information processing apparatus 1 (first communication circuit 12) (step #15).

The information processing apparatus 1 (first storage medium 11) stores authentication information C1. The authentication information C1 is set in advance. The first storage medium 11 stores, for example, authentication information C1 similar to that on the image forming apparatus 3. The authentication information C1 includes the names and the login passwords of users authorized to create, edit, add, and manage the operation of the workflow 5. Based on the received identification information, the information processing apparatus 1 (first controller 10) checks whether the user has authority for use (step #16). Specifically, the first controller 10 checks the received identification information against the authentication information C1.

When the received identification information matches the authentication information C1 of an authorized user, the first controller 10 judges that the user has authority for use (Yes in step #16). The first controller 10 recognizes the authenticated user (authenticated person). That is, based on the stored authentication information C1, the first controller 10 checks, who the person corresponding to the identification information is. When step #16 ends in Yes, the information processing apparatus 1 (first controller 10) makes the first communication circuit 12 transmit data for displaying the top page 62 to the display input apparatus 2 (second communication circuit 24) (step #17). Based on the received data, the display input apparatus 2 (second controller 20) makes the display 22 display the top page 62 (step #18). Then, the procedure ends (END).

When the received identification information does not match the authentication information C1, the first controller 10 judges that the user has no authority for use (No in step #16). When step #16 ends in No, the information processing apparatus 1 (first controller 10) makes the first communication circuit 12 notify the display input apparatus 2 (second communication circuit 24) of refusal of login (step #19). On receiving refusal of login, the display input apparatus 2 (second controller 20) makes the display 22 display on the login screen 61 a message of refusal of login (step #110). Then, the procedure returns to step #14.

FIG. 7 shows one example of the top page 62 (corresponding to a list screen). The top page 62 includes a list. The list 7 is a list of registered workflows 5 created previously. The information processing apparatus 1 (first controller 10), for each registered workflow 5, displays the name, the creator, the type, and the state of the workflow 5 within the list 7.

The information processing apparatus 1 (first controller 10) makes the display input apparatus 2 (display 22) display check boxes CB0 to the left of the names of registered workflows 5. The check box CB0 is an image for selecting a registered workflow 5. An authenticated user, using the input device 23, checks the check box CB0 corresponding to the registered workflow 5 to be selected. FIG. 7 shows an example where the registered workflow 5 at the top of the list 7 is selected.

The information processing apparatus 1 (first controller 10) makes the display input apparatus 2 display an Add button B2, an Edit button B3, a Delete button B4, a Play button B5, and a Stop button B6. The display input apparatus 2 (second controller 20) displays the buttons mentioned above within the top page 62.

The information processing apparatus 1 makes the display input apparatus 2 display the Add button B2 on a page that displays the list 7. The display input apparatus 2 (input device 23) accepts an operation on the Add button B2. When the Add button B2 is operated, the display input apparatus 2 (second controller 20) makes the second communication circuit 24 transmit to the information processing apparatus 1 (first communication circuit 12) a display request for a creation screen 63 for a workflow 5. On receiving the display request, the information processing apparatus 1 (first controller 10) transmits data for displaying the creation screen 63 to the display input apparatus 2 (second communication circuit 24). The display input apparatus 2 (second controller 20) makes the display 22 display the creation screen 63 for a workflow 5.

(Outline of Creation of a Workflow 5)

Figure 8:
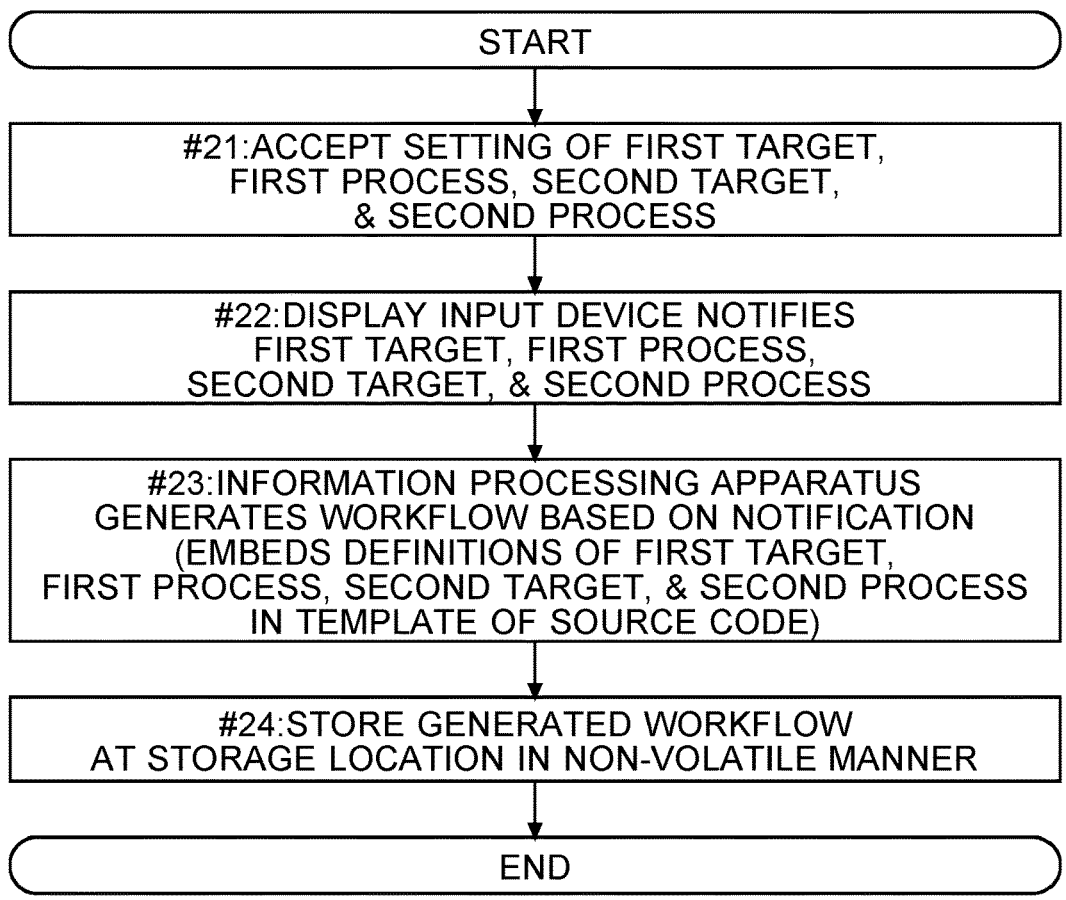
FIG. 8 is a diagram showing an outline of operation for creating a workflow according to the embodiment.
Figure 9:
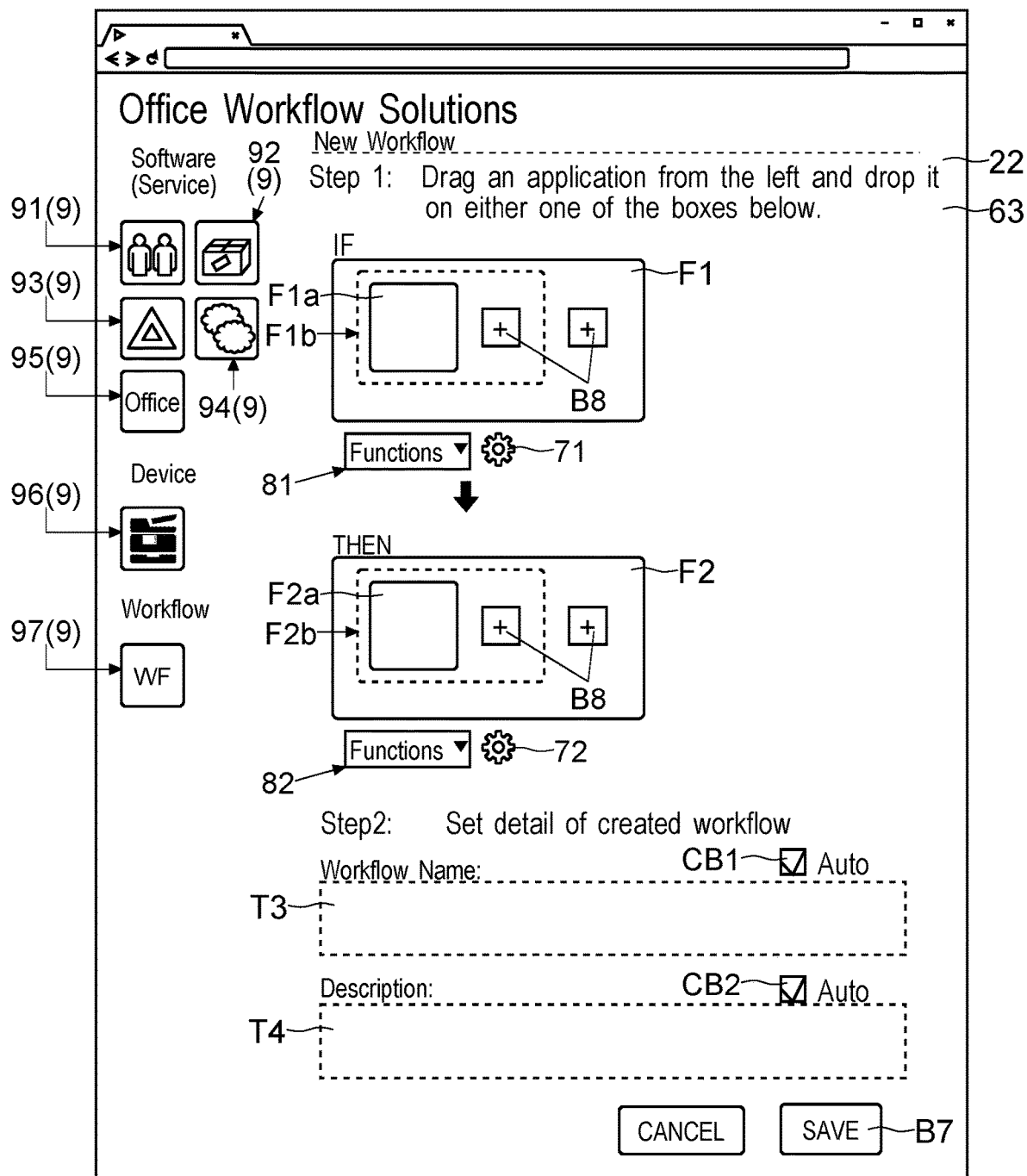
FIG. 9 is a diagram showing one example of a creation screen according to the embodiment.

Next, with reference to FIGS. 8 and 9, one example of operation for creating a workflow 5 according to the embodiment will be described. FIG. 8 is a diagram showing an outline of operation for creating a workflow 5 according to the embodiment. FIG. 9 is a diagram showing one example of the creation screen 63 according to the embodiment.

An authenticated user can create a workflow 5 through entry on the creation screen 63. The procedure in FIG. 8 starts when the creation screen 63 is displayed on the display input apparatus 2. Hereinafter, the authenticated user who creates a workflow 5 is referred to as a creator. The creator accepts, on the creation screen 63, setting of a first target, a first process, a second target, and a second process (step #21). In other words, the display input apparatus 2 (input device 23) accepts, on the creation screen 63, setting of a first target, a first process, a second target, and a second process.

As shown in FIG. 9, the information processing apparatus 1 (first controller 10) makes the display input apparatus 2 display an If area F1 within the creation screen 63. The If area F1 is an area for setting the first target. The information processing apparatus 1 (first controller 10) makes the display input apparatus 2 display a first selection field 81 within the creation screen 63. The first selection field 81 is a field for selecting the first process. The first selection field 81 is arranged under the If area F1. The information processing apparatus 1 (first controller 10) makes the display input apparatus 2 display a Then area F2 within the creation screen 63. The Then area F2 is an area for setting the second target. The information processing apparatus 1 (first controller 10) makes the display input apparatus 2 display a second selection field 82 within the creation screen 63. The second selection field 82 is a field for selecting the second process. The second selection field 82 is arranged under the Then area F2. Details of setting the first target, the first process, the second target, and the second process will be given later.

As shown in FIG. 9, a Save button B7 is provided on the creation screen 63. The display input apparatus 2 (input device 23) accepts an operation on the Save button B7. When the Save button B7 is operated, the display input apparatus 2 (second controller 20) makes the second communication circuit 24 notify the information processing apparatus 1 (first communication circuit 12) of the first target, the first process, the second target, and the second process that are set (step #22).

Based on the first target, the first process, the second target, and the second process thus notified, the information processing apparatus 1 (first controller 10) generates a workflow 5 (step #23). A workflow 5 is a program which, when the condition that the notified first process has been performed using the notified first target is met, performs the notified second process using the notified second target with respect to the data on which the notified first process has been performed. A workflow 5 is a program of an if-then type. The if-condition is that the notified first process has been performed using the notified first target. When the if-condition is met, the first controller 10, using the second target, performs the second process or controls such that the second process is performed.

The information processing apparatus 1 (first controller 10) performs processing defined in the workflow management software 15 to generate a workflow 5. The workflow management software 15 includes a template for source code of a workflow 5. The first controller 10 embeds in the template for source code the definitions of the first target, the first process, the second target, and the second process (step #23). The first controller 10 also embeds in the template for source code the information needed to check whether the first process has been performed using the first target. The first controller 10 also embeds in the template for source code the information needed to perform the second process using the second target. Eventually, the first controller 10 generates one workflow 5 (a piece of source code).

The first controller 10 generates, for example, a file in JSON (JavaScript (registered trade-mark) Object Notation) format as a workflow 5. A file in JSON format is compatible with various software packages 25 and programming languages. A file in JSON format has advantages that it can be written and read with simple processing and that it allows efficient transfer of data. It is compatible also with the coordination basic software 13 for the information processing apparatus 1. Any format other than JSON format may be used.

Next, the information processing apparatus 1 (first controller 10) stores, in a non-volatile manner, the generated workflow 5 at a prescribed storage location (step #24). For example, the first controller 10 makes the first storage medium 11 (HDD) store the workflow 5. The first controller 10 may make any other storage device connected communicably with the information processing apparatus 1 store the workflow 5.

(Setting of a First Target)

Next, with reference to FIGS. 10 to 13, one example of setting of a first target according to the embodiment will be described. FIGS. 10 to 13 are diagrams showing one example of setting of a first target according to the embodiment.

The creation screen 63 includes icon images 9. The information processing apparatus 1 (first controller 10) makes the display input apparatus 2 display within the creation screen 63 icon images 9 for selecting a first target and a second target used for processing. A plurality of icon images 9 are provided at the left on the creation screen 63.

FIGS. 10 to 13 show an example where seven icon images 9 are displayed. In FIGS. 10 to 13, a first image 91, a second image 92, a third image 93, and a fourth image 94 are icon images 9 for selecting online services. A fifth image 95 is an icon image 9 for selecting the software 25. A sixth image 96 is an icon image 9 for selecting the image forming apparatus 3. A seventh image 97 is an icon image 9 for selecting a registered workflow 5.

The first image 91 corresponds to a network service (online service) for contact management. Similar services include, for example, Google Contacts (registered trade-mark). One contact includes information on predetermined items. The predetermined items include, for example, an address, a name, an e-mail address, a phone number, and a facsimile number. It is possible to access a site providing a contact management service using the browser software 26.

The second to fourth images 92 to 94 correspond to online storage services. Similar services include, for example, Google Drive (registered trade-mark), Dropbox (registered trade-mark), and OneDrive (registered trade-mark). A user can access an online storage using the browser software 26 or a dedicated client application.

The fifth image 95 corresponds to the software 25 installed on the display input apparatus 2. For example, the software 25 allows choice among, for example, word-processing software, spreadsheet software, image data editing software, and OCR software.

By using the icon images 9, any of services, software 25, the image forming apparatus 3, and a workflow 5 can be set as a first and a second target. The first and second targets may be different from each other.

The display input apparatus 2 (input device 23) receives a first setting operation on an icon image 9 as an operation for setting the target corresponding to the icon image 9 as the first target. The first setting operation is an operation in which the icon image 9 is dragged and dropped into the If area F1. The first target can be set easily.

Figure 10:
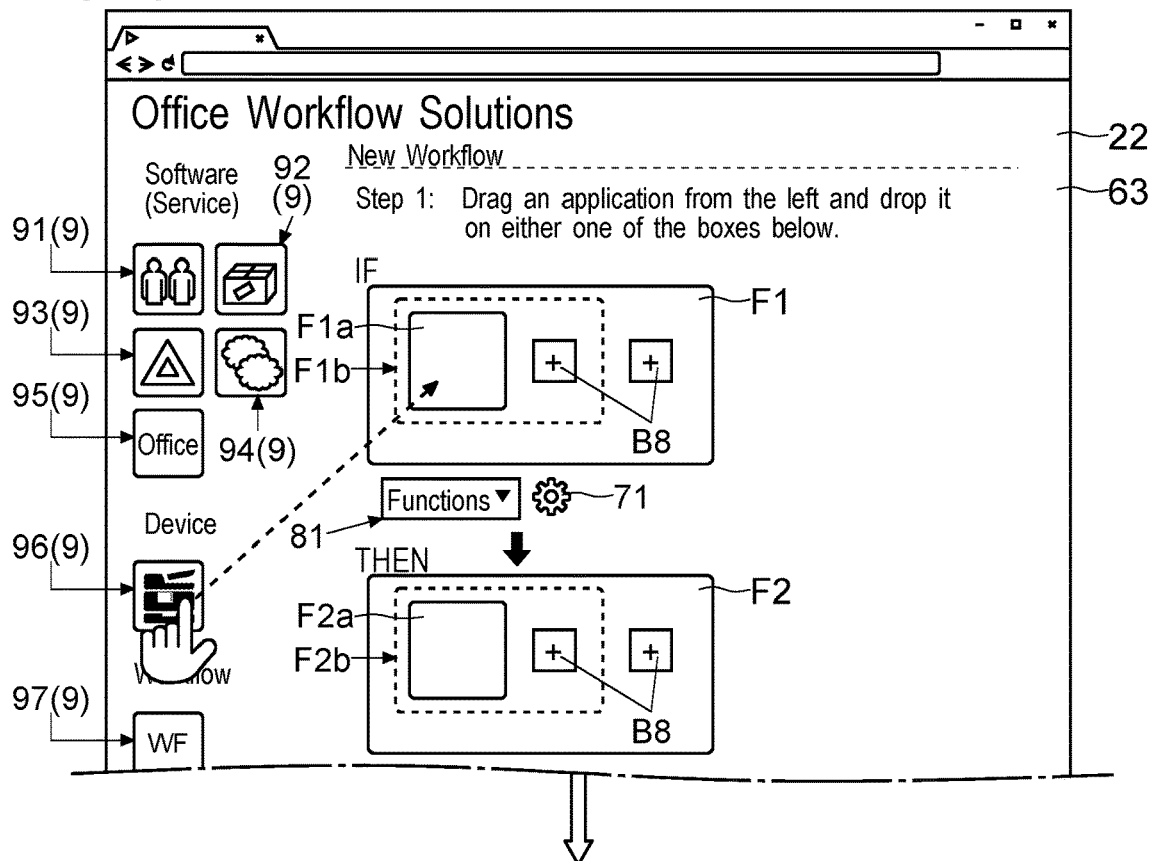
FIG. 10 is a diagram showing one example of setting of a first target according to the embodiment.
Figure 10:
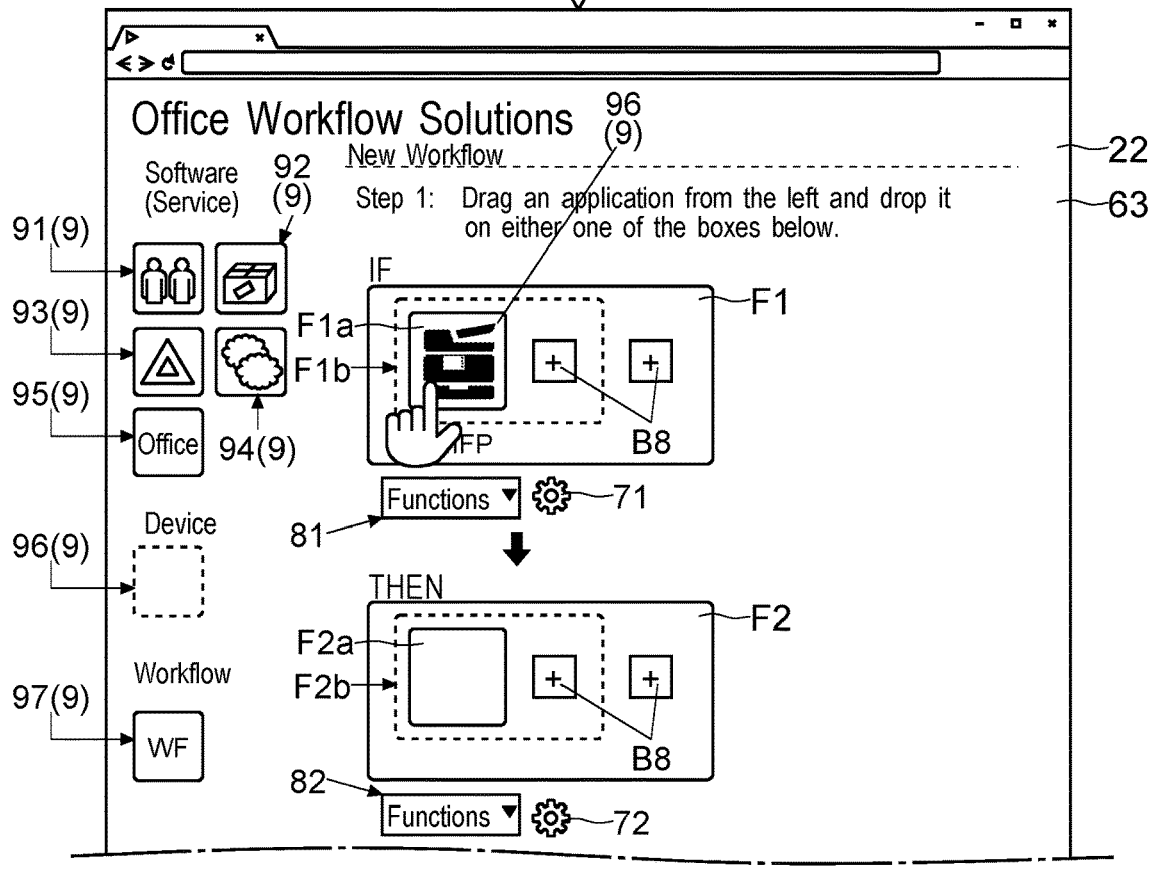

With reference to FIG. 10, the first setting operation will be described. First, a first target setting area F1a is arranged inside the If area F1. The first target setting area F1a is in a rectangular shape. The first target setting area F1a is an area inside a solid-line frame. The first target setting area F1a indicates the place in which to put an icon image 9. FIG. 10 shows an example where an image forming apparatus 3 is set as the first target. As shown in the upper diagram of FIG. 10, a creator drags the icon image 9 (the sixth image 96) that represents the image forming apparatus 3. The creator drops the sixth image 96 on the first target setting area F1a. As a result, the display input apparatus 2 (second controller 20) displays the dragged and dropped icon image 9 inside the first target setting area F1a (the lower diagram of FIG. 10). The display input apparatus 2 (second controller 20) recognizes the icon image 9 set in the first target setting area F1a as the first target.

A plurality of first targets can be set. A Plus button B8 is arranged inside the If area F1. The information processing apparatus 1 (first controller 10) makes the display input apparatus 2 display the creation screen 63 including the Plus button B8. The display input apparatus 2 (second controller 20) displays a first group frame F1b. The first group frame F1b is a broken-line frame in a rectangular shape. The first group frame F1b is a line indicating a group of first targets. The first group frame F1b serves as parentheses in an arithmetic expression (logic expression).

Figure 11:
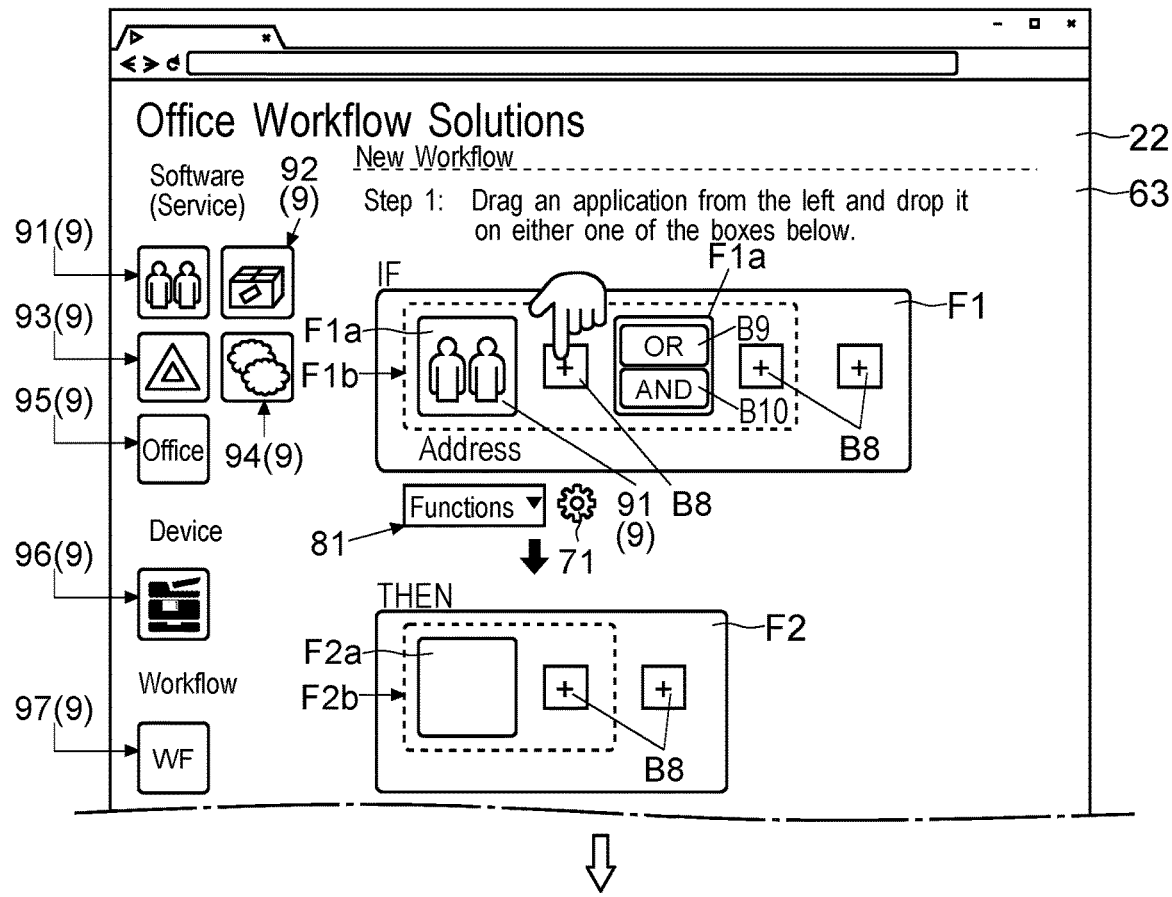
FIG. 11 is a diagram showing one example of setting of a first target according to the embodiment.
Figure 11:
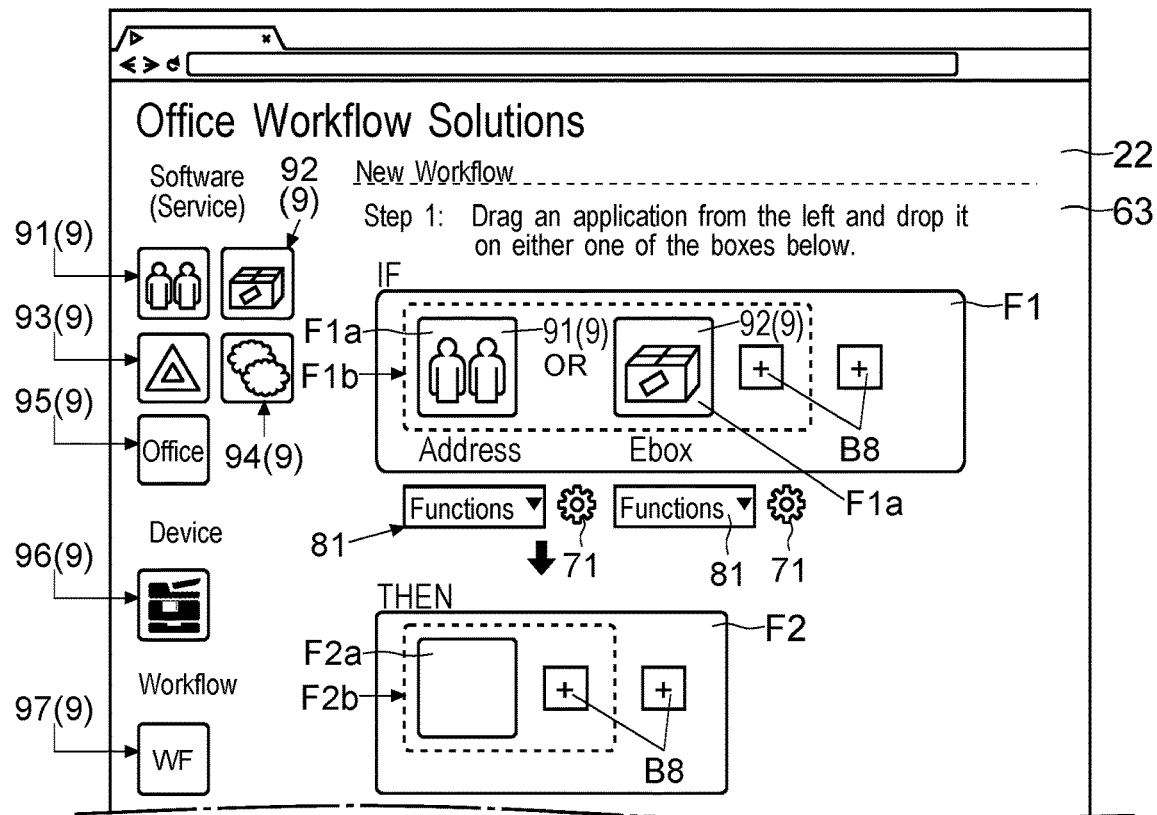

The upper diagram of FIG. 11 shows one example of the creation screen 63 when the Plus button B8 inside the first group frame F1b is operated. When the Plus button B8 is operated, the display input apparatus 2 (second controller 20) adds a first target setting area F1a inside the first group frame F1b. Also, the second controller 20 expands the If area F1 and the first group frame F1b. The second controller 20 makes the display 22 display a creation screen 63 on which a first target setting area F1a is added inside the first group frame F1b. The information processing apparatus 1 makes the display input apparatus 2 display an Or button B9 and an And button B10 inside the newly added first target setting area F1a. The display input apparatus 2 newly displays a first target setting area F1a including the And button B10 and the Or button B9.

To put a plurality of first targets into an OR relationship, a user operates the Or button B9. When the Or button B9 is operated, the display input apparatus 2 (second controller 20) takes the first target set in the new first target setting area F1a and the first target set in the previous first target setting area F1a as being in an OR relationship. That is, the display input apparatus 2 (input device 23) accepts setting for putting one first target and another first target into an OR relationship. When the Save button B7 is operated, the display input apparatus 2 (second controller 20) makes the second communication circuit 24 notify the information processing apparatus 1 (first communication circuit 12) of the relationship. The second communication circuit 24 notifies the plurality of first targets which are put in an OR relationship. In this case, the information processing apparatus 1 (first controller 10) generates a workflow 5 that has the if-condition that the first process corresponding to one of the first targets in an OR relationship have been performed.

The lower diagram of FIG. 11 shows one example of the creation screen 63 when the Or button B9 is operated. The word "OR" is added between the new first target setting area F1a and the previous first target setting area F1a. The word "OR" indicates that the first targets corresponding to the two icon images 9 on opposite sides of "OR" are in an OR relationship. The lower diagram of FIG. 11 shows an example where a contact management service and an online storage service are set in an OR relationship.

To put a plurality of first targets into an AND relationship, a user operates the AND button B10. When the And button B10 is operated, the display input apparatus 2 (second controller 20) takes the first target set in a new first target setting area F1a and the first target set in the previous first target setting area F1a as being in an AND relationship. That is, the display input apparatus 2 (input device 23) accepts setting for putting one first target and another first target into an AND relationship. When the Save button B7 is operated, the second controller 20 makes the second communication circuit 24 notify the information processing apparatus 1 (first communication circuit 12) of the relationship. The second communication circuit 24 notifies the plurality of first targets which are put in an AND relationship. In this case, the information processing apparatus 1 (first controller 10) generates a workflow 5 that has the if-condition that, using all the first targets in an AND relationship, their respective first processes have been performed.

When the And button B10 is operated, the word "AND" is added between the new first target setting area F1a and the previous first target setting area F1a. The word "AND" indicates that the first targets corresponding to the two icon images 9 on opposite sides of "AND" are in an AND relationship.

Figure 12:
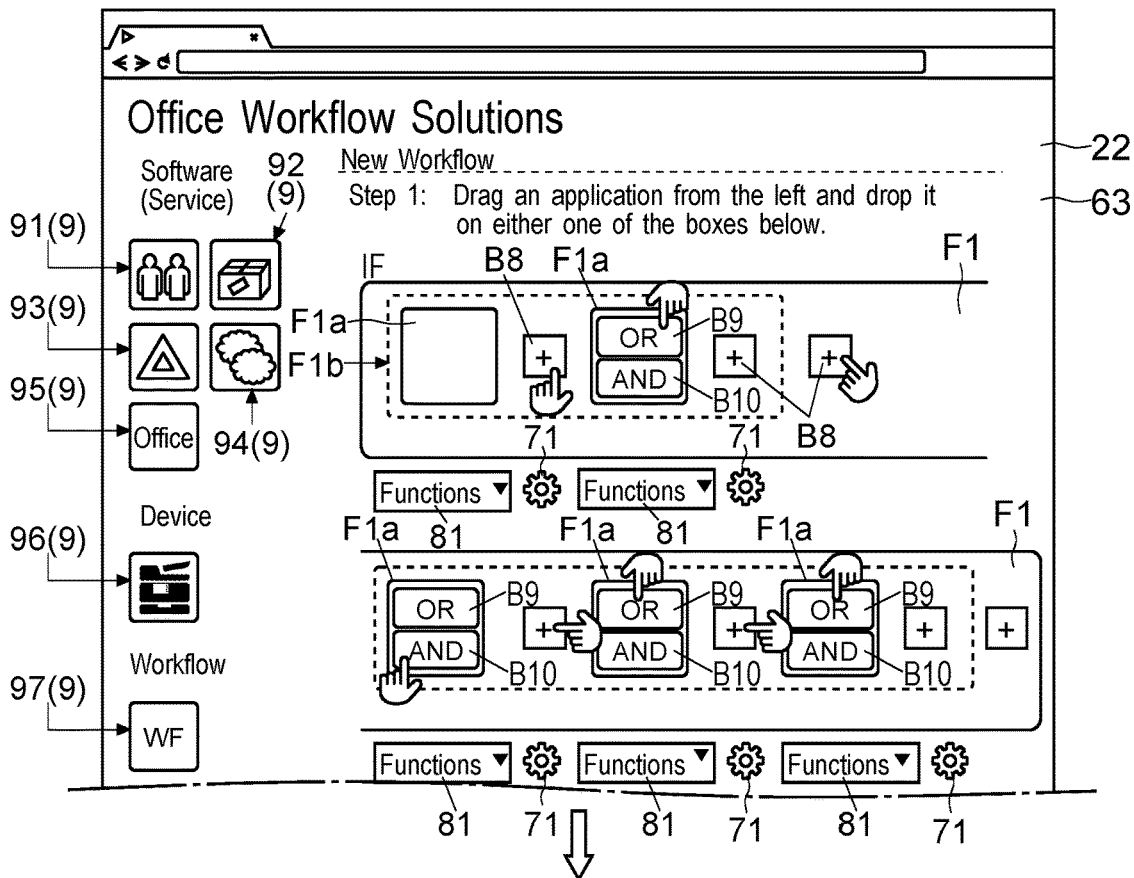
FIG. 12 is a diagram showing one example of setting of a first target according to the embodiment.
Figure 12:
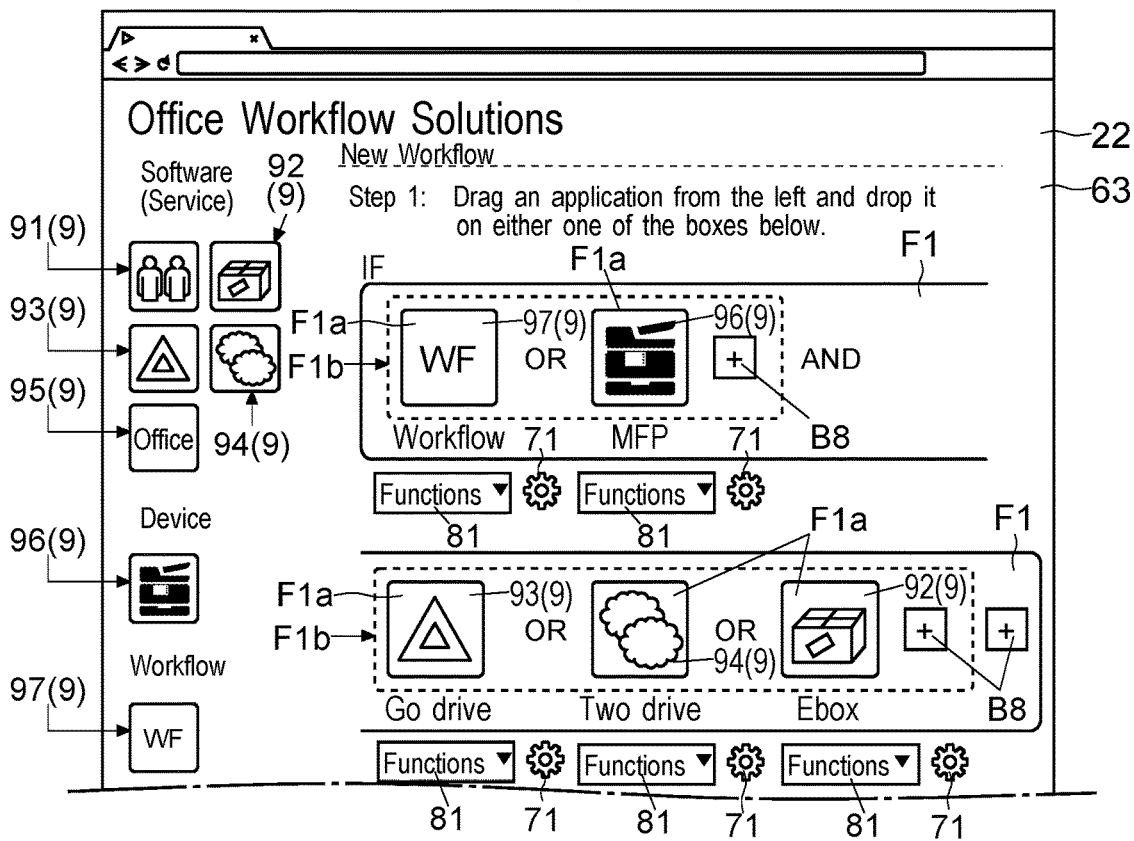

Three or more first targets can be set. By operating the Plus button B8 inside the first group frame F1b twice or more, it is possible to put three or more first targets into an OR or AND relationship. Also, by operating the Plus button B8 outside the first group frame F1b, it is possible, with respect to two or more groups of first targets, to put one or more first targets into an OR or AND relationship. FIG. 12 shows one example of the creation screen 63 when the Plus buttons B8 both inside and outside the first group frame F1b are operated.

The upper diagram of FIG. 12 shows an example where the Plus button B8 is operated once inside the upper first group frame F1b and the Plus button B8 is operated twice inside the lower first group frame F1b. In this example, also the Plus button B8 outside the first group frame F1b is operated once. When the Plus button B8 outside the first group frame F1b is operated, the information processing apparatus 1 adds a first group frame F1b. The information processing apparatus 1 makes the display input apparatus 2 display a new first target setting area F1a and a new Plus button B8 inside the new first group frame F1b. The information processing apparatus 1 makes the display input apparatus 2 display an Or button B9 and an AND button B10 in the first target setting area F1a at the head inside the new first group frame F1b. By operating a button in the first target setting area F1a at the head inside the new first group frame F1b, it is possible to put groups into an OR or AND relationship.

When the Plus button B8 outside the first group frame F1b is operated, the display input apparatus 2 (second controller 20) expands the If area F1. The second controller 20 displays a new first group frame F1b, a new first target setting area F1a, and a new Plus button B8. FIG. 12 shows an example where the If area F1 is displayed in two tiers.

The lower diagram of FIG. 12 shows an example where an OR relationship has been set within each group (within parentheses). In this example, also an AND relationship has been set between groups. In the case shown in FIG. 12, the if-condition in the workflow 51 to be generated is that, either in a workflow 5 or on an image forming apparatus 3, the corresponding first process has been performed and in addition, in one of three kinds of network storage services, the corresponding first process has been performed. In this way, it is possible to set a plurality of first targets, and to generate an elaborate, complicate workflow 5.

The description above deals with an example where, when the Plus button B8 is operated and a first target setting area F1a is added, an OR or AND relationship is selected. Instead, a configuration is also possible that allows updating of an OR or AND relationship any time before the Save button B7 is operated.

Figure 13:
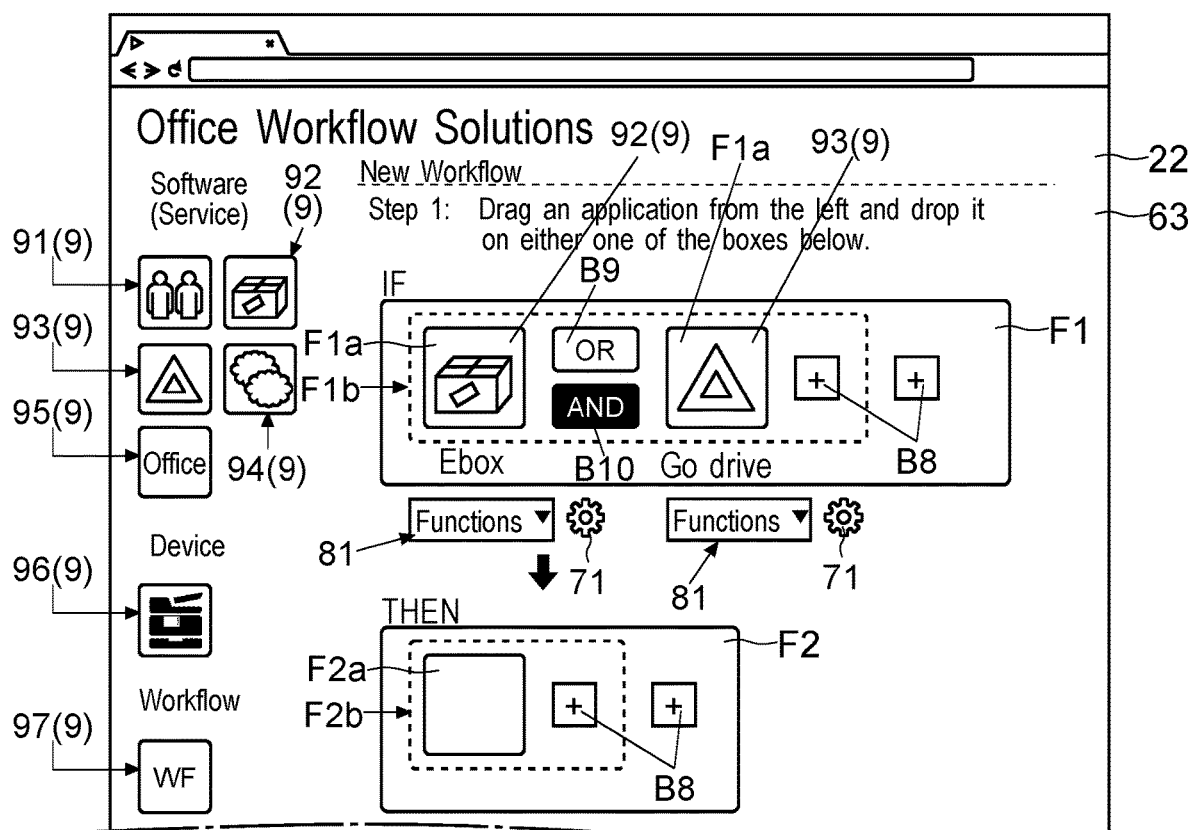
FIG. 13 is a diagram showing one example of setting of a first target according to the embodiment.

FIG. 13 shows one example of a screen that allows updating of an OR or AND relationship before the Save button B7 is operated. Also in the case shown in FIG. 13, the information processing apparatus 1 (first controller 10) makes the display input apparatus 2 display a creation screen 63 including an icon image 9 for selecting a processing target, an If area F1, and a Plus button B8. The information processing apparatus 1 also displays a first target setting area F1a inside the If area F1. When the Plus button B8 is operated, the information processing apparatus 1 makes the display input apparatus 2 display a first target setting area F1a additionally. When the Plus button B8 is operated, the information processing apparatus 1 makes the display input apparatus 2 display relationship selection buttons between the first target setting areas F1a. The relationship selection buttons are buttons for selecting an OR or AND relationship. FIG. 13 shows an example where an Or button B9 and an And button B10 are displayed as the relationship selection buttons. When the relationship selection button for an OR relationship (the Or button B9) is operated, the display input apparatus 2 (second controller 20) recognizes the first targets set in the first target setting areas F1a on opposite sides of the relationship selection button as being in an OR relationship. When the relationship selection button for an AND relationship (the And button B10) is operated, the second controller 20 recognizes the first targets set in the first target setting areas F1a on opposite sides of the relationship selection button as being in an AND relationship.

(Setting of a Second Target)

Next, with reference to FIGS. 14 to 17, one example of setting the second target according to the embodiment will be described. FIGS. 14 to 17 are diagrams showing one example of setting the second target according to the embodiment.

The display input apparatus 2 (input device 23) receives a second setting operation on an icon image 9 as an operation for setting the target corresponding to the icon image 9 as the second target. The second setting operation is an operation in which the icon image 9 is dragged and dropped into the Then area F2. The second target can be set easily.

Figure 14:
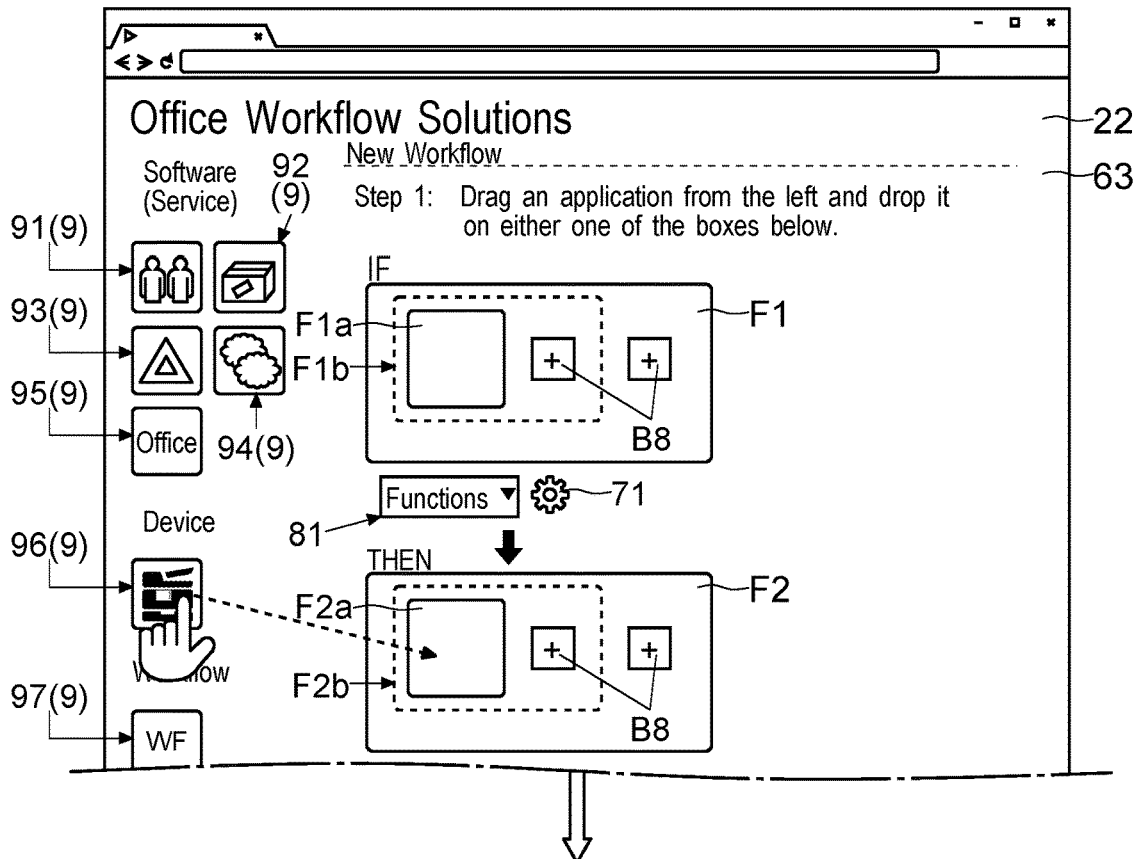
FIG. 14 is a diagram showing one example of setting of a second target according to the embodiment.
Figure 14:
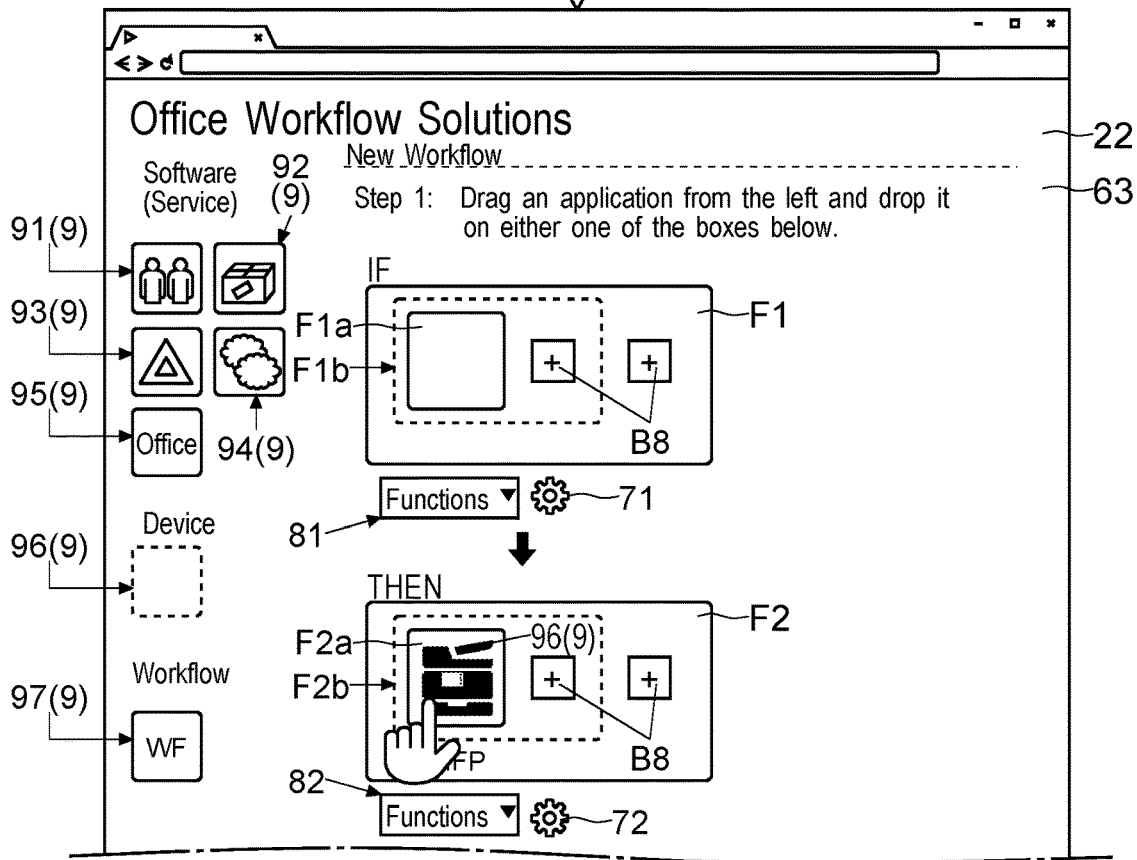

With reference to FIG. 14, the second setting operation will be described. A second target setting area F2a is arranged inside the Then area F2. The second target setting area F2a is in a rectangular shape. The second target setting area F2a is a solid-line frame. The second target setting area F2a indicates the place in which to put an icon image 9. FIG. 14 shows an example where an image forming apparatus 3 is set as the second target. As shown in the upper diagram of FIG. 14, a user drags the icon image 9 (sixth image 96) that represents the image forming apparatus 3. The user then drops the sixth image 96 on the second target setting area F2a. As a result, the display input apparatus 2 (second controller 20) displays the dragged and dropped icon image 9 inside the second target setting area F2a (the lower diagram of FIG. 14). The display input apparatus 2 (second controller 20) recognizes the icon image 9 set in the second target setting area F2a as the second target.

A plurality of second targets can be set. A plus button B8 is arranged inside the Then area F2. The information processing apparatus 1 (first controller 10) makes the display input apparatus 2 display the creation screen 63 including the Plus button B8. The display input apparatus 2 (second controller 20) displays a second group frame F2b. The second group frame F2b is a broken-line frame in a rectangular shape. The second group frame F2b is a line indicating a group of second targets. The second group frame F2b serves as parentheses in an arithmetic expression (logic expression).

Figure 15:
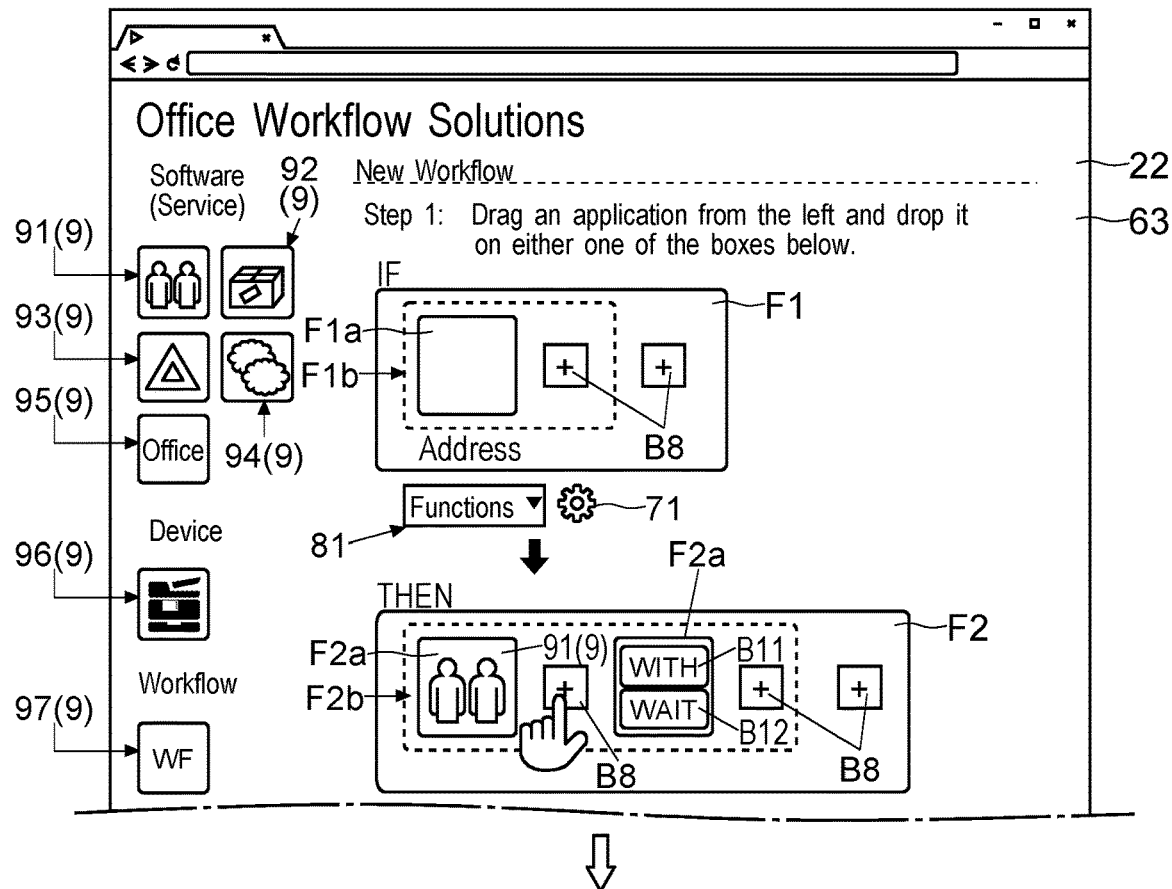
FIG. 15 is a diagram showing one example of setting of a second target according to the embodiment.
Figure 15:
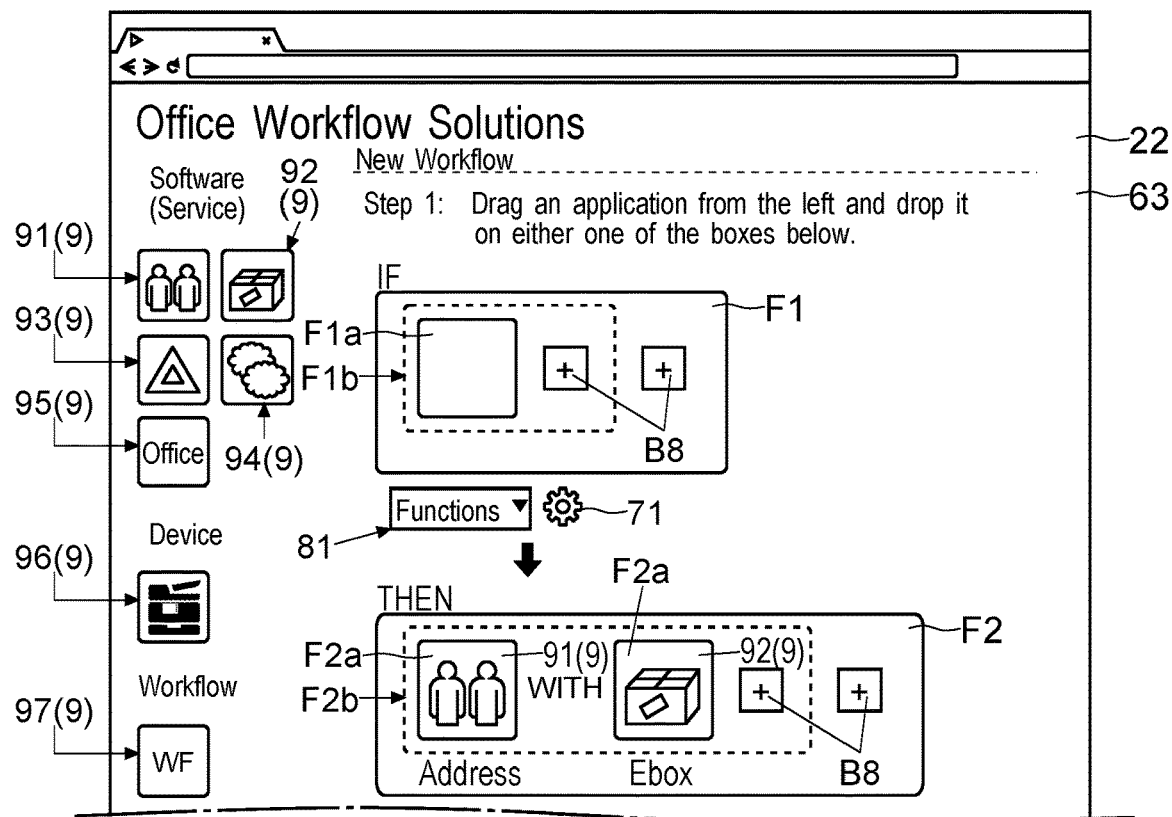

The upper diagram of FIG. 15 shows one example of the creation screen 63 when the Plus button B8 inside the second group frame F2b is operated. When the Plus button B8 is operated, the display input apparatus 2 (second controller 20) adds a second target setting area F2a inside the second group frame F2b. Also, the second controller 20 expands the Then area F2 and the second group frame F2b. The second controller 20 makes the display 22 display a creation screen

63 on which the second target setting area F2*a* is added in the second group frame F2*b*. The information processing apparatus 1 makes the display input apparatus 2 display a With button B11 and a Wait button B12 inside the newly added second target setting area F2*a*. The display input apparatus 2 displays a second target setting area F2*a* including the With button B11 and the Wait button B12.

To put a plurality of second targets into a concurrent relationship, a user operates the With button B11. When the With button B11 is operated, the second target set in the new second target setting area F2*a* and the second target set in the previous second target setting area F2*a* are put into a concurrent relationship. That is, the display input apparatus 2 (input device 23) accepts setting for putting one second target and another second target into a concurrent relationship. When the Save button B7 is operated, the display input apparatus 2 (second controller 20) makes the second communication circuit 24 notify the information processing apparatus 1 (first communication circuit 12) of the relationship. The second communication circuit 24 notifies the plurality of second targets which are put in a concurrent relationship. In this case, the information processing apparatus 1 (first controller 10) generates a workflow 5 in which the respective second processes of the second targets in a concurrent relationship are performed.

The lower diagram of FIG. 15 shows one example of the creation screen 63 when the With button B11 is operated. the word "WITH" is added between the new second target setting area F2*a* and the previous second target setting area F2*a*. The word "WITH" indicates that the second targets corresponding to the two icon images 9 on opposite sides of "WITH" are in a concurrent relationship. The lower diagram of FIG. 15 shows an example where a contact management service and an online storage service are set in a concurrent relationship.

To put a plurality of second targets into a sequential relationship, a user operates the Wait button B12. When the Wait button B12 is operated, the second target set in the new second target setting area F2*a* and the second target set in the previous second target setting area F2*a* are put into a sequential relationship. That is, the display input apparatus 2 (input device 23) accepts setting for putting one second target and another second target into a sequential relationship. When the Save button B7 is operated, the display input apparatus 2 (second controller 20) makes the second communication circuit 24 notify the information processing apparatus 1 (first communication circuit 12) of the relationship. The second communication circuit 24 notifies the plurality of second targets which are put in a sequential relationship. In this case, the information processing apparatus 1 (first controller 10) generates a workflow 5 in which first the second process of the one, of the second targets in a sequential relationship, set to operate first is completed and then the second process of the other set to operate subsequently is performed.

When the Wait button B12 is operated, the word "WAIT" is added between the new second target setting area F2*a* and the previous second target setting area F2*a*. The word "WAIT" indicates that the second targets corresponding to the two icon images 9 on opposite sides of "WAIT" are in a sequential relationship. The display input apparatus 2 (second controller 20) takes the second target set in the second target setting area F2*a* at the head (left) in the order of display as the one to operate first. The display input apparatus 2 (second controller 20) takes the second target set in the second target setting area F2*a* at the tail (right) in the order of display as being the one to operate subsequently.

Figure 16:
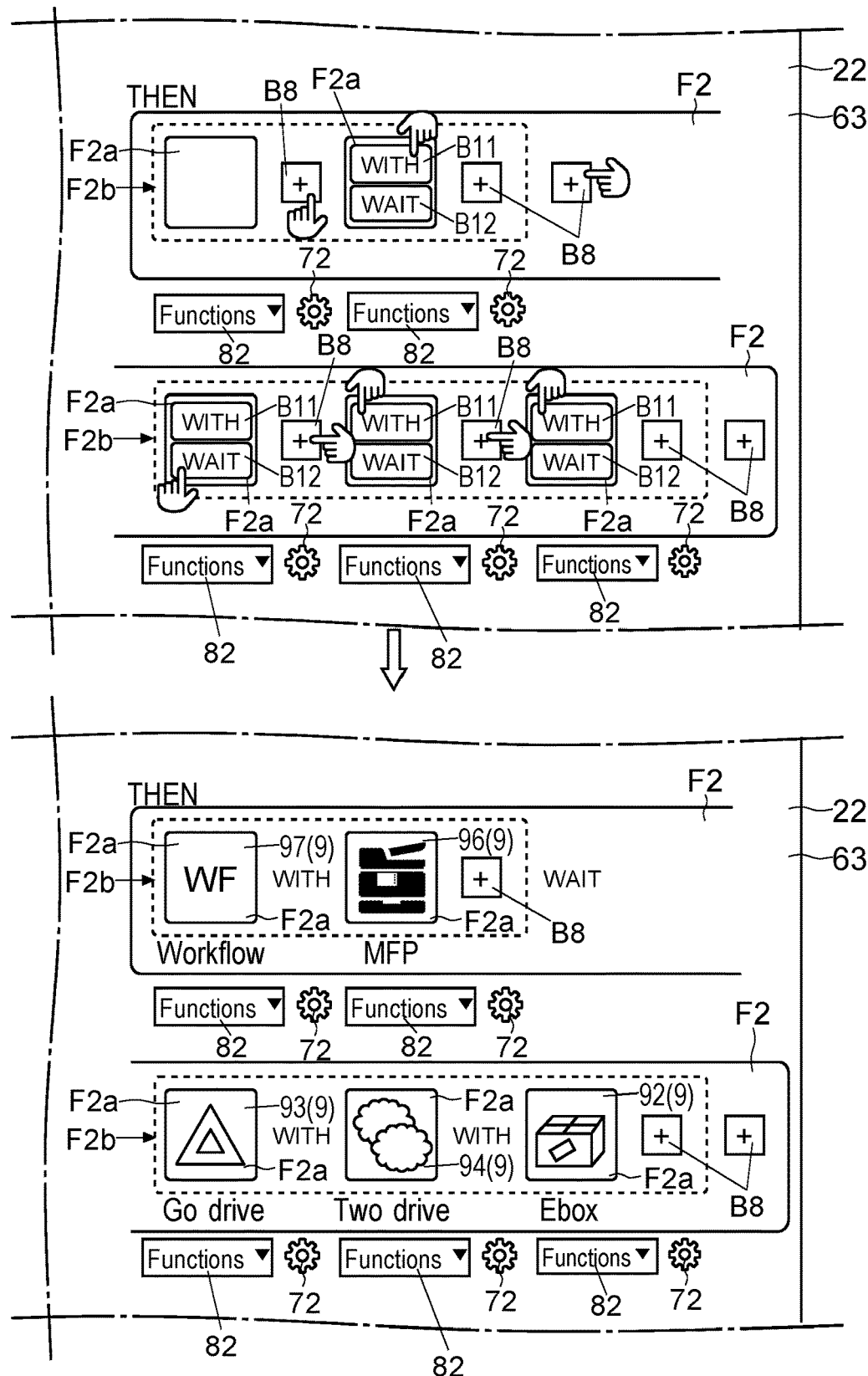
FIG. 16 is a diagram showing one example of setting of a second target according to the embodiment.

Three or more second targets can be set. By operating the Plus button B8 inside the second group frame F2*b* twice or more, it is possible to put three or more second targets into a concurrent or sequential relationship. Also, by operating the Plus button B8 outside the second group frame F2*b*, it is possible, with respect to two or more groups of second targets, to put one or more second targets into a concurrent or sequential relationship. FIG. 16 shows one example of the creation screen 63 when the Plus buttons B8 both inside and outside the second group frame F2*b* are operated.

The upper diagram of FIG. 16 shows an example where the Plus button B8 is operated once inside the upper second group frame F2*b* and the Plus button B8 is operated twice inside the lower second group frame F2*b*. In this example, also the Plus button B8 outside the second group frame F2*b* is operated once. When the Plus button B8 outside the second group frame F2*b* is operated, the information processing apparatus 1 adds a second group frame F2*b*. The information processing apparatus 1 makes the display input apparatus 2 display a new second target setting area F2*a* and a new Plus button B8 inside the new second group frame F2*b*. The information processing apparatus 1 makes the display input apparatus 2 display a With button B11 and a Wait button B12 in the second target setting area F2*a* at the head inside the new second group frame F2*b*. By operating a button in the second target setting area F2*a* at the head inside the new second group frame F2*b*, it is possible to put groups into a concurrent or sequential relationship.

When the Plus button B8 outside the second group frame F2*b* is operated, the display input apparatus 2 (second controller 20) expands the Then area F2. The second controller 20 displays a new second group frame F2*b*, a new second target setting area F2*a*, and a new Plus button B8 inside the expanded Then area F2. FIG. 16 shows an example where the Then area F2 is displayed in two tiers.

The lower diagram of FIG. 16 shows an example where a concurrent relationship has been set within each group (within parentheses). In the example shown in the lower diagram of FIG. 16, also a sequential relationship has been set between groups. In the case shown in FIG. 16, a workflow 5 is generated that, when the if-condition is met, the second processes corresponding to both a workflow 5 and an image forming apparatus 3 are performed and then the second processes corresponding to all the three kinds of network storage services are performed. In this way, it is possible to set a plurality of second targets, and to generate an elaborate, complicate workflow 5.

The description above deals with an example where, when the Plus button B8 is operated and a second target setting area F2*a* is added, a concurrent or sequential relationship is selected. Instead, a configuration is also possible that allows updating of a concurrent or sequential relationship any time before the Save button B7 is operated.

Figure 17:
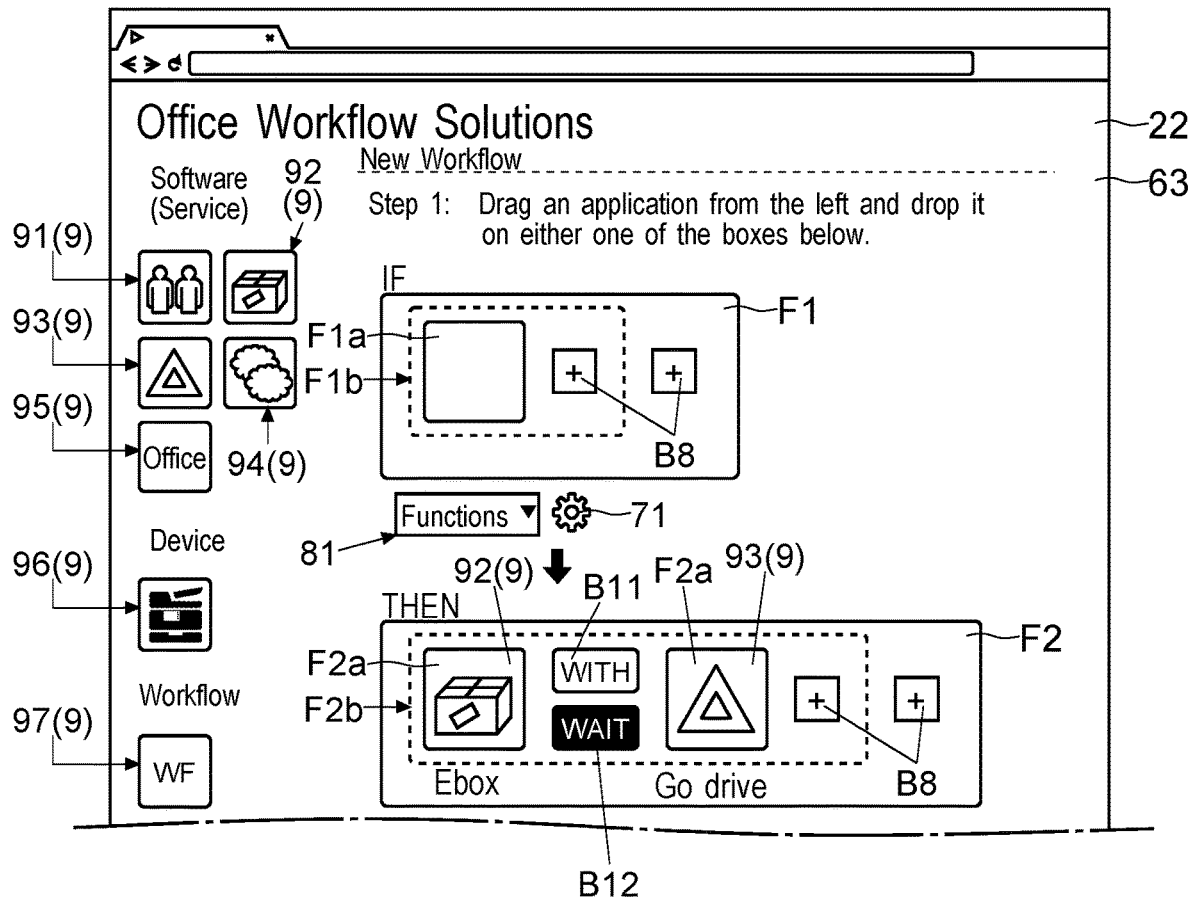
FIG. 17 is a diagram showing one example of setting of a second target according to the embodiment.

FIG. 17 shows one example of a screen that allows updating of a concurrent or sequential relationship before the Save button B7 is operated. Also in the case shown in FIG. 17, the information processing apparatus 1 (first controller 10) makes the display input apparatus 2 display a creation screen 63. The creation screen 63 includes an icon image 9 for selecting a processing target, a Then area F2, and a Plus button B8. The first controller 10 also displays a second target setting area F2*a* inside the Then area F2. When the Plus button B8 is operated, the display input apparatus 2 (second controller 20) displays a new second target setting area F2*a* additionally. When the Plus button B8 is operated, the information processing apparatus 1 makes the display input apparatus 2 display relationship selection buttons between the second target setting areas F2a. The relationship selection buttons are buttons for selecting a concurrent or sequential relationship. FIG. 17 shows an example where a With button B11 and a Wait button B12 are displayed as the relationship selection buttons. When the With button B11 is operated, the second controller 20 recognizes the second targets set in the second target setting areas F2a on opposite sides of the relationship selection button as being in a concurrent relationship. When the Wait button B12 is operated, the second controller 20 recognizes the second targets set in the second target setting areas F2a on opposite sides of the relationship selection button as being in a sequential relationship. The second controller 20 recognizes the one, of the second targets in the second target setting areas F2a on opposite sides of the Wait button B12, anterior in order as being the one to operate first. The second controller 20 recognizes the one, of the second targets in the second target setting areas F2a on opposite sides of the Wait button B12, posterior in order as being the one to operate subsequently.

(Setting of a First Process)

Next, with reference to FIGS. 18 to 22, one example of setting of a first process according to the embodiment will be described. FIGS. 18 to 22 are diagrams showing one example of setting of a first process according to the embodiment.

The information processing apparatus 1 (first controller 10) makes the display input apparatus 2 display a first selection field 81 for selecting a first process within the creation screen 63. As shown in FIGS. 18 to 22, the first selection field 81 is arranged under the If area F1. One first selection field 81 is arranged under each first target setting area F1a. The display input apparatus 2 (input device 23) accepts the process selected in the first selection field 81 as a first process. The first process performed using the first target can thus be set.

When the first selection field 81 is operated, the display input apparatus 2 (second controller 20) displays a pull-down menu on the display 22. The content data of the pull-down menu is fed from the information processing apparatus 1. A first process can be selected from the pull-down menu. Selectable processes vary depending on the set first target.

Figure 18:
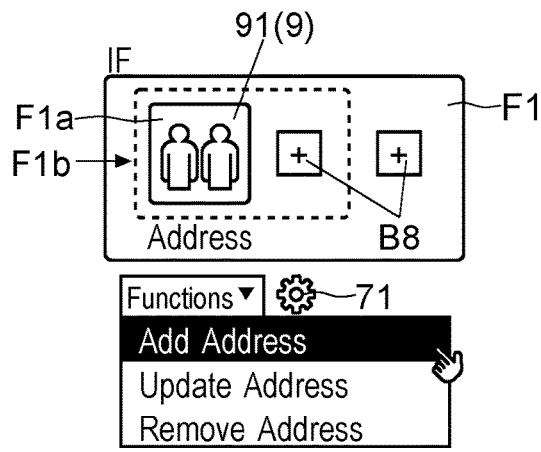
FIG. 18 is a diagram showing one example of setting of a first process according to the embodiment.

By operating the first image 91, it is possible to set a contact management service as a first target. FIG. 18 shows one example of first processes selectable when a contact management service is set as a first target. For example, adding, updating (editing), or deleting of a contact (an address) can be set as a first process. In this case, the if-condition in the workflow 5 to be generated is that a contact has been added, updated, or deleted using the contact management service.

Figure 19:
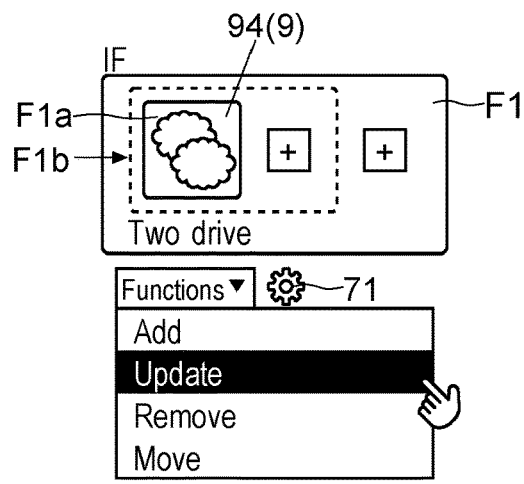
FIG. 19 is a diagram showing one example of setting of a first process according to the embodiment.

By operating the second image 92, the third image 93, or the fourth image 94, it is possible to set a network storage service (an application for using a network storage service) as a first target. FIG. 19 shows one example of first processes selectable when a network storage service is set as a first target. For example, adding, updating, deleting, or moving of data with respect to a network storage can be set as a first process. Here, the data may be a file or a folder. In this case, the if-condition in the workflow 5 to be generated is that data has been added, updated, deleted, or moved using the network storage service.

Figure 20:
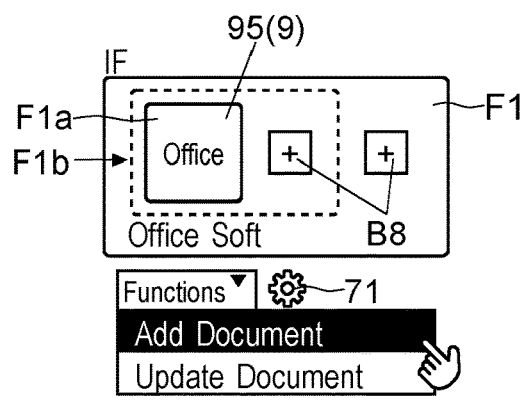
FIG. 20 is a diagram showing one example of setting of a first process according to the embodiment.

By operating the fifth image 95, it is possible to set software 25 as a first target. One example of software 25 is word-processing software. FIG. 20 shows one example of first processes selectable when word-processing software is set as a first target. For example, it is possible to set adding (saving as new) or updating (overwriting) of a document file as a first target. In this case, the if-condition in the workflow 5 to be generated is that a document file has been saved as new or has been updated using word-processing software.

Figure 21:
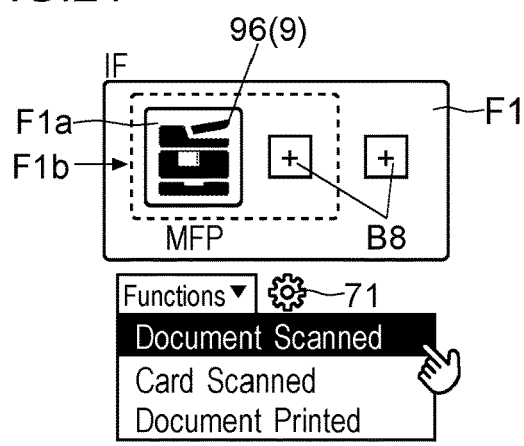
FIG. 21 is a diagram showing one example of setting of a first process according to the embodiment.

By operating the sixth image 96, it is possible to set an image forming apparatus 3 as a first target. FIG. 21 shows one example of first processes selectable when an image forming apparatus 3 is set as a first target. For example, it is possible to set reading of a document, reading of a card, and printing of a document as a first process. In this case, the if-condition in the workflow 5 to be generated is that reading of a document, reading of a card, or printing of a document has been performed using the image forming apparatus 3.

Figure 22:
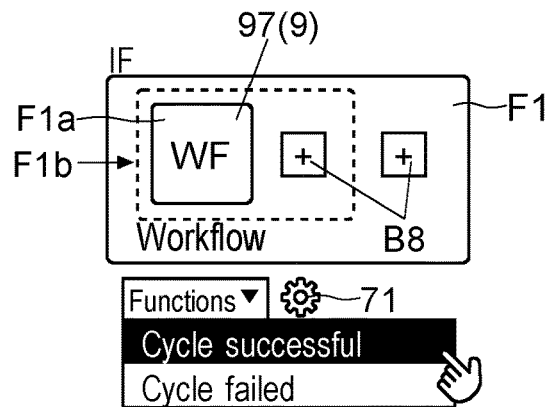
FIG. 22 is a diagram showing one example of setting of a first process according to the embodiment.

By operating the seventh image 97, it is possible to set a registered workflow 5 as a first target. FIG. 22 shows one example of first processes selectable when a registered workflow 5 is set as a first target. For example, the success or failure of a workflow 5 can be set as a first process. In this case, the if-condition of the workflow 5 to be generated is the success or failure of the workflow 5.

(Setting of a Second Process)

Next, with reference to FIGS. 23 to 27, one example of setting of a second process according to the embodiment will be described. FIGS. 23 to 27 are diagrams showing one example of setting of a second process according to the embodiment.

The information processing apparatus 1 (first controller 10) makes the display input apparatus 2 display a second selection field 82 for selecting the second process within the creation screen 63. As shown in FIGS. 23 to 27, the second selection field 82 is arranged under the Then area F2. One second selection field 82 is arranged under each second target setting area F2a. The display input apparatus 2 (input device 23) accepts the process selected in the second selection field 82 as a second process. By setting a second process that is performed using a second target, it is possible to set the process that is performed subsequently to the if-condition.

When the second selection field 82 is operated, the display input apparatus 2 (second controller 20) displays a pull-down menu on the display 22. The content data of the pull-down menu is fed from the information processing apparatus 1. A second process can be selected from the pull-down menu. Selectable processes vary depending on the set second target.

Figure 23:
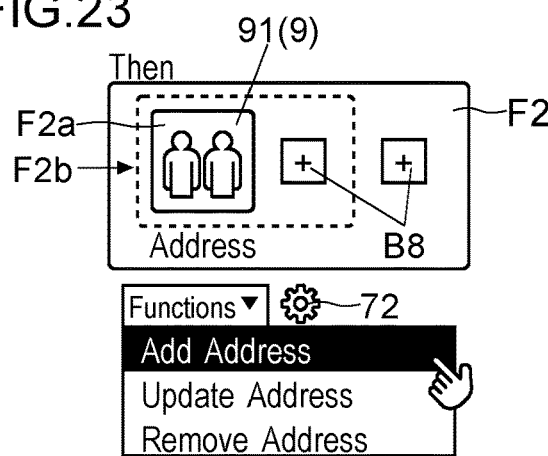
FIG. 23 is a diagram showing one example of setting of a second process according to the embodiment.

By operating the first image 91, it is possible to set a contact management service as a second target. FIG. 23 shows one example of second processes selectable when a contact management service is set as a second target. For example, adding, updating, or deleting of a contact (an address) can be set as a second process. In this case, a workflow 5 is generated that, when the if-condition is met, based on the data used in the first process, a contact on the contact management service is automatically added, updated, or deleted. Second processes selectable for the contact management service may be limited according to the first target and the first process that are set.

Figure 24:
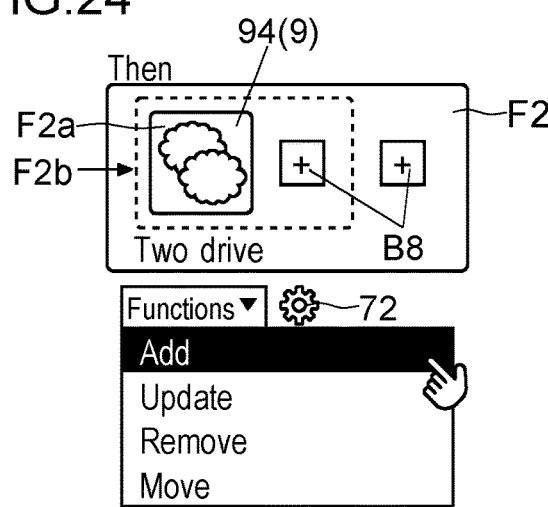
FIG. 24 is a diagram showing one example of setting of a second process according to the embodiment.

By operating the second image 92, the third image 93, or the fourth image 94, it is possible to set a network storage service (an application for using a network storage service) as a second target. FIG. 24 shows one example of second processes selectable when a network storage service is set as a second target. For example, adding, updating, deleting, or moving of data can be set as a second process. Here, the data may be a file or a folder. In this case, a workflow 5 is generated that, when the if-condition is met, with respect to the data used in the first process, data is added, updated, deleted, or moved on the network storage service. Second processes selectable for the network storage service may be limited according to the first target and the first process that are set.

Figure 25:
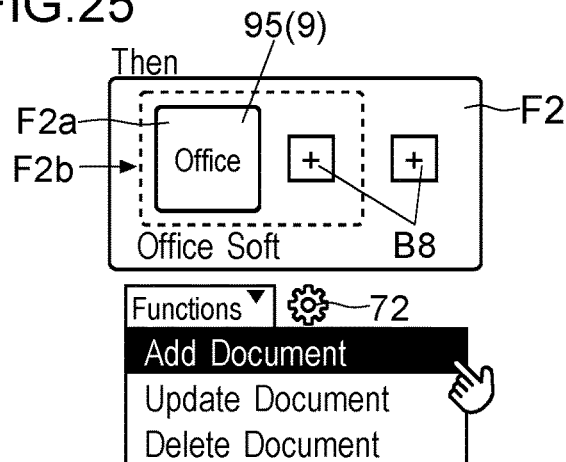
FIG. 25 is a diagram showing one example of setting of a second process according to the embodiment.

By operating the fifth image 95, it is possible to set software 25 as a second target. FIG. 25 shows one example of second processes selectable when word-processing software is set as a second target. For example, it is possible to set adding (saving as new), updating (overwriting), or deleting of a document file as a second target. In this case, a workflow 5 is generated that, when the if-condition is met, with respect to the data used in the first process, a document file is automatically added, updated, or deleted. Second processes selectable for software 25 may be limited according to the first target and the first process that are set.

Figure 26:
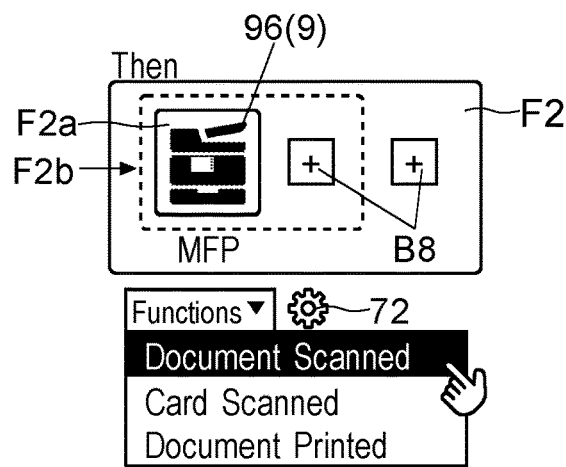
FIG. 26 is a diagram showing one example of setting of a second process according to the embodiment.

By operating the sixth image 96, it is possible to set an image forming apparatus 3 as a second target. FIG. 26 shows one example of second processes selectable when an image forming apparatus 3 is set as a second target. For example, it is possible to set reading of a document, reading of a card, and printing of a document as a second process. In this case, a workflow 5 is generated that, when the if-condition is met, the image forming apparatus 3 automatically performs reading of a document, reading of a card, or printing of a document. Second processes selectable for the image forming apparatus 3 may be limited according to the first target and the first process that are set.

Figure 27:
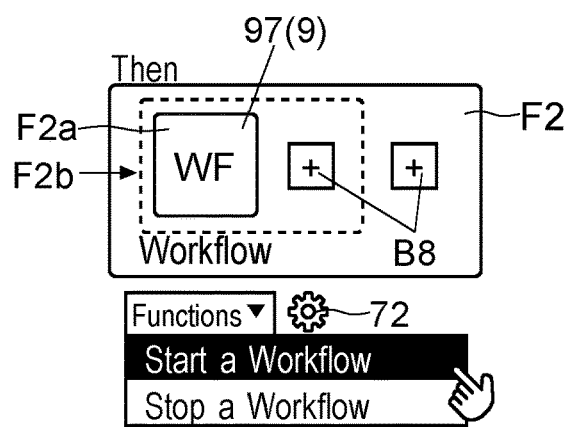
FIG. 27 is a diagram showing one example of setting of a second process according to the embodiment.

By operating the seventh image 97, it is possible to set a registered workflow 5 as a second target. FIG. 27 shows one example of second processes selectable when a registered workflow 5 is set as a second target. For example, starting and stopping of the operation of the workflow 5 can be set as a second process. In this case, a workflow 5 is generated that, when the if-condition is met, automatically runs or stops a workflow 5.

(Detailed Setting of a First Target)

Next, with reference to FIGS. 28 to 31, one example of detailed setting of a first target according to the embodiment will be described. FIGS. 28 to 31 are diagrams showing one example of detailed setting of a first target according to the embodiment.

The information processing apparatus 1 (first controller 10) makes the display input apparatus 2 display, within the creation screen 63, a first setting image 71 for setting the details of the first target. The first setting image 71 is arranged under the If area F1 (see FIGS. 10 to 13 and 18 to 22). One first setting image 71 is arranged for each first target setting area F1*a*. The first setting image 71 is arranged to the right of the first selection field 81. The image like a gear shown in FIGS. 10 to 13 and 18 to 22 is the first setting image 71.

A user operates the first setting image 71. Thereby the details of the first target set in the first target setting area F1*a* corresponding to the first setting image 71 can be specified. When the first setting image 71 is operated, the display input apparatus 2 (second controller 20) displays a trigger setting screen 64 on the display 22. For example, the trigger setting screen 64 pops up on the creation screen 63. The content of the trigger setting screen 64 varies depending on the set first target.

Figure 28:
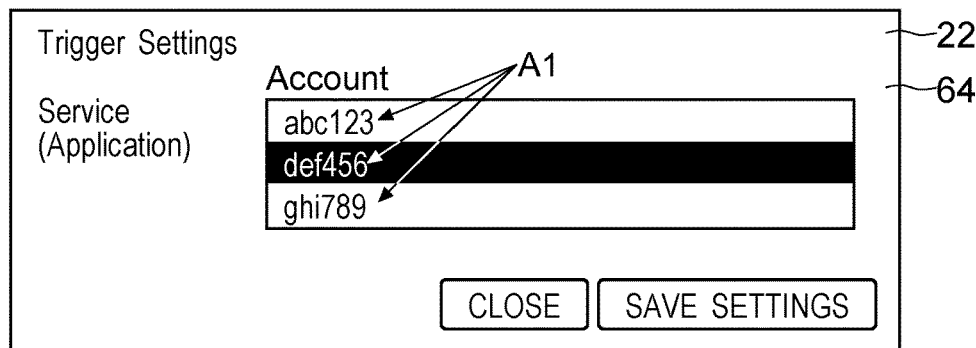
FIG. 28 is a diagram showing one example of detailed setting of a first target according to the embodiment.

The display input apparatus 2 accepts setting for specifying a service as a first target. FIG. 28 shows one example of the trigger setting screen 64 when a contact management service and a network storage service (software 25 for using a network storage service) are set as first targets. Use of various kinds of services on the Internet typically requires account information for logging in. The display input apparatus 2 (input device 23) accepts setting of first account information A1 required for monitoring (detecting) whether a set first process has been performed using a set first target.

The account information and the password required for each service are stored in the second storage medium 21 in advance. The display input apparatus 2 (second controller 20) displays the account information of a creator on the trigger setting screen 64. Here, the display input apparatus 2 (second controller 20) does not display a password. The creator selects the account information corresponding to the first target to be used. The display input apparatus 2 (second controller 20) makes the second communication circuit 24 transmit to the information processing apparatus 1 (first communication circuit 12) the first account information A1 based on the setting. The first account information A1 includes the selected account information and the password for logging in with the selected account information. The information processing apparatus 1 (first controller 10) generates a workflow 5 including the received first account information A1 (see FIG. 2). The first account information A1 is attached to the workflow 5 as information related to a first target and a first process.

Figure 29:
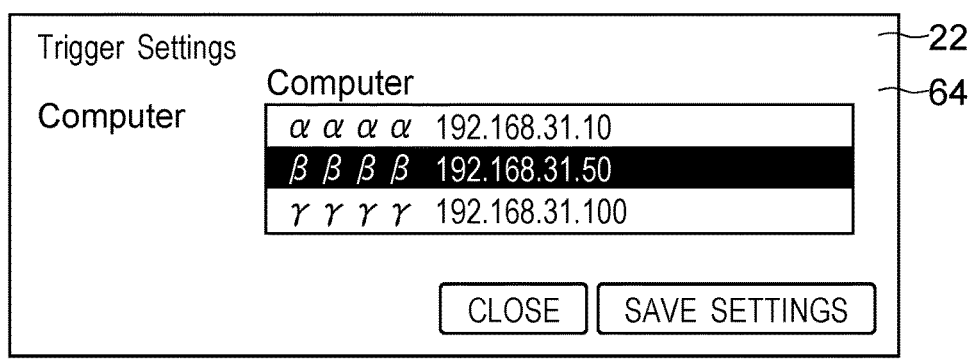
FIG. 29 is a diagram showing one example of detailed setting of a first target according to the embodiment.

The display input apparatus 2 accepts setting for specifying software 25 as a first target. FIG. 29 shows one example of the trigger setting screen 64 when software 25 is set as a first target. It is necessary to specify, of the display input apparatuses 2 (computers) connected to the local network (LAN), the display input apparatus 2 that monitors whether a first process has been performed. The display input apparatus 2 (input device 23) accepts setting for specifying the display input apparatus 2 that monitors (detects) whether a first process has been performed.

Figure 30:
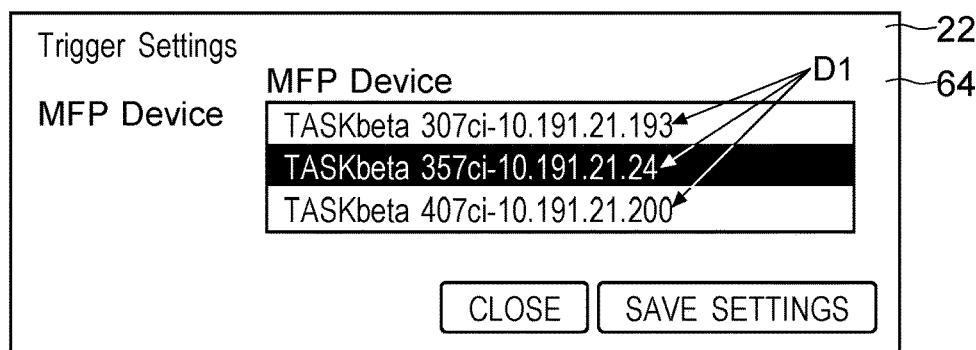
FIG. 30 is a diagram showing one example of detailed setting of a first target according to the embodiment.

The display input apparatus 2 accepts setting for specifying an image forming apparatus 3 as a first target. FIG. 30 shows one example of the trigger setting screen 64 when an image forming apparatus 3 is set as a first target. In some cases, a plurality of image forming apparatuses 3 are connected to the local network (LAN) to which the display input apparatus 2 belongs. It is necessary to specify the image forming apparatus 3 on which a first process is performed. The display input apparatus 2 (input device 23) accepts setting for specifying the image forming apparatus 3 on which whether a first process has been performed is monitored (detected).

The display input apparatus 2 (second controller 20) makes the second communication circuit 24 search for image forming apparatuses 3 connected to the network. The display input apparatus 2 (second controller 20) displays information on the detected image forming apparatuses 3 on the trigger setting screen 64. FIG. 30 shows an example where the names and the IP addresses of image forming apparatuses 3 are displayed. A creator selects, on the trigger setting screen 64, the image forming apparatus 3 for monitoring. The display input apparatus 2 (second controller 20) makes the second communication circuit 24 transmit to the information processing apparatus 1 (first communication circuit 12) first device information D1 that indicates the selected image forming apparatus 3. The information processing apparatus 1 (first controller 10) generates a workflow 5 including the first device information D1. The first device information D1 is attached to the workflow 5 as information related to a first target and a first process. In the workflow 5, the image forming apparatus 3 handled as a first target is specified.

Figure 31:
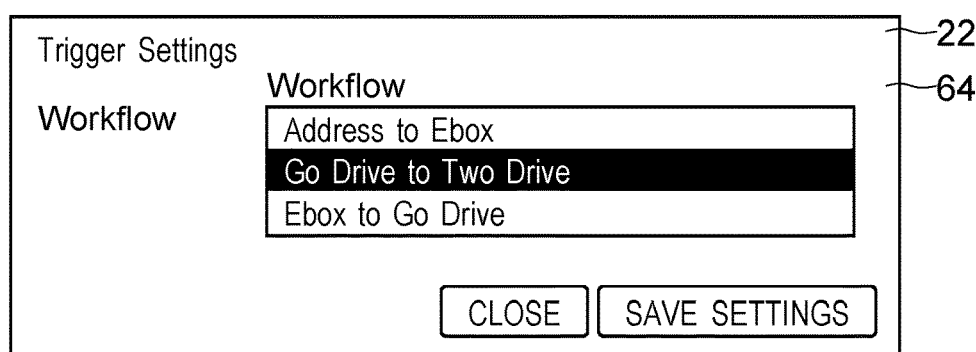
FIG. 31 is a diagram showing one example of detailed setting of a first target according to the embodiment.

The display input apparatus 2 accepts setting for specifying a workflow 5 as a first target. FIG. 31 shows one example of the trigger setting screen 64 when a workflow 5 is set as a first target. Generated workflows 5 are stored in the information processing apparatus 1. It is necessary to specify the workflow 5 that is used as a first target. The display input apparatus 2 (input device 23) accepts setting for specifying the workflow 5 of which the success or failure of execution is monitored (detected).

The display input apparatus 2 (second controller 20) makes the second communication circuit 24 acquire the names of workflows 5 from the information processing apparatus 1 (first communication circuit 12). The display input apparatus 2 (second controller 20) displays the names of the acquired workflows 5 on the trigger setting screen 64. FIG. 31 shows an example where the names of workflows 5 are displayed. A creator selects, on the trigger setting screen 64, the workflow 5 to be used. The display input apparatus 2 (second controller 20) makes the second communication circuit 24 transmit to the information processing apparatus 1 (first communication circuit 12) the name of the selected workflow 5. The information processing apparatus 1 (first controller 10) generates a workflow 5 that includes the name of the selected workflow 5. The name of the selected workflow 5 is attached to the workflow 5 to be generated as information related to a first target and a first process. In the workflow 5, the registered workflow 5 to be handled as a first target is specified.

(Detailed Setting of a Second Target)

Next, with reference to FIGS. 32 to 35, one example of detailed setting of a second target according to the embodiment will be described. FIGS. 32 to 35 are diagrams showing one example of detailed setting of a second target according to the embodiment.

By operating an icon image 9, it is possible to set a second target. The information processing apparatus 1 (first controller 10) makes the display input apparatus 2 display, within the creation screen 63, a second setting image 72 for setting the details of the second target. The second setting image 72 is arranged under the Then area F2 (see FIGS. 14 to 17 and 23 to 27). One second setting image 72 is arranged for each second target setting area F2a. The second setting image 72 is arranged to the right of the second selection field 82. The image like a gear shown in FIGS. 14 to 17 and 23 to 27 is the second setting image 72.

A user operates the second setting image 72. Thereby the details of the second target set in the second target setting area F2a that corresponds to the second setting image 72 can be specified. When the second setting image 72 is operated, the display input apparatus 2 (second controller 20) displays an action setting screen 65 on the display 22. For example, the action setting screen 65 pops up on the creation screen 63. The content of the action setting screen 65 varies depending on the set second target.

Figure 32:
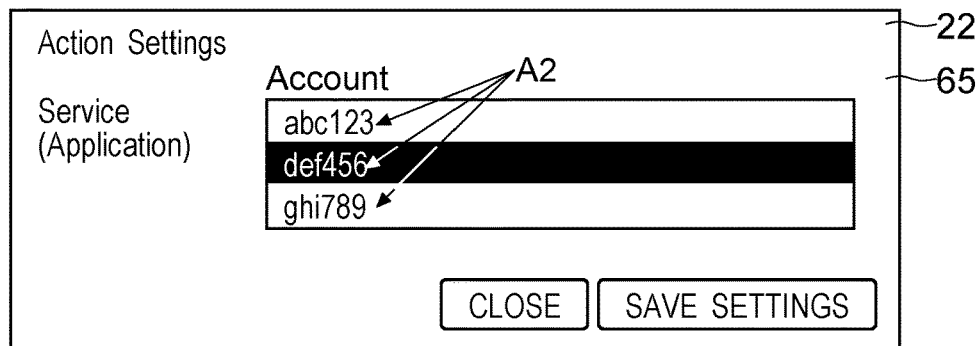
FIG. 32 is a diagram showing one example of detailed setting of a second target according to the embodiment.

The display input apparatus 2 accepts setting for specifying a service as a second target. FIG. 32 shows one example of the action setting screen 65 when a contact management service and a network storage service are set as second targets. Use of various kinds of services on the Internet typically requires account information for logging in. The display input apparatus 2 (input device 23) accepts setting of second account information A2 required for performing a set second process using a set second target.

The display input apparatus 2 (second controller 20) displays the account information of a creator on the action setting screen 65. The creator selects the account information corresponding to the second target to be used. The display input apparatus 2 (second controller 20) makes the second communication circuit 24 transmit the set second account information A2 to the information processing apparatus 1 (first communication circuit 12). The second account information A2 includes the selected account information and the password for logging in with the selected account information. The information processing apparatus 1 (first controller 10) generates a workflow 5 including the received second account information A2 (see FIG. 2). The second account information A2 is attached to the workflow 5 as information related to a second target and a second process. The information processing apparatus 1 (first controller 10) performs the second process using the second account information A2.

Figure 33:
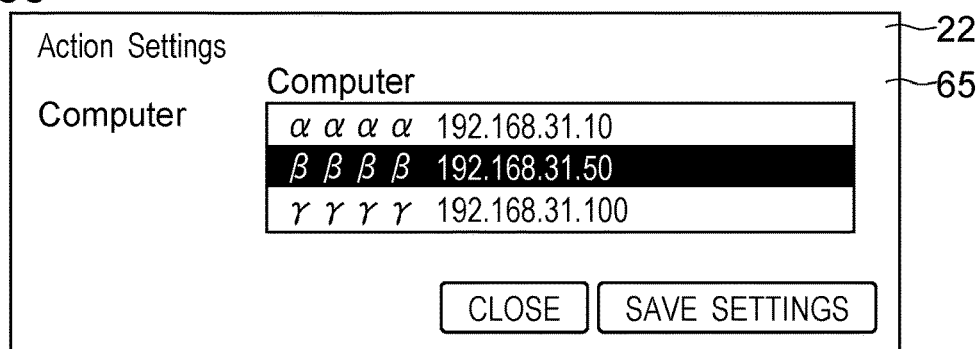
FIG. 33 is a diagram showing one example of detailed setting of a second target according to the embodiment.

The display input apparatus 2 accepts setting for specifying software 25 as a second target. FIG. 33 shows one example of the action setting screen 65 when software 25 is set as a second target. It is necessary to specify the display input apparatus 2 that performs a second process. The display input apparatus 2 (input device 23) accepts setting for specifying the display input apparatus 2 that performs the set second process.

Figure 34:
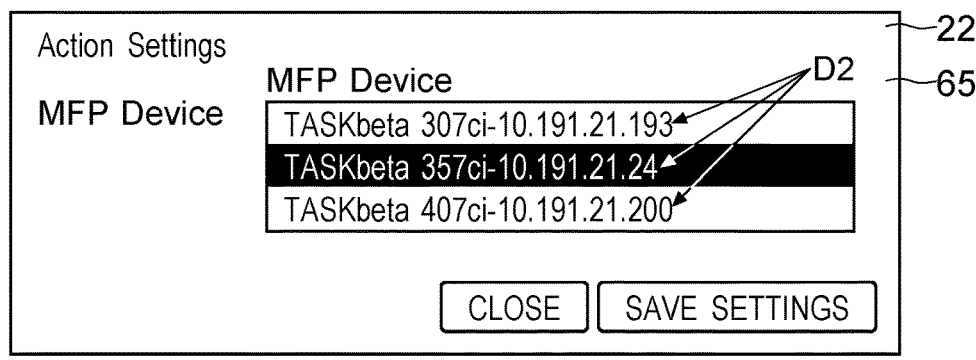
FIG. 34 is a diagram showing one example of detailed setting of a second target according to the embodiment.

The display input apparatus 2 accepts setting for specifying an image forming apparatus 3 as a second target. FIG. 34 shows one example of the action setting screen 65 when an image forming apparatus 3 is set as a second target. It is necessary to specify the image forming apparatus 3 on which a second process is performed. The display input apparatus 2 (input device 23) accepts setting for specifying the image forming apparatus 3 on which the set second process is performed.

The display input apparatus 2 (second controller 20) makes the second communication circuit 24 search for image forming apparatuses 3 connected to the network. The display input apparatus 2 (second controller 20) displays information on the detected image forming apparatuses 3 on the action setting screen 65. FIG. 34 shows an example where the names and the IP addresses of image forming apparatuses 3 are displayed. A creator selects, on the action setting screen 65, the image forming apparatus 3 on which the second process is performed. The display input apparatus 2 (second controller 20) makes the second communication circuit 24 transmit the second device information D2 indicating the selected image forming apparatus 3 to the information processing apparatus 1 (first communication circuit 12). The information processing apparatus 1 (first controller 10) generates a workflow 5 including the second device information D2. The second device information D2 is attached to the workflow 5 as information related to a second target and a second process. In the workflow 5, the image forming apparatus 3 handled as a second target is specified. The information processing apparatus 1 (first controller 10) makes the image forming apparatus 3 (third controller 30) perform the second process.

Figure 35:
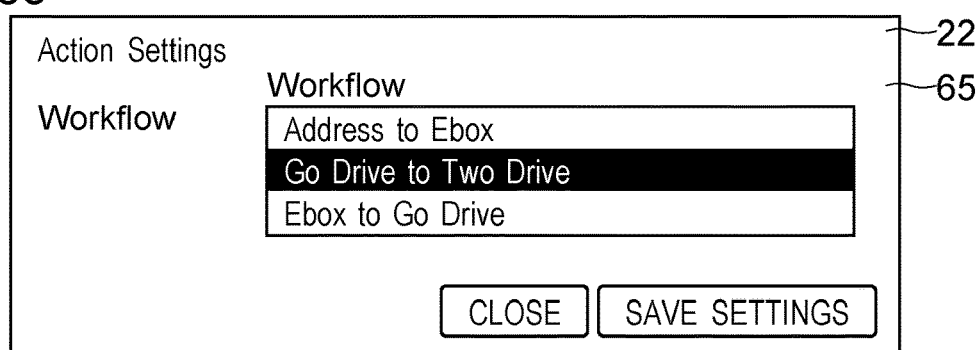
FIG. 35 is a diagram showing one example of detailed setting of a second target according to the embodiment.

The display input apparatus 2 accepts setting for specifying a workflow 5 as a second target. FIG. 35 shows one example of the action setting screen 65 when a workflow 5 is set as a second target. It is necessary to specify the workflow 5 that is used as a second target. The display input apparatus 2 (input device 23) accepts setting for specifying the workflow 5 of which the success or failure of execution is monitored (detected).

The display input apparatus 2 (second controller 20) makes the second communication circuit 24 acquire from the information processing apparatus 1 (first communication circuit 12) the names of the workflows 5 created by an authenticated user. The display input apparatus 2 (second controller 20) displays the names of the acquired workflows 5 on the action setting screen 65. FIG. 35 shows an example where the names of workflows 5 are displayed. A creator selects, on the action setting screen 65, the workflow 5 to be used. The display input apparatus 2 (second controller 20) makes the second communication circuit 24 transmit to the information processing apparatus 1 (first communication circuit 12) the name of the selected workflow 5. The information processing apparatus 1 (first controller 10) generates a workflow 5 that includes the name of the selected workflow 5. The name of the selected workflow 5 is attached to the workflow 5 to be generated as information related to a second target and a second process. In the workflow 5, the registered workflow 5 handled as a second target is specified.

(Setting of the Name of a Workflow 5)

Figures 36, 37, 38:
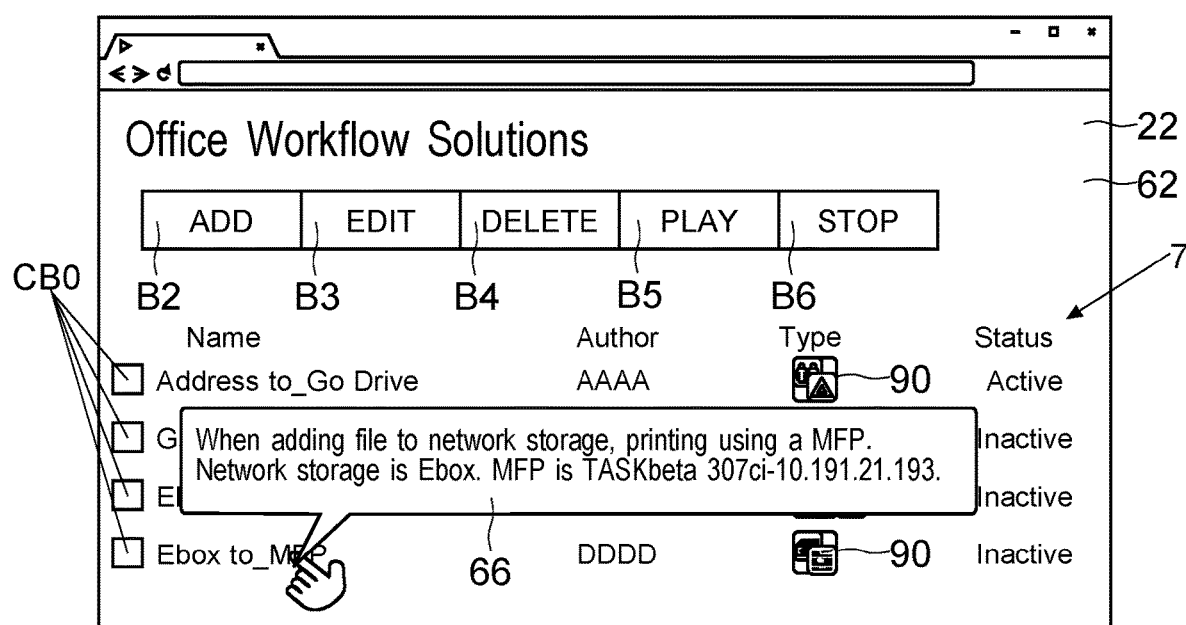
FIG. 36 is a diagram showing an example of a workflow name automatically generated by the information processing apparatus according to the embodiment.
FIG. 37 is a diagram showing an example of a workflow description automatically generated by the information processing apparatus according to the embodiment.
FIG. 38 is a diagram showing one example of use of a workflow description according to the embodiment.

Next, with reference to FIGS. 9 and 36, one example of setting of the name of a workflow 5 according to the embodiment will be described. FIG. 36 is a diagram showing an example of the names of workflows 5 automatically generated by the information processing apparatus 1 according to the embodiment.

As shown in FIG. 9, the information processing apparatus 1 (first controller 10) makes the display input apparatus 2 (display 22) display a workflow name entry field T3. The workflow name entry field T3 is provided under the Then area F2 in the creation screen 63. The workflow name entry field T3 is a field for entering the name of a workflow 5.

A user can enter characters and symbols in the workflow name entry field T3 using the input device 23 such as a keyboard. The display input apparatus 2 (input device 23) accepts entry of the name of a workflow 5. When the name of the workflow 5 is manually entered, the display input apparatus 2 (second controller 20) makes the second communication circuit 24 transmit the entered name of the workflow 5 to the information processing apparatus 1 (first communication circuit 12). On receiving the name of the workflow 5, the information processing apparatus 1 (first controller 10) generates and stores a workflow 5 that has been assigned the entered name of the workflow 5.

Some users find it troublesome to enter the name of a workflows 5 every time required. To cope with that, it is also possible to generate the name of a workflow 5 automatically. Based on the workflow management software 15, the information processing apparatus 1 (first controller 10) automatically generates the name of a workflow 5. The first controller 10 assigns the automatically generated name to the workflow 5 to be generated.

The information processing apparatus 1 (first controller 10) makes the display input apparatus 2 display a first check box CB1 over the workflow name entry field T3. To automatically generate the name of a workflow 5, the creator of the workflow 5 checks the first check box CB1. When the Save button B7 is operated, the display input apparatus 2 (second controller 20) notifies the first communication circuit 12 that the first check box CB1 has been checked. On receiving the notification, the first controller 10 generates the name of the workflow 5 automatically. When the Save button B7 is operated with no characters or symbols entered in the workflow name entry field T3, the second controller 20 notifies the first communication circuit 12 that there are no characters or symbols in the workflow name entry field T3. Even in this case, the first controller 10 generates the name of the workflow 5 automatically.

The information processing apparatus 1 (first controller 10), based on a prescribed rule, generates the name of a workflow 5 automatically. FIG. 36 shows an example of the names of workflows 5 that are generated automatically. As shown in FIG. 36, the information processing apparatus 1 (first controller 10) may be configured to generate automatically the name of a workflow 5 which includes the name, or an abbreviation of it, of the first target defined in the workflow 5. The first controller 10 may be configured to generate automatically the name of a workflow 5 which includes the name, or an abbreviation of it, of the second target defined in the workflow 5. FIG. 36 shows an example where an underscore, a yen symbol, a vertical bar, an equal sign, a plus sign, and a hyphen are used as symbols to connect together different pieces of information. Any symbols other than the ones shown in FIG. 36 may be used.

In FIG. 36, (Example1) is an example where the names of a first and a second target are connected together with "to"; (Example2) is an example where the names of a first and a second target are connected together with underscores; (Example3) is an example where the abbreviated names of a first and a second target are connected together with underscores; (Example4) is an example where the abbreviated names of a first and a second target are connected together with an "and"; and (Example5) is an example where the abbreviated names of a plurality of first targets are connected together with plus signs and the abbreviated names of a plurality of second targets are also connected together with plus signs and an equal sign is arranged between those first and second targets.

As shown in FIG. 36, the information processing apparatus 1 (first controller 10) may be configured to include the creation date and time in the automatically generated name of a workflow 5. For recognition of the creation date and time, the first controller 10 includes a clock circuit 10a (see FIG. 2). The clock circuit 10a counts time. The clock circuit 10a keeps the current year, month, day, and time. In FIG. 36, (Example2), (Example3), and (Example5) are examples where the creation year, month, and day are appended to the tail of the name of a workflow 5 and (Example4) is an example where the creation month and date are appended.

When a workflow 5 is created, entry of a user name and a password is required. The information processing apparatus 1 (first controller 10) recognizes the creators of workflows 5. Thus, as shown in FIG. 36, the first controller 10 may be configured to generate automatically the name of a workflow 5 which includes one or both of the name and the ID of the creator (authenticated user). In FIG. 36, (Example2) is an example where the ID and the name of a creator are included in the name of a workflows 5; (Example3) is an example where only the ID of an authenticated user is included in the name of a workflows 5; and (Example4) and (Example5) are examples where only the name of a creator is included in the name of a workflows 5.

In this way, the information processing apparatus 1 (first controller 10) automatically generates the name of a workflow 5 which includes a plurality of pieces of information on the workflow 5. The first controller 10 automatically generates the name of a workflow 5 in which different pieces of information are connected together with a prescribed symbol. In this way, it is possible to automatically generate the name of a workflow 5 based on the content and the attributes of the workflow 5. It is also possible to automatically generate a name that suggests the content.

(Settings of a Description)

Next, with reference to FIGS. 9, 37, and 38, one example of setting of the description of a workflows 5 according to the embodiment will be described. FIG. 37 is a diagram showing one example of the description of a workflow 5 automatically generated by the information processing apparatus 1 according to the embodiment. FIG. 38 is a diagram showing one example of use of the description of a workflow 5 according to the embodiment.

As shown in FIG. 9, the information processing apparatus 1 (first controller 10) makes the display input apparatus 2 (display 22) display a description entry field T4. The description entry field T4 is arranged under the workflow name entry field T3 on the creation screen 63. The description entry field T4 is a field for entering the description of a workflow 5.

A creator can enter characters and symbols in the description entry field T4 using the input device 23 such as a keyboard. It is possible to enter characters and symbols for describing the content of the workflow 5. The display input apparatus 2 (input device 23) accepts entry of a description. When a description is manually entered, the display input apparatus 2 (second controller 20) makes the second communication circuit 24 transmit to the information processing apparatus 1 (first communication circuit 12) the characters and symbols entered as the description. On receiving the description, the information processing apparatus 1 (first controller 10) generates and stores a workflow 5 that has been assigned the entered description.

Here, in the information processing system 100, it is possible to generate a description automatically. Based on the workflow management software 15, the information processing apparatus 1 (first controller 10) generates a description automatically. The first controller 10 assigns the automatically generated description to the workflow 5 to be generated.

The information processing apparatus 1 (first controller 10) makes the display input apparatus 2 display a second check box CB2 over the description entry field T4. To automatically generate a description, the creator of a workflow 5 checks the second check box CB2. When the Save button B7 is operated, the display input apparatus 2 (second controller 20) notifies the information processing apparatus 1 (first communication circuit 12) that the second check box CB2 has been checked. On receiving the notification, the first controller 10 generates a description automatically. When the Save button B7 is operated with no characters or symbols entered in the description entry field T4, the display input apparatus 2 (second controller 20) notifies the information processing apparatus 1 (first communication circuit 12) that there are no characters or symbols in the description entry field T4. Even in this case, the first controller 10 generates a description automatically.

The information processing apparatus 1, based on a prescribed rule, generates a description automatically. FIG. 37 shows an example of a description that is generated automatically. As shown in FIG. 37, the information processing apparatus 1 (first controller 10) generates automatically a text that describes the first and second targets and the first and second processes that are defined in the workflow 5. The format of the text may be prescribed. The first controller 10 may include in the description the account information required for using the first and second targets defined in the workflow 5.

FIG. 38 shows one example of use of the description of a workflow 5. FIG. 38 is one example of the top page 62. When a screen (list 7) that includes the name of a workflow 5 is displayed, the information processing apparatus 1 (first controller 10) makes the first communication circuit 12 transmit to the display input apparatus 2 (second communication circuit 24) the description of the workflow 5 along with its name.

When a pointer is placed on the name of a workflow 5, the display input apparatus 2 (second controller 20) makes the display 22 display the description of the workflow 5 that corresponds to the name of the operated workflow 5. When the input device 23 is a touch panel, the display input apparatus 2 (second controller 20) makes the display 22 display the description of the workflow 5 that corresponds to the name of the workflow 5 being touched. FIG. 38 shows an example where a balloon 66 that includes a description is displayed. The second controller 20 may make the display 22 display a description also on the trigger setting screen 64 (see FIG. 31) for selecting a workflow 5 and on the action setting screen 65 (see FIG. 35).

(Generation of a Coupled Image 90)

Next, with reference to FIGS. 39 to 42, one example of generation of a coupled image 90 by the information processing apparatus 1 according to the embodiment will be described. FIGS. 39 to 42 are diagrams showing one example of coupled images 90 according to the embodiment.

Based on the workflow management software 15, the information processing apparatus 1 (first controller 10) generates a workflow 5. When a workflow 5 is generated, the first controller 10 generates a coupled image 90. The coupled image 90 is an image resulting from combining together a first icon image 9a and a second icon image 9b. The first icon image 9a represents a first target. The second icon image 9b represents a second target.

Figure 39:
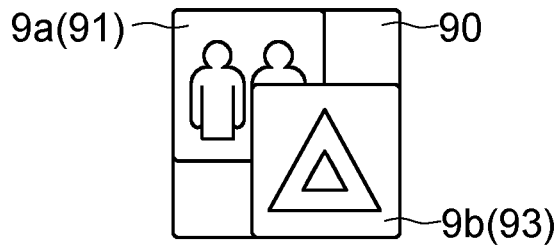
FIG. 39 is a diagram showing one example of a coupled image according to the embodiment.

FIG. 39 shows one example of the coupled image 90. The information processing apparatus 1 (first controller 10) generates a coupled image 90 that includes an outer frame, a first icon image 9a, and a second icon image 9b. The first icon image 9a and the second icon image 9b are arranged inside the outer frame. The coupled image 90 includes a plurality of icon images 9. The coupled image 90 can be understood as an image resulting from consolidating a plurality of icon images 9 into a single image.

In a workflow 5, a plurality of first targets can be included. When a workflow 5 includes a plurality of first targets, the information processing apparatus 1 (first controller 10) selects the icon image 9 that corresponds to one of the plurality of first targets. For example, the first controller 10 selects, of the plurality of first targets set on the creation screen 63, the one set in the first target setting area F1a at the head. The icon image 9 that corresponds to the selected first target is taken as the first icon image 9a.

It is also possible to include a plurality of second targets in a workflow 5. When a workflow 5 includes a plurality of second targets, the information processing apparatus 1 (first controller 10) selects the icon image 9 that corresponds to one of the plurality of second targets. For example, the first controller 10 selects, of the plurality of second targets set on the creation screen 63, the one set in the second target setting area F2a at the head. The icon image 9 that corresponds to the selected second target is taken as the second icon image 9b.

The information processing apparatus 1 (first controller 10) generates a coupled image 90 in which the first icon image 9a is arranged to the left of the second icon image 9b. The first controller 10 generates a coupled image 90 in which the first icon image 9a is arranged over the second icon image 9b. The first controller 10 generates a coupled image 90 in which parts of the first and second icon images 9a and 9b overlap with each other. The first controller 10 generates a coupled image 90 in which the first icon image 9a is arranged in a layer lower than the second icon image 9b.

The information processing apparatus 1 (first controller 10) may generate a coupled image 90 with a particular image attached to it. A particular image is an image for emphasizing the use of a particular target. For a particular image, the icon image 9 of the target to be emphasized can be used. For example, to emphasize the use of an image forming apparatus 3, the icon image 9 that represents the image forming apparatus 3 may be used as a particular image.

Figure 40:
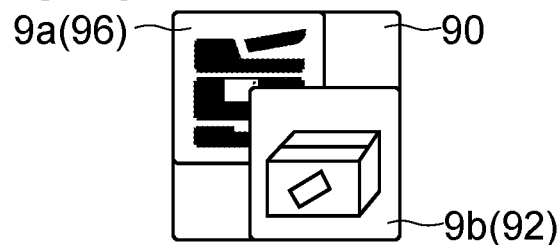
FIG. 40 is a diagram showing one example of a coupled image according to the embodiment.
Figure 41:
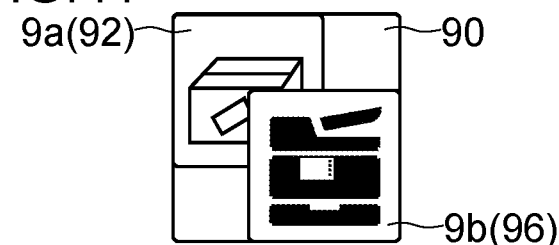
FIG. 41 is a diagram showing one example of a coupled image according to the embodiment.
Figure 42:
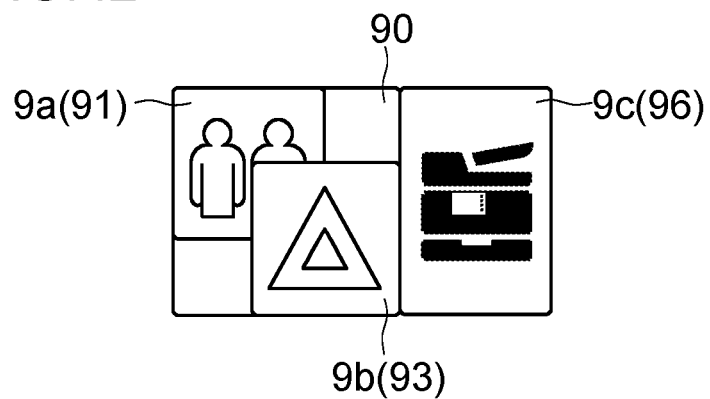
FIG. 42 is a diagram showing one example of a coupled image according to the embodiment.

FIG. 40 shows one example of the coupled image 90 generated when the only first target is the image forming apparatus 3. In this case, the information processing apparatus 1 (first controller 10) sets an image representing the image forming apparatus 3 as the first icon image 9a. FIG. 41 shows one example of the coupled image 90 generated when the only second target is the image forming apparatus 3. In this case, the first controller 10 sets an image representing the image forming apparatus 3 as the second icon image 9b. FIG. 42 shows one example of the coupled image 90 generated when a plurality of first or second targets are involved and the inclusion of the image forming apparatus 3 in the plurality of first or second targets is emphasized. In this case, the first controller 10 generates a coupled image 90 with a particular image 9c attached to the right of the outer frame. For the particular image 9c, an icon image 9 (9b) representing the image forming apparatus 3 may be used. The first controller 10 generates a coupled image 90 including three icon images 9.

A plurality of first targets may be included. To emphasize that the image forming apparatus 3 is included among the first targets, the first controller 10 may generate a coupled image 90 with a particular image 9c attached to the left of the outer frame. To emphasize that the image forming apparatus 3 is included in a plurality of second targets, the first controller 10 may generate a coupled image 90 with a particular image 9c attached to the right of the outer frame.

The information processing apparatus 1 (first controller 10) makes the first storage medium 11 store the generated coupled image 90 in a non-volatile manner. The first controller 10 stores the coupled image 90 in association with the corresponding workflow 5.

(Display of Coupled Images 90 and Decoupled Images 99)

Figure 43:
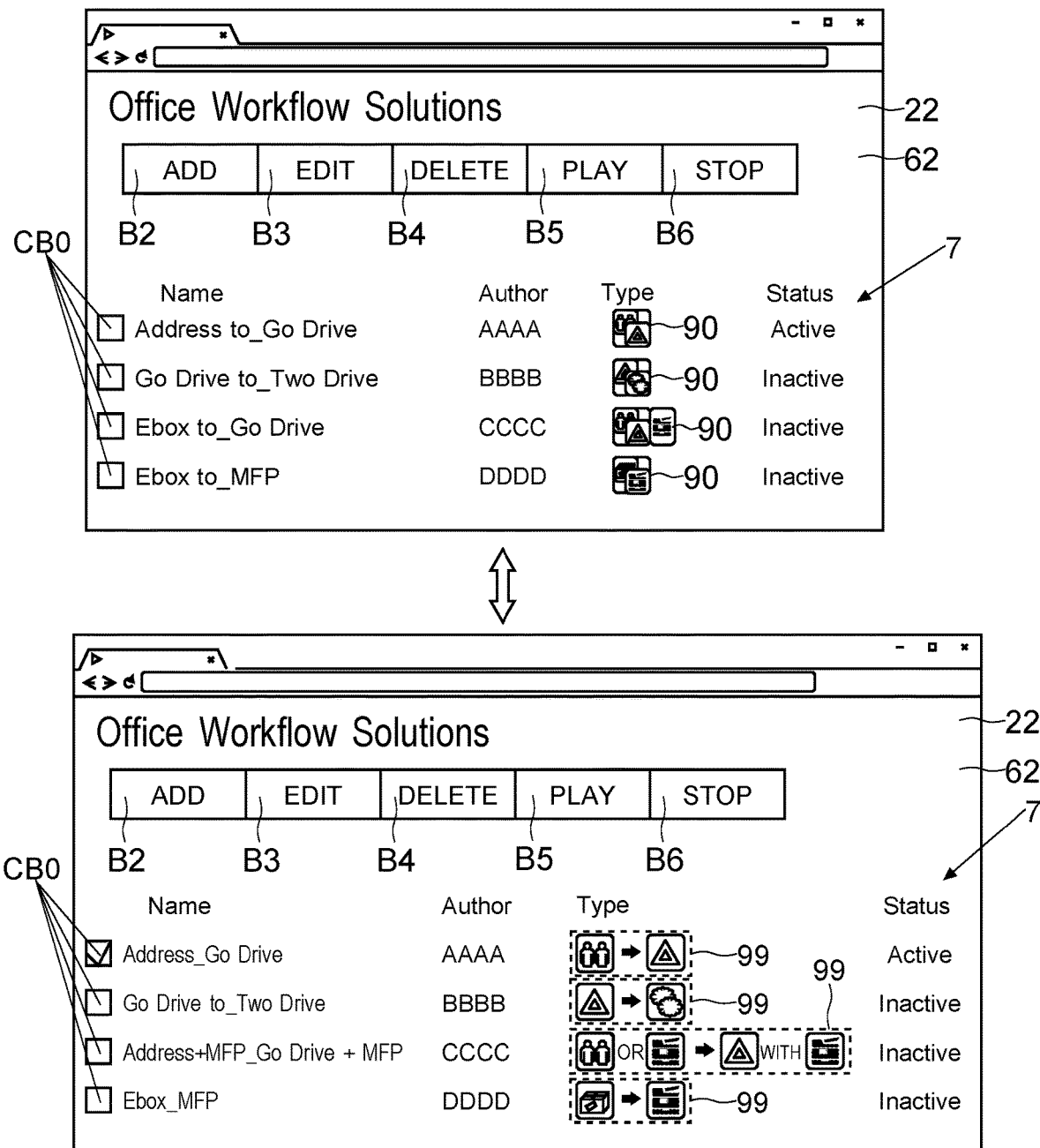
FIG. 43 is a diagram showing one example of a list according to the embodiment.
Figure 44:
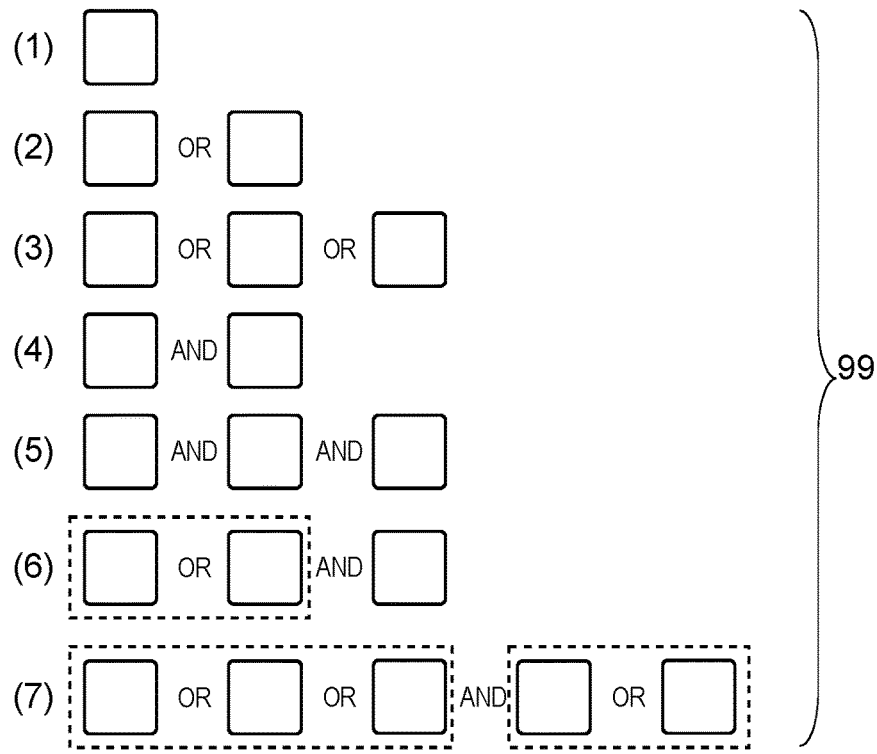
FIG. 44 is a diagram showing one example of a decoupled image according to the embodiment.
Figure 45:
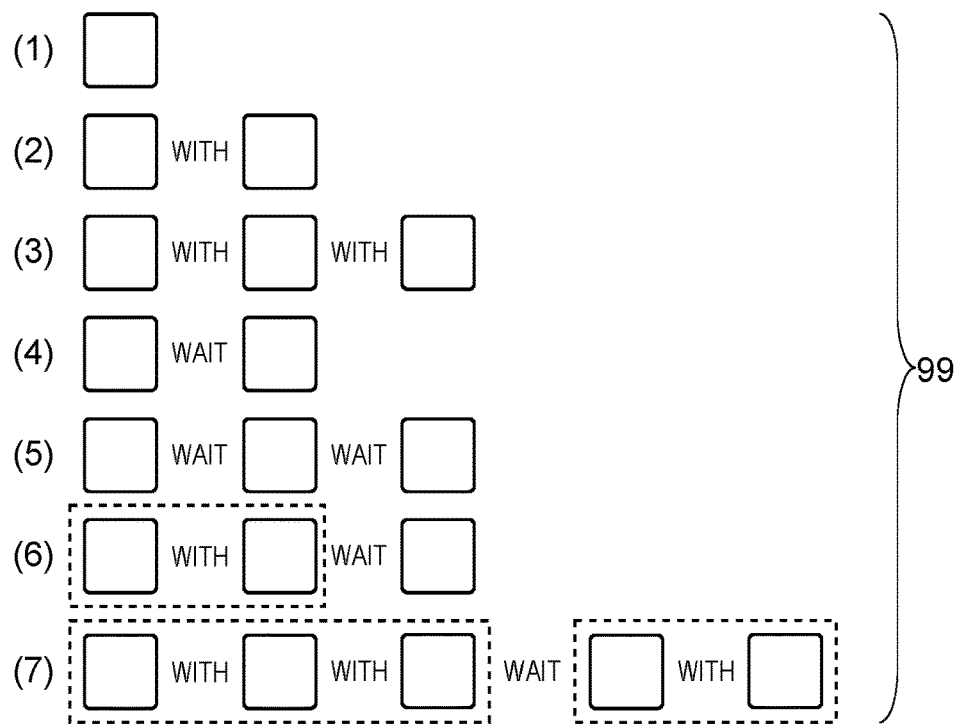
FIG. 45 is a diagram showing one example of a decoupled image according to the embodiment.

Next, with reference to FIGS. 43 to 45, one example of display of coupled images 90 and decoupled images 99 according to the embodiment will be described. FIG. 43 is a diagram showing one example of a list 7 according to the embodiment. FIGS. 44 and 45 are diagrams showing one example of decoupled images 99 according to the embodiment.

The information processing apparatus 1 communicates with the display input apparatus 2 to recognize who an authenticated user is. The information processing apparatus 1 (first controller 10) transmits display data to the display input apparatus 2 (second communication circuit 24) being used by the authenticated user. As a result, the display input apparatus 2 (second controller 20) makes the display 22 display the top page 62 (see FIG. 7).

As shown in FIGS. 7 and 43, the information processing apparatus 1 (first controller 10) makes the display input apparatus 2 (display 22) display a list 7. The list 7 is a list of registered (created) workflows 5. The first controller 10 makes the first communication circuit 12 transmit data for displaying the list 7. The first controller 10 may include in the list 7 only the workflows 5 created by the authenticated user.

The list 7 includes a plurality of items. The list 7 includes, in each row, different pieces of information (information corresponding to the items) on one workflow 5. The items include the name, the creator, the type, and the status of the workflow 5. The information processing apparatus 1 (first controller 10) reads the data of each item (the name, the creator, the coupled image 90, and the status of the workflow 5) from the first storage medium 11. The first controller 10 makes the first communication circuit 12 transmit the read data to the display input apparatus 2. Based on the received data, the display input apparatus 2 (second controller 20) makes the display 22 display the list 7.

In the list 7, the display input apparatus 2 (second controller 20) makes the display 22 display coupled images 90. The coupled images 90 are displayed as images indicating the types of workflows 5. The information processing apparatus 1 transmits the image data of the coupled images 90. Based on the image data, the display input apparatus 2 (second controller 20) makes the display 22 display a coupled image 90 in which the first icon image 9a is arranged to the left of the second icon image 9b. The second controller 20 makes the display 22 display a coupled image 90 in which the first icon image 9a is arranged over the second icon image 9b. The second controller 20 makes the display 22 display a coupled image 90 in which parts of the first and second icon images 9a and 9b overlap with each other. The second controller 20 makes the display 22 display a coupled image 90 in which the first icon image 9a is arranged in a layer lower than the second icon image 9b.

With a coupled image 90 alone, it may be difficult to find the type (content) of a workflow 5. To cope with that, a coupled image 90 can be switched to a decoupled image 99. A decoupled image 99 is an image where the icon images 9 representing the first and second targets included in the workflow 5 lie side by side. A decoupled image 99 is an image in which the first and second icon images 9a and 9b lie farther away from each other than in a coupled image 90.

The display input apparatus 2 (input device 23) accepts an operation on a coupled image 90. When a prescribed operation is performed on the coupled image 90, the display input apparatus 2 (second controller 20) makes the display 22 display a decoupled image 99. The second controller 20 displays the decoupled image 99 instead of the coupled image 90. The prescribed operation may be a single click (touch). The prescribed operation may be two successive clicks. Or, the prescribed operation may be a long press.

When a user is authenticated, the information processing apparatus 1 (first controller 10) may transmit data (image data) for displaying the decoupled image 99 to the display input apparatus 2 (second communication circuit 24). Or, when a coupled image 90 is operated, the display input apparatus 2 (second controller 20) may acquire the image data of a decoupled image 99 for each workflow 5 from the information processing apparatus 1.

Also the lower diagram of FIG. 43 shows one example of the top page 62. The lower diagram of FIG. 43 shows an example where decoupled images 99 are displayed instead of coupled images 90. When displaying decoupled images 99, the display input apparatus 2 (second controller 20) shows the icon images 9 (first icon images 9a) corresponding to the first targets side by side. When displaying decoupled images 99, the second controller 20 shows also the icon images 9 (second icon images 9b) corresponding to the second targets side by side. The second controller 20 makes the display 22 display an arrow between the first and second icon images 9a and 9b. The arrow is arranged at a boundary position between the first and second icon images 9a and 9b. The arrow points from the first icon image 9a toward the second icon image 9b.

When a workflow 5 includes a plurality of first targets, the second controller 20 shows a plurality of first icon images 9a side by side. The second controller 20 includes characters representing an OR or AND relationship in the decoupled image 99. When a workflow 5 includes a plurality of second targets, the second controller 20 shows a plurality of second icon images 9b side by side. The second controller 20 includes characters representing a concurrent or sequential relationship in the decoupled image 99. The second controller 20 shows the icon images 9 corresponding to the first and second targets side by side at a predetermined interval. The second controller 20 displays an arrow or a word representing the relationship between the icon images 9.

FIG. 44 shows examples of display of first icon images 9a in decoupled images 99. In the case shown at (1) in FIG. 44, the workflow 5 has one first target 5 set. In the cases shown at (2) to (7) in FIG. 44, the workflow 5 has a plurality of first targets set. In the cases shown at (2) and (3) in FIG. 44, the workflow 5 has a plurality of first targets in an OR relationship. In the cases shown at (4) and (5) in FIG. 44, the workflow 5 has a plurality of first targets in an AND relationship. In the cases shown at (6) and (7) in FIG. 44, the workflow 5 has an OR relationship and an AND relationship combined. The broken lines at (6) and (7) in FIG. 44 indicate first group frames F1b.

FIG. 45 shows examples of display of second icon images 9b in decoupled images 99. In the case shown at (1) in FIG. 45, the workflow 5 has one second target set. In the cases shown at (2) to (7) in FIG. 45, the workflow 5 has a plurality of second targets set. In the cases shown at (2) and (3) in FIG. 45, the workflow 5 has a plurality of second targets in a concurrent relationship. In the cases shown at (4) and (5) in FIG. 45, the workflow 5 has a plurality of second targets in a sequential relationship. In the cases shown at (6) and (7) in FIG. 45, the workflow 5 has a concurrent relationship and a sequential relationship combined. The broken lines at (6) and (7) in FIG. 45 indicate second group frames F2b.

The display input apparatus 2 (input device 23) accepts an operation on a decoupled image 99. When a prescribed operation is performed on a decoupled image 99, the display input apparatus 2 (second controller 20) makes the display 22 display the original coupled image 90. The second controller 20 displays the coupled image 90 instead of the decoupled image 99. For example, the display state in the lower diagram of FIG. 43 changes back to the display state in the upper diagram of FIG. 43.

(Operation on the Top Page 62)

With reference to FIGS. 7 and 43, one example of operations on the top page 62 according to the embodiment will be described. An example of making the display input apparatus 2 display the top page 62 will now be described. The image forming apparatus 3 may be made to display the top page 62. In this case, the user performs on the image forming apparatus 3 (operation panel 33) an operation related to a workflow 5.

The information processing apparatus 1 (first controller 10) makes the display input apparatus 2 display a list 7 on the top page 62. A plurality of buttons are arranged over the list 7. The first controller 10 displays an Add button B2, an Edit button B3, a Delete button B4, a Play button B5, and a Stop button B6. When the Add button B2 is operated, the display input apparatus 2 (second controller 20) makes the display 22 display the creation screen 63 for a workflow 5. From the top page 62, it is possible to proceed to operation for creating a workflow 5.

The content of the workflow 5 can be edited using the Edit button B3. The display input apparatus 2 (input device 23) accepts selection of a workflow 5 included in the list 7. In this case, an authenticated user selects a workflow 5 (registered workflow 5) using the check box CB0 provided at the left end of the list 7.

After a workflow 5 is selected and the Edit button B3 is operated, the display input apparatus 2 (second controller 20) makes the second communication circuit 24 notify the information processing apparatus 1 (first communication circuit 12) of the workflow 5 for which the Edit button B3 has been operated. When notified of the workflow 5 for which the Edit button B3 has been operated, the information processing apparatus 1 (first controller 10) makes the first communication circuit 12 transmit to the display input apparatus 2 the data of the selected workflow 5 and the data for displaying the creation screen 63. Based on the received data, the second controller 20 makes the display 22 display the creation screen 63. The second controller 20 displays on the set creation screen 63 the first target, the first process, the second target, and the second process which correspond to the workflow 5 and the name and the description of the workflow 5. It is thus possible to edit and update (overwrite) the content of the workflow 5.

A workflow 5 can be deleted using the Delete button B4. In this case, an authenticated user selects a workflow 5 (registered workflow 5) using the check box CB0. After a workflow 5 is selected and the Delete button B4 is operated, the display input apparatus 2 (second controller 20) makes the second communication circuit 24 notify the information processing apparatus 1 (first communication circuit 12) of the workflow 5 for which the Delete button B4 has been operated. When notified of the workflow 5 for which the Delete button B4 has been operated, the information processing apparatus 1 (first controller 10) makes the first storage medium 11 delete the selected workflow 5.

It is also possible to switch a workflow 5 between an active state and an inactive state using the Play button B5 and the Stop button B6. After a workflow 5 is selected using the check box CB0, when the Play button B5 is operated, the display input apparatus 2 (second controller 20) makes the second communication circuit 24 notify the information processing apparatus 1 (first communication circuit 12) of the workflow 5 for which the Play button B5 has been operated. When notified of the workflow 5 for which the Play button B5 has been operated, the information processing apparatus 1 (first controller 10) starts operation of the selected workflow 5. The first controller 10 brings the workflow 5 into the active state. The workflow 5 is activated.

After a workflow 5 is selected and the Stop button B6 is operated, the display input apparatus 2 (second controller 20) makes the second communication circuit 24 notify the information processing apparatus 1 (first communication circuit 12) of the workflow 5 for which the Stop button B6 has been operated. When notified of the workflow 5 against which the Stop button B6 has been operated, the information processing apparatus 1 (first controller 10) stops operation of the selected workflow 5. The first controller 10 brings the workflow 5 into the inactive state. The workflow 5 is deactivated.

(Patterns of Processing Achieved with Generated Workflows)

Figure 46:
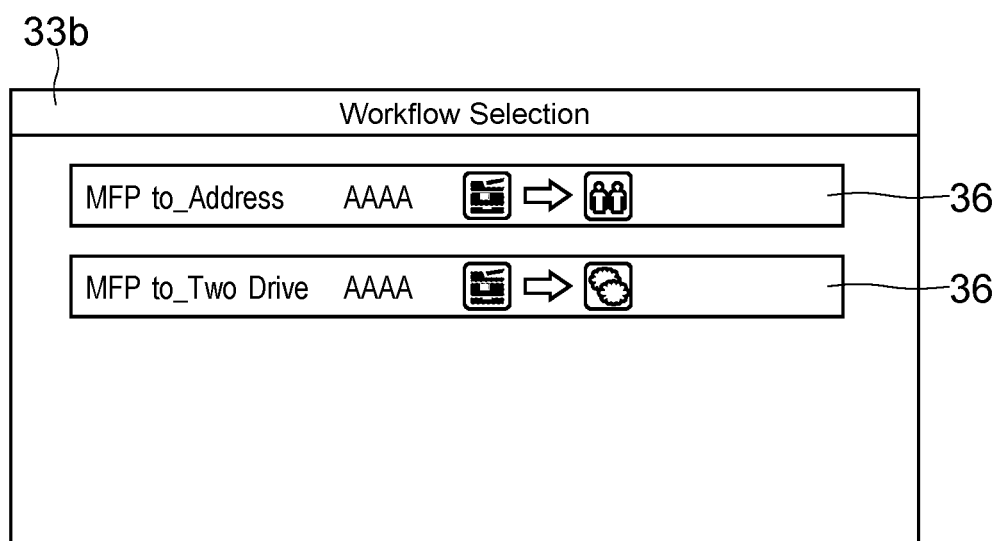
FIG. 46 is a diagram showing one example of selection images according to the embodiment.

With reference to FIG. 46, patterns of coordinated processing by use of a workflow 5 will be described. FIG. 46 is a diagram showing one example of selection images 36 according to the embodiment.

By setting a first target, a first process, a second target, a second process, and their details, it is possible to create a workflow 5 that involves a combination of a service, software 25, an image forming apparatus 3, and a workflow 5. The information processing apparatus 1 (first controller 10) performs processing based on a workflow 5 in the active state. The first controller 10 does not performs processing based on a workflow 5 in the inactive state.

1. When the First Target is a Contact Management Service

The information processing apparatus 1 (first controller 10) identifies a workflow 5 in the active state. The first controller 10 makes the first communication circuit 12 log in to the contact management service defined in the identified workflow 5. The first controller 10 uses the first account information A1 attached to the workflow 5. The first controller 10 logs in to the contact management service periodically. When the first process is adding of a contact, the first controller 10 monitors whether or not the contact has been added. When the first process is updating (editing) of a contact, the first controller 10 monitors whether or not the content of the contact has been updated. When the first process is deleting of a contact, the first controller 10 monitors whether or not the contact has been deleted. For the purpose of monitoring, the first controller 10 may make the first storage medium 11 store the data of the contacts (contacts copy data 16; see FIG. 2) stored on the contact management service.

Logged in to the contact management service, the first controller 10 compares the contact currently stored on the contact management service with the contacts copy data 16. Based on the comparison, the first controller 10 recognizes adding, updating, or deleting of the contact. The first controller 10 may, after a second process, update the contacts copy data 16 in conformity with the adding, updating, or deleting of the contact. In that case, the contacts copy data 16 is the data of the copy of contacts as it was made at the previous login.

2. When the First Target is a Network Storage Service

The information processing apparatus 1 (first controller 10) identifies a workflow 5 in the active state. The first controller 10 makes the first communication circuit 12 log in to the network storage service defined in the identified workflow 5. The first controller 10 uses the first account information A1 attached to the workflow 5. The first controller 10 logs in to the network storage service periodically. When the first process is adding of data, the first controller 10 monitors whether or not the data has been added. When the first process is updating (editing) of data, the first controller 10 monitors whether or not the data has been updated. When the first process is deleting of data, the first controller 10 monitors whether or not the data has been deleted. When the first process is moving of data, the first controller 10 monitors whether or not the data has been moved. For the purpose of monitoring, the first controller 10 may make the first storage medium 11 store the data (files and folders, and storage copy data 17; see FIG. 2) stored on the network storage service.

Logged in to the network storage service, the first controller 10 compares the data currently stored on the network storage service with the storage copy data 17. Based on the comparison, the first controller 10 recognizes that adding, updating, deleting, or moving of the data stored on the network storage service. The first controller 10 may, after a second process, update the storage copy data 17 in conformity with the adding, updating, or deleting of the data. The storage copy data 17 is the data of the copy of what is stored on the network storage service as it was made at the previous login.

3. When the First Target is Software 25

The information processing apparatus 1 (first controller 10) identifies a workflow 5 in the active state. The first controller 10 recognizes the display input apparatus 2 (computer) defined in the identified workflow 5. In other words, the first controller 10 recognizes the display input apparatus 2 on which the use of the software 25 is to be monitored. The first controller 10 communicates with the recognized display input apparatus 2 periodically. The first controller 10 monitors whether or not the first process has been performed using the software 25. The first controller 10 may request the display input apparatus 2 to notify when the first process has been performed using the software 25.

When the first process is adding of data, the first controller 10 monitors, using the software 25, whether or not a new file has been generated. When the first process is updating of data, the first controller 10 monitors whether or not a file has been updated by the software 25.

4. When the First Target is an Image Forming Apparatus 3

The information processing apparatus 1 (first controller 10) identifies a workflow 5 in the active state. The first controller 10 recognizes the image forming apparatus 3 defined in the identified workflow 5. In other words, the first controller 10 recognizes the image forming apparatus 3 of which the use is to be monitored. The first controller 10 monitors whether or not the first process has been performed using the image forming apparatus 3.

The image forming apparatus 3 (third controller 30) authenticates a user. Having authenticated the user, the third controller 30 notifies the information processing apparatus (first communication circuit 12) of the authenticated person. The first controller 10 extracts, out of workflows 5 in the active state, a workflow 5 that the user (authenticated person) of the image forming apparatus 3 is keeping in the active state. The information processing apparatus 1 (first controller 10) transmits to the image forming apparatus 3 (third communication circuit 35) the display data of selection images 36. The selection images 36 include, for each of one or more workflows 5 extracted, the name, the creator, an image symbolizing the type, and the status (an active or inactive state).

Based on the received display data, the third controller 30 makes the display panel display the selection image 36. The third controller 30 displays one selection image 36 for each workflow that the authenticated person is keeping in the active state. FIG. 46 shows one example of the display panel 33a displaying selection images 36.

Each selection image 36 includes, with respect to the corresponding workflow 5, the name, the creator, and an image symbolizing the type. By operating a selection image 36, the user can start the execution of a workflow 5. When using the image forming apparatus 3, the authenticated person can operate the selection images 36 of those workflows 5 that he or she has brought into the active state.

When a selection image 36 is operated, the image forming apparatus 3 (third controller 30) makes the third communication circuit 35 notify the information processing apparatus 1 of the name of the workflow 5 included in the operated selection image 36. Notified of the name of the workflow 5, the information processing apparatus 1 (first controller 10) gives the image forming apparatus 3 an instruction to perform the first process. When the first process is scanning, the first controller 10 instructs the image forming apparatus 3 to read a document. When the first process is printing, the first controller 10 gives an instruction to print the image data obtained by reading a document. Based on the received instruction, the third controller 30 makes the image reader 32 read the document. The third controller 30 makes the printing portion 34 print. On completion of the scanning or printing, the third controller 30 notifies the information processing apparatus 1 (first communication circuit 12) of the completion of the process. Thus, the first controller 10 recognizes the fulfilment of the if-condition.

5. When the First Target is a Workflow 5

The information processing apparatus 1 (first controller 10) monitors whether or not the if-condition is met. When the if-condition is met, the first controller 10 makes the second target perform the second process. The first controller 10 can recognize that the workflow 5 has succeeded or failed.

6. On Fulfillment of the If-Condition

The information processing apparatus 1 (first controller 10) has ready the data used in the first process. For example, when the first target is a contact management service, the first controller 10 has ready the data of the added, updated, or deleted contact. When the first target is a network storage service, the first controller 10 has ready the added, updated, deleted, or moved data. When the first target is software 25, the first controller 10 has ready the added or updated file. When the first target is an image forming apparatus 3, the first controller 10 has ready the imaged data obtained by scanning or used in printing. When the first target is a workflow 5, the first controller 10 has ready the data used in the workflow 5.

7. When the Second Target is a Contact Management Service

The information processing apparatus 1 (first controller 10) makes the first communication circuit 12 log in to the contact management service defined in the workflow 5 using the second account information A2 attached to the workflow 5. The first controller 10 extracts, out of the data used in the first process, the part corresponding to a contact. For the purpose of contact extraction, the first controller 10 may perform OCR. When the second process is adding of a contact, the first controller 10 adds the extracted contact. When the second process is updating of a contact, the first controller 10 updates the contact that is identical with the extracted contact. When the second process is deleting of a contact, the first controller 10 deletes the contact that is identical with the extracted contact.

8. When the Second Target is a Network Storage Service

The information processing apparatus 1 (first controller 10) makes the first communication circuit 12 log in to the network storage service defined in the workflow 5 using the second account information A2 attached to the workflow 5. For example, when the second process is adding of data, the first controller 10 stores on the network storage the same data as the data used in the first process. When the first process is updating of data, the first controller 10 overwrites with the data used in the first process the file that contains the same content as the data used in the first process. When the second process is deleting of data, the first controller 10 deletes from the network storage the same data as the data used in the first process. When the second process is moving of data, the first controller 10 moves the same data as the data used in the first process so that it has the same data structure as on the first target.

9. When the Second Target is Software 25

Based on a workflow 5, the information processing apparatus 1 (first controller 10) recognizes the display input apparatus 2 selected to perform the second process on. The first controller 10 makes the first communication circuit 12 transmit to the display input apparatus 2 the content (adding, updating, or deleting) of the second process and the data used in the first process. On receiving adding or updating, the display input apparatus 2 (second controller 20) generates a file using the software 25 selected as the second target. The second controller 20 generates a file that contains the data used in the first process.

When the second process is adding, the second controller 20 makes the second storage medium 21 store the generated file in a non-volatile manner. When the second process is updating, the second controller 20 searches the files stored in the second storage medium 21 for the file that contains the same content as the generated file. The second controller 20 overwrites the found file with the generated file. When the second process is deleting (on receiving deleting), the second controller 20 searches the files stored in the second storage medium 21 for the file containing the same content as the data used in the first process. The second controller 20 deletes the found file.

10. When the Second Target is an Image Forming Apparatus 3

The information processing apparatus 1 (first controller 10) generates print data. For example, the first controller 10 generates print data in which the data used in the first process is represented in a page description language. The first controller 10 makes the first communication circuit 12 transmits the generated print data to the image forming apparatus 3 set as the second target. Based on the received print data, the image forming apparatus 3 (third controller 30) prints. When scanning is set as the second process, on fulfillment of the if-condition, the information processing apparatus 1 (first controller 10) may give the image forming apparatus 3 set as the second target an instruction to start reading a document. On receiving the instruction, the image forming apparatus 3 (third controller 30) makes the image reader 32 read the document.

11. When the Second Target is a Workflow 5.

On fulfillment of the if-condition, the information processing apparatus 1 (first controller 10) starts or stops the operation of the workflow 5 set as the second target.

(How a Registered Workflow is Used)

Figure 47:
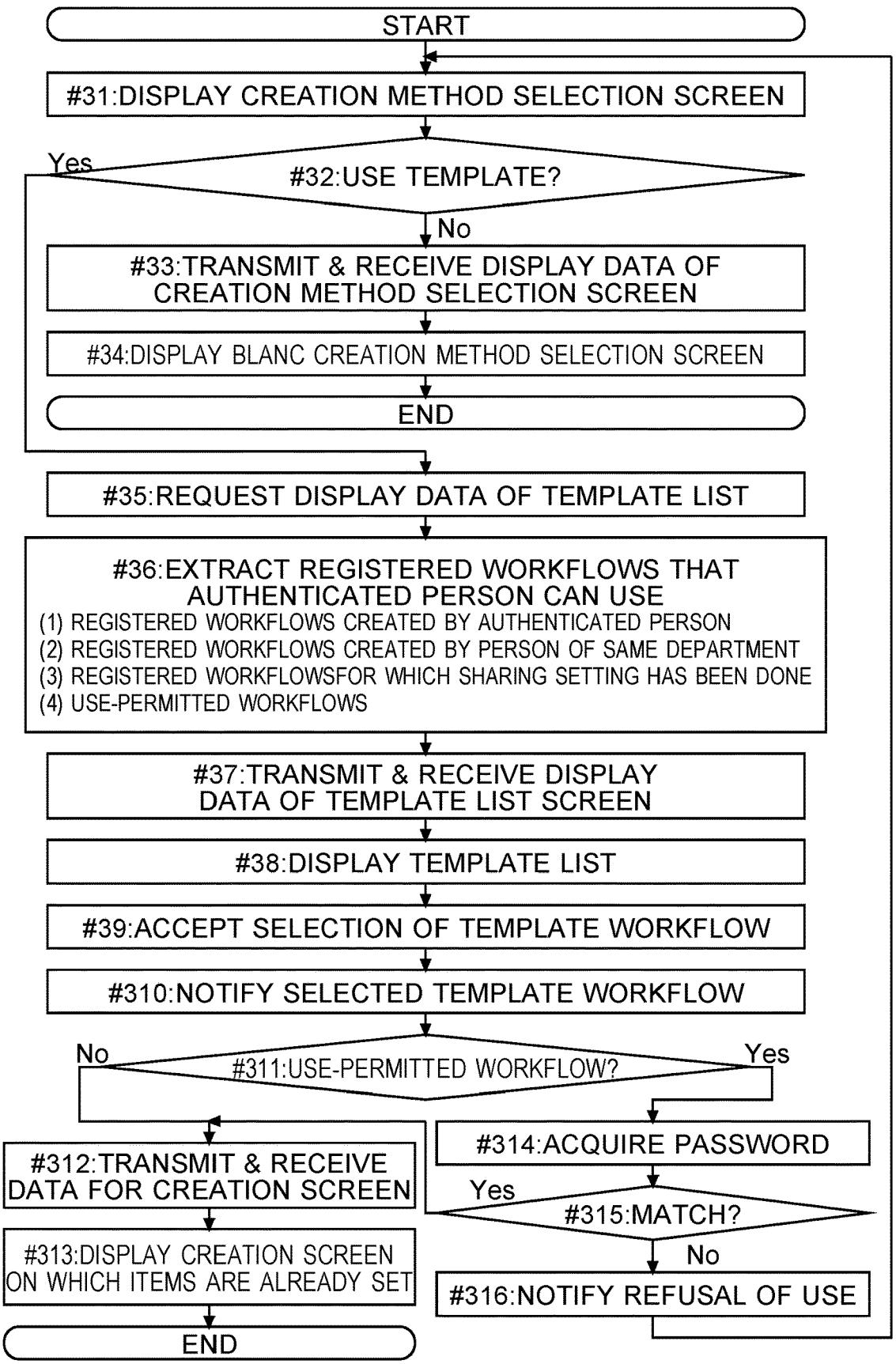
FIG. 47 is a diagram showing one example of use of a registered workflow according to the embodiment.
Figure 48:
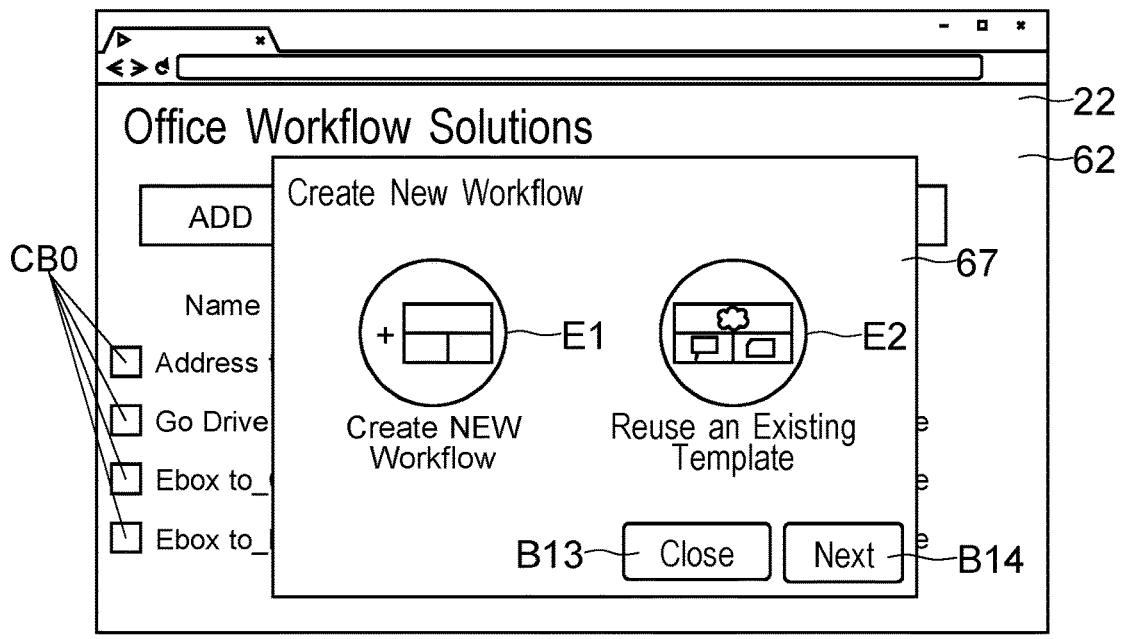
FIG. 48 is a diagram showing one example of a creation method selection screen according to the embodiment.
Figure 49:
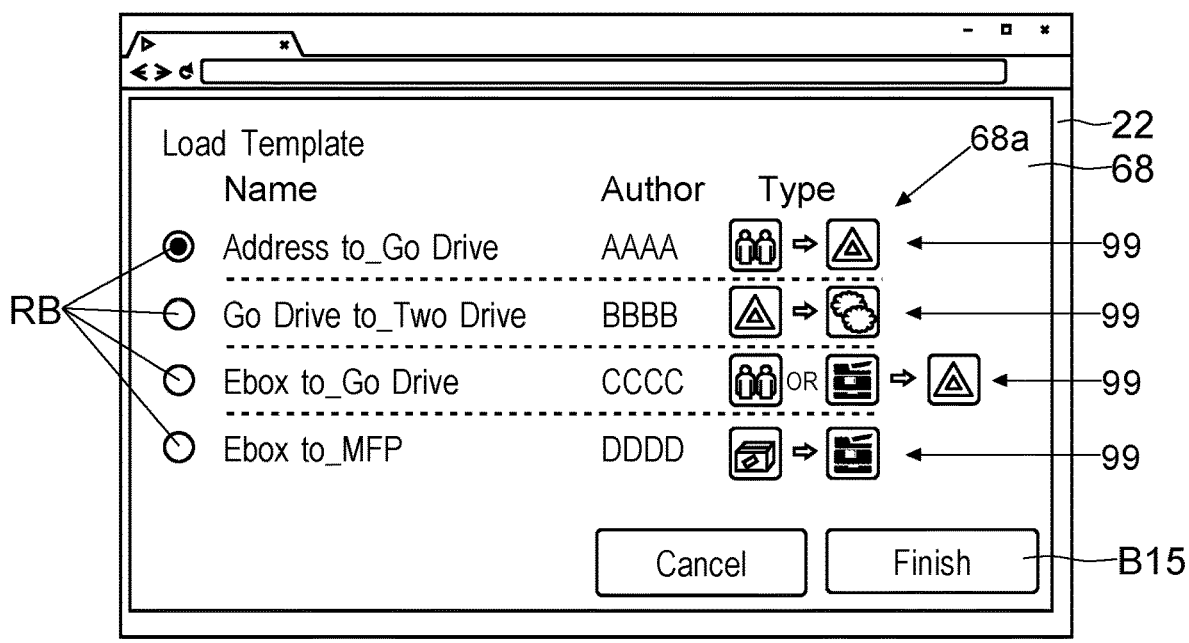
FIG. 49 is a diagram showing one example of a template list according to the embodiment.
Figure 50:
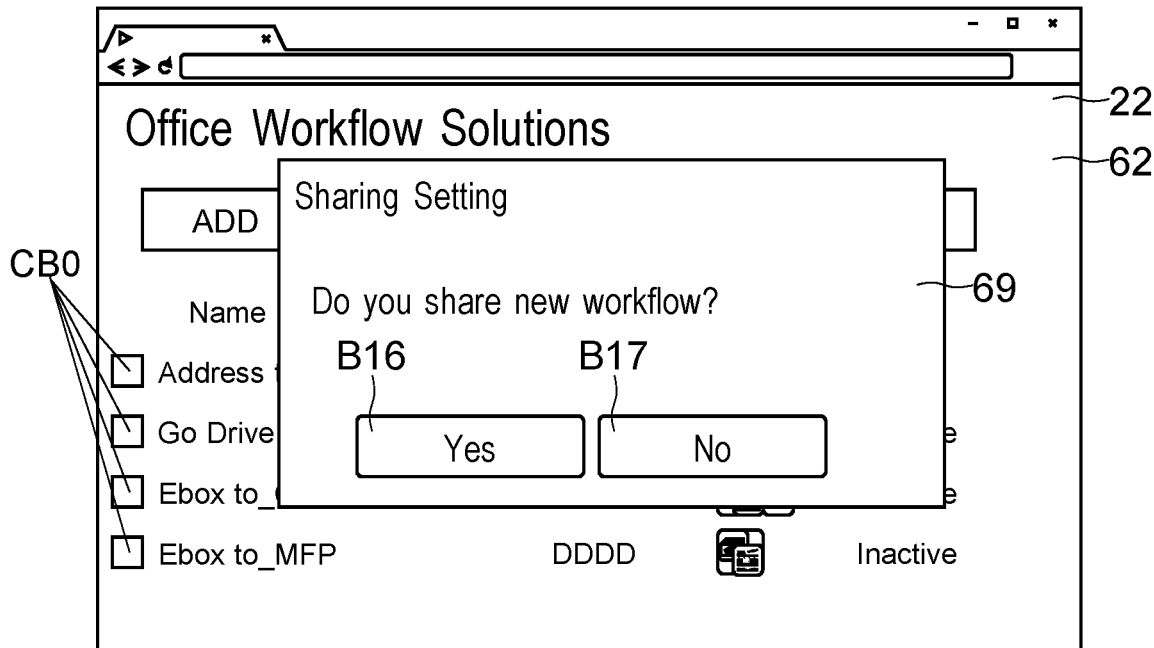
FIG. 50 is a diagram showing one example of a sharing confirmation screen according to the embodiment.
Figure 51:
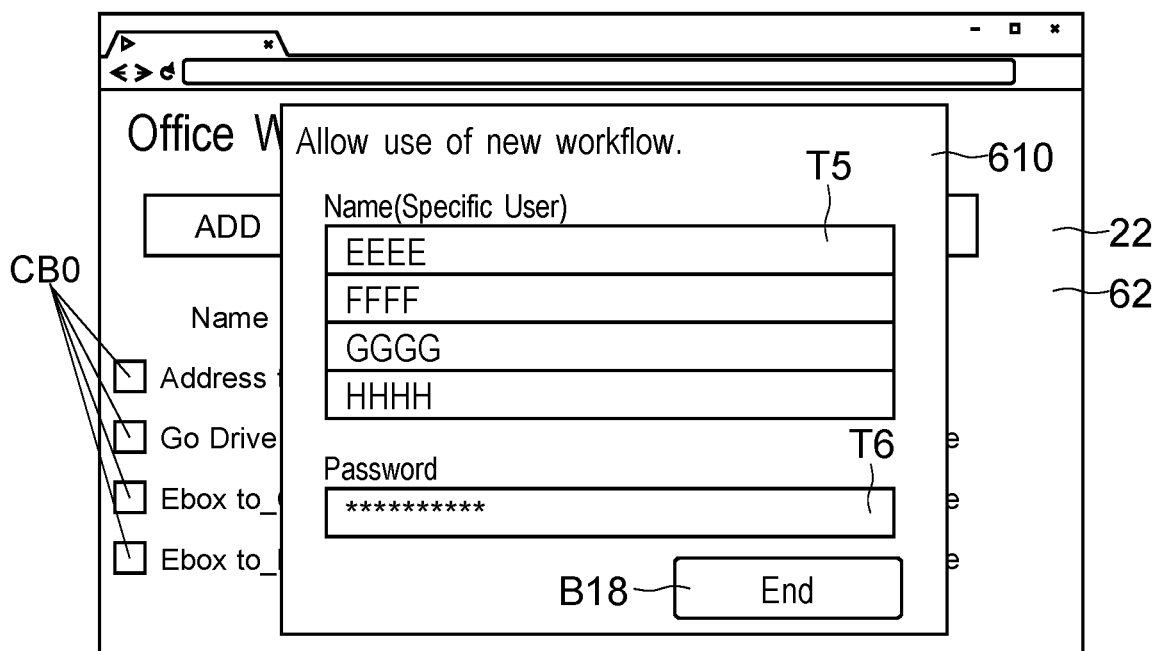
FIG. 51 is a diagram showing one example of a permitted user setting screen according to the embodiment.
Figure 52:
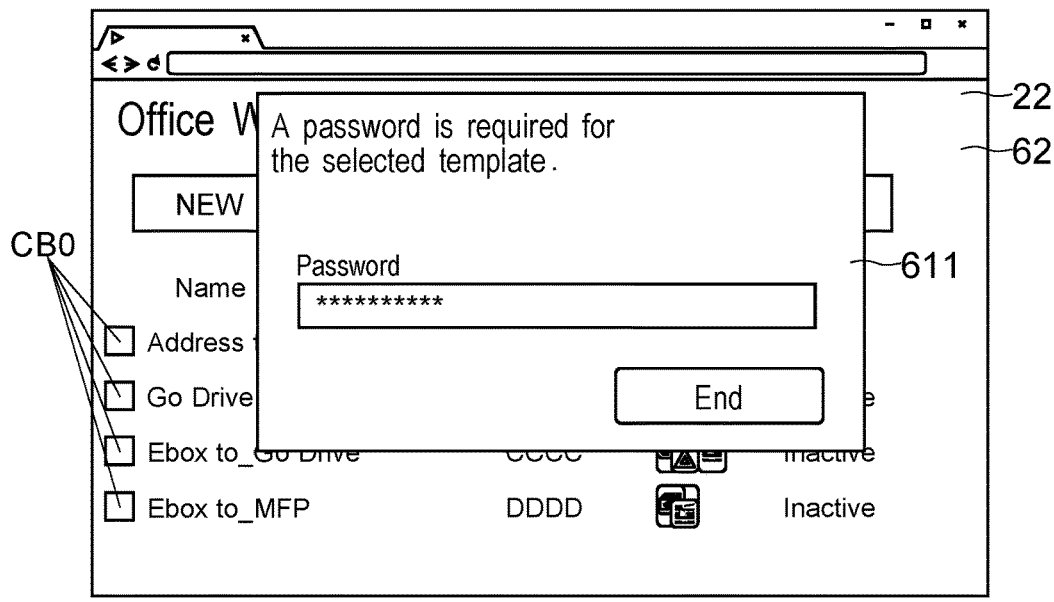
FIG. 52 is a diagram showing one example of a password requesting screen according to the embodiment.

Next, with reference to FIGS. 47 to 52, how a registered workflow 5 is used on the information processing system 100 according to the embodiment will be described. FIG. 47 is a diagram showing one example of use of a registered workflow 5 according to the embodiment. FIG. 48 is a diagram showing one example of a creation method selection screen 67 according to the embodiment. FIG. 49 is a diagram showing one example of a template list screen 68 according to the embodiment. FIG. 50 is a diagram showing one example of a sharing confirmation screen 69 according to the embodiment. FIG. 51 is a diagram showing one example of a permitted user setting screen 610 according to the embodiment. FIG. 52 is a diagram showing one example of a password requesting screen 611 according to the embodiment.

The description of the embodiment given above with reference to FIGS. 10 to 35 deals with an example that starts with the display of a blank creation screen 63. In that case, all items needed to create a workflow 5 need to be set. A configuration is also possible where a registered workflow 5 can be used as a template. That helps simplify the creation of a workflow 5. When a registered workflow 5 is used, the creation of a workflow 5 can be started from a state where the same contents as in the template are set for prescribed items.

The procedure in FIG. 47 starts when the Add button B2 is pressed. First, the display input apparatus 2 (second controller 20) makes the display 22 display a creation method selection screen 67 (step #31). The second controller 20 makes the second communication circuit 24 request the data for displaying the creation method selection screen 67. On receiving the request, the information processing apparatus 1 (first controller 10) makes the first communication circuit 12 transmit the data for displaying the creation method selection screen 67.

FIG. 48 shows one example of the creation method selection screen 67. On the creation method selection screen 67, there are arranged a first selection image E1, a second selection image E2, a Close button B13, and a Next button B14. The first selection image E1 is an image for creation of a new workflow 5. The second selection image E2 is an image for reuse of a registered workflow 5 as a template.

When creating a workflow 5 without using a template, the user operates the first selection image E1. The user then operates the Next button B14. When creating a workflow 5 by using a template, the user operates the second selection image E2. The user then operates the Next button B14.

The display input apparatus 2 (second controller 20) checks whether or not to create a workflow 5 by using a template (step #32). When the first selection image E1 is operated and then the Next button B14 is operated, the second controller 20 judges that no template is used (step #32, No). On judging that no template is used, the second controller 20 makes the second communication circuit 24 request the data for displaying a creation screen 63 from the information processing apparatus 1 (first communication circuit 12). The information processing apparatus 1 (first controller 10) makes the first communication circuit 12 transmit the data for displaying the creation screen 63. The data for displaying the creation screen 63 is transmitted and received (step #33). Based on the data received by the second communication circuit 24. the second controller 20 makes the display 22 display a blank creation screen 63 (step #34). The procedure then ends (END).

When the second selection image E2 is operated and then the Next button B14 is operated, the display input apparatus 2 (second controller 20) judges that a template is used (step #32, Yes). On judging that a template is used, the second controller 20 makes the second communication circuit 24 request the display data of a template list screen 68.

The information processing apparatus 1 (first storage medium 11) stores registered workflows 5. On receiving the request for the display data of the template list screen 68, the information processing apparatus 1 (first controller 10) extracts a registered workflow 5 that an authenticated person can use (step #36). In response to identification information received from the display input apparatus 2, the first controller 10, based on the authentication information C1 it stores, authenticates a person. The person who has logged in is the authenticated person.

The information processing apparatus 1 (first controller 10) makes the first communication circuit 12 transmit the display data of the template list screen 68. The display data of the template list screen 68 is transmitted and received (step #37). The first controller 10 includes, with respect to the extracted workflow 5, the name, the creator, and an image symbolizing the type in the display data of the template list screen 68. Based on the received display data, the display input apparatus 2 (second controller 20) makes the display 22 display the template list screen 68 (step #38). The first controller 10 makes the display input apparatus 2 display a list 68a of the registered workflows 5 that the authenticated person can use.

FIG. 49 is a diagram showing one example of the template list screen 68. The template list screen 68 includes the list 68a of the registered workflows 5 that can be selected as templates and an End button B15. In each row of the list 68a, the information on one registered workflow 5 is itemized. The list 68a includes, for each workflow 5, the name, the creator, and an image symbolizing the type (a decoupled image 99). The display input apparatus 2 (second controller 20) may display a coupled image 90 as an image symbolizing a type. The second controller 20 makes the display 22 display a radio button RB to the left of the name of each registered workflow 5. By selecting a radio button RB and operating the End button B15, it is possible to select a particular registered workflow 5 as a template workflow.

The display input apparatus 2 (input device 23) accepts selection of a registered workflow 5 to be used as a template flow out of the registered workflows 5 (step #39). In step #36, the information processing apparatus 1 (first controller 10) may extract the registered workflows 5 created by the authenticated person. The first controller 10 may include, for each registered workflow 5 created by the authenticated person, the name, the creator, and an image symbolizing the type in the display data of the template list screen 68. This results in the display of a template list screen 68 that includes the registered workflows 5 created by the authenticated person.

The information processing apparatus 1 (first controller 10) stores authentication information C1 in which the departments to which respective users belong are defined. In step #36, the first controller 10 may extract the registered workflows 5 created by users belonging to the same department as the authenticated person. The first controller 10 includes, for each registered workflow 5 created by a user belonging to the same department, the name, the creator, and an image symbolizing the type in the display data of the template list screen 68. This results in the display of a template list screen 68 that includes the registered workflows 5 created by the users belonging to the same department.

In step #36, the information processing apparatus 1 (first controller 10) may extract the registered workflows 5 that are set to be shared. When a workflow 5 is created, the display input apparatus 2 (input device 23) accepts sharing setting for the workflow 5. For example, when the Save button B7 is operated, the display input apparatus 2 (second controller 20) makes the display 22 display a sharing confirmation screen 69. The sharing confirmation screen 69 is a screen for confirmation of whether or not to share a workflow 5. FIG. 50 shows one example of the sharing confirmation screen 69.

The sharing confirmation screen 69 includes a Yes button B16 and a No button B17. By operating those buttons, it is possible to set whether or not to share a workflow 5 with another user. When the Yes button B16 is operated, the display input apparatus 2 (second controller 20) makes the second communication circuit 24 transmit to the information processing apparatus 1 a notification that sharing setting has been done. The information processing apparatus 1 (first communication circuit 12) receives the notification. On receiving the notification, the information processing apparatus 1 (first controller 10) generates a workflow 5 to which sharing setting information is attached. Based on whether or not sharing setting information is attached, the first controller 10 can determine whether or not sharing setting has been done. The first controller 10 then includes, for each registered workflow 5 set to be shared, the name, the creator, and an image symbolizing the type in the display data of the template list screen 68. This results in the display of a template list screen 68 including the registered workflows 5 that are set to be shared.

In step #36, the information processing apparatus 1 (first controller 10) may extract the registered workflows 5 (use-permitted workflows) of which the authenticated person is among the permitted users. When a workflow 5 is created, the display input apparatus 2 (input device 23) accepts setting of a permitted user of the workflow 5 and his or her password. For example, when the Save button B7 is operated and then, on the sharing confirmation screen 69, the No button B17 is operated, the display input apparatus 2 (second controller 20) makes the display 22 display a permitted user setting screen 610. The permitted user setting screen 610 is a screen for setting a permitted user and a password. FIG. 51 shows one example of the permitted user setting screen 610.

The permitted user setting screen 610 includes a permitted user name entry field T5, a password setting field T6, and an End button B18. Using the input device 23, the creator sets the name of a permitted user. Using the input device 23, the creator also sets a password. The display input apparatus 2 (input device 23) accepts setting of a permitted user and a password.

When the End button B18 is operated, the display input apparatus 2 (second controller 20) makes the second communication circuit 24 transmit to the information processing apparatus 1 the set permitted user and password. The information processing apparatus 1 (first communication circuit 12) receives the notification. When the creator chooses not to set a permitted user and a password, he or she can operate the End button B18 without setting a permitted user and a password. The information processing apparatus 1 (first controller 10) generates a workflow 5 to which information indicating the notified permitted user and password is attached. Based on the information attached to the workflow 5, the first controller 10 can determine whether or not it is a use-permitted workflow. The first controller 10 includes, for each use-permitted flow, the name, the creator, and an image symbolizing the type in the display data of the template list screen 68. This results in the display of a template list screen 68 including user-permitted workflows.

When a template workflow is selected (step #39), the display input apparatus 2 (second controller 20) makes the second communication circuit 24 notify the information processing apparatus 1 (first communication circuit 12) of the selected template workflow (step #310). Notified of the template workflow, the information processing apparatus 1 (first controller 10) checks whether or not the template workflow is a use-permitted workflow (step #311).

When it is not a use-permitted workflow (step #311, No), the information processing apparatus 1 (first controller 10) makes the first communication circuit 12 transmit the display data of the creation screen 63 (step #312). Here, the first controller 10 displays a creation screen 63 on which the same contents as in the template workflow are already set for prescribed items. The prescribed items include a first target, a first process, a second target, and a second process.

Based on the received display data, the display input apparatus 2 (second controller 20) makes the display 22 display a creation screen 63 on which the prescribed items are already set (step #313). Then the procedure ends (END). The second controller 20 displays a creation screen 63 on which the first target, the first process, the second target, and the second process are already set.

On the other hand, the information processing apparatus 1 (first controller 10) does not handle any information set on a trigger setting screen 64 as already set. That is, part of the items related to the first process and the first target are not handled as already set. The information set on the trigger setting screen 64 includes, for example, first account information A1, a display input apparatus 2, an image forming apparatus 3, and a workflow 5 (see FIGS. 28 to 31). A user needs to set needed information by operating a first setting image 71.

Likewise, the information processing apparatus 1 (first controller 10) does not handle any information set on an action setting screen 65 as already set. That is, part of the items related to the second process and the second target are not handled as already set. The information set on the action setting screen 65 includes, for example, second account information A2, a display input apparatus 2, an image forming apparatus 3, and a workflow 5 (see FIGS. 32 to 35). A user needs to set needed information by operating a second setting image 72.

When the template workflow is a use-permitted workflow (step #311, Yes), the information processing apparatus 1 (first controller 10) makes the first communication circuit 12 acquire a password (step #314). Specifically, the first controller 10 makes the first communication circuit 12 transmit to the display input apparatus 2 (second communication circuit 24) the display data of a password requesting screen 611. Based on the received display data, the display input apparatus 2 (second controller 20) makes the display 22 display the password requesting screen 611. FIG. 52 shows one example of the password requesting screen 611. The display input apparatus 2 (input device 23) accepts entry of a password. The display input apparatus 2 (second controller 20) makes the second communication circuit 24 transmit the entered password to the first communication circuit 12.

The information processing apparatus 1 (first controller 10) checks whether or not the acquired password matches the password of the use-permitted workflow (step #315). When they match (step #315, Yes), the first controller 10 judges that the user is authorized to use the use-permitted workflow. The procedure then jumps to step #312.

When the passwords do not match (step #315, No), the information processing apparatus 1 (first controller 10) makes the first communication circuit 12 transmit to the display input apparatus 2 (second communication circuit 24) a notification of refusal of use of the use-permitted workflow. On receiving the notification, the display input apparatus 2 (second controller 20) indicates the refusal of use of the selected use-permitted workflow (step #316). After the indication of the refusal of use of the selected use-permitted workflow, the procedure returns to step #31.

(Processing Based on a Workflow 5 in the Active State)

Figure 53:
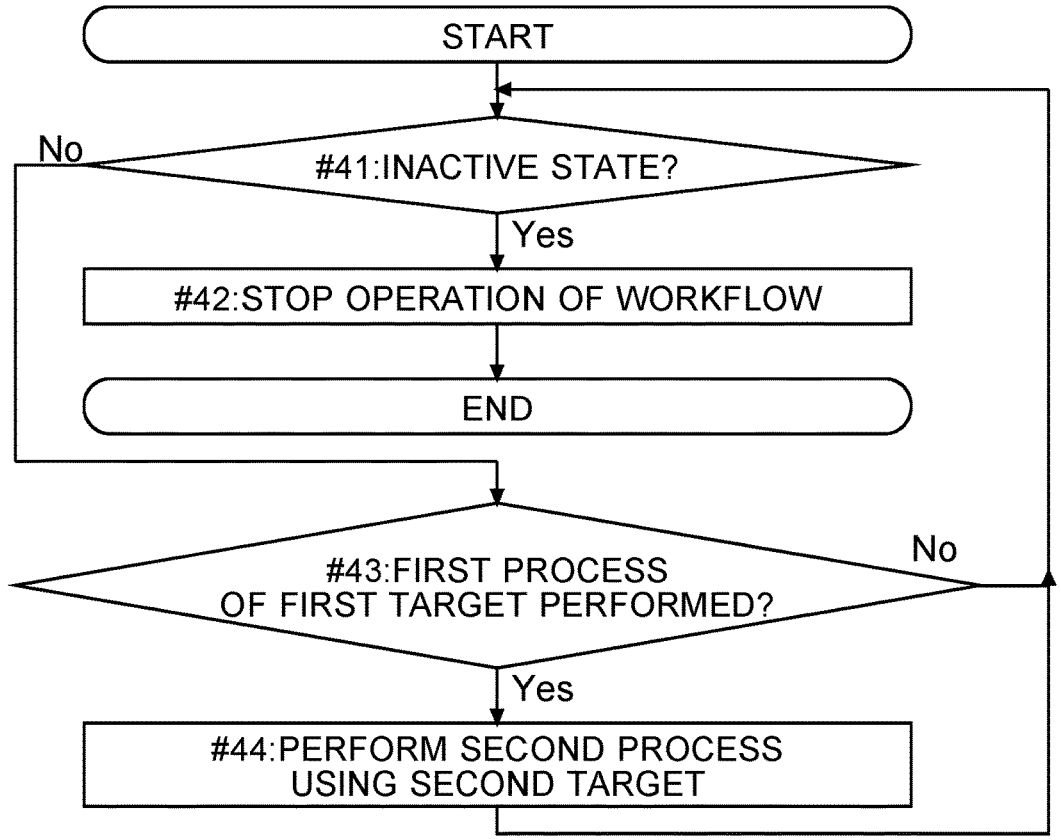
FIG. 53 is a diagram showing one example of a procedure based on a workflow in an active state.

Next, with reference to FIG. 53, one example of a sequence of processing based on a workflow 5 in the active state according to the embodiment will be described. FIG. 53 is a diagram showing one example of a sequence of processing based on a workflow 5 in the active state according to the embodiment.

A user can log in and then, on the top page 62, switch a workflow 5 (registered workflow 5) between the active state and the inactive state. The information processing apparatus 1 (first controller 10) performs processing based on a workflow 5 in the active state. The first controller 10 functions as a workflow executor that controls such that a workflow 5 is executed. The procedure in FIG. 53 starts when a workflow 5 comes into the active state. For each workflow 5 in the active state, the first controller 10 performs the procedure in FIG. 53.

The information processing apparatus 1 (first controller 10) checks whether or not a workflow 5 has gone into the inactive state (step #41). When a workflow 5 goes into the inactive state (step #41, Yes), the first controller 10 stops the execution of the workflow 5 that has brought into the inactive state (step #42). The procedure then ends (END).

When a workflow 5 is in the active state (step #41, No), the first controller 10 monitors whether or not the first process defined in the workflow 5 has been performed using the first target defined in the workflow 5 (step #43).

When the first process defined in the workflow 5 has not been performed using the first target defined in the workflow 5 (step #43, No), the procedure returns to step #41. When the first process defined in the workflow 5 has been performed using the first target defined in the workflow 5, the first controller 10 performs the second process on the second target, or makes the second target perform the second process (step #44). The procedure then returns to step #41.

First Modified Example

Figure 54:
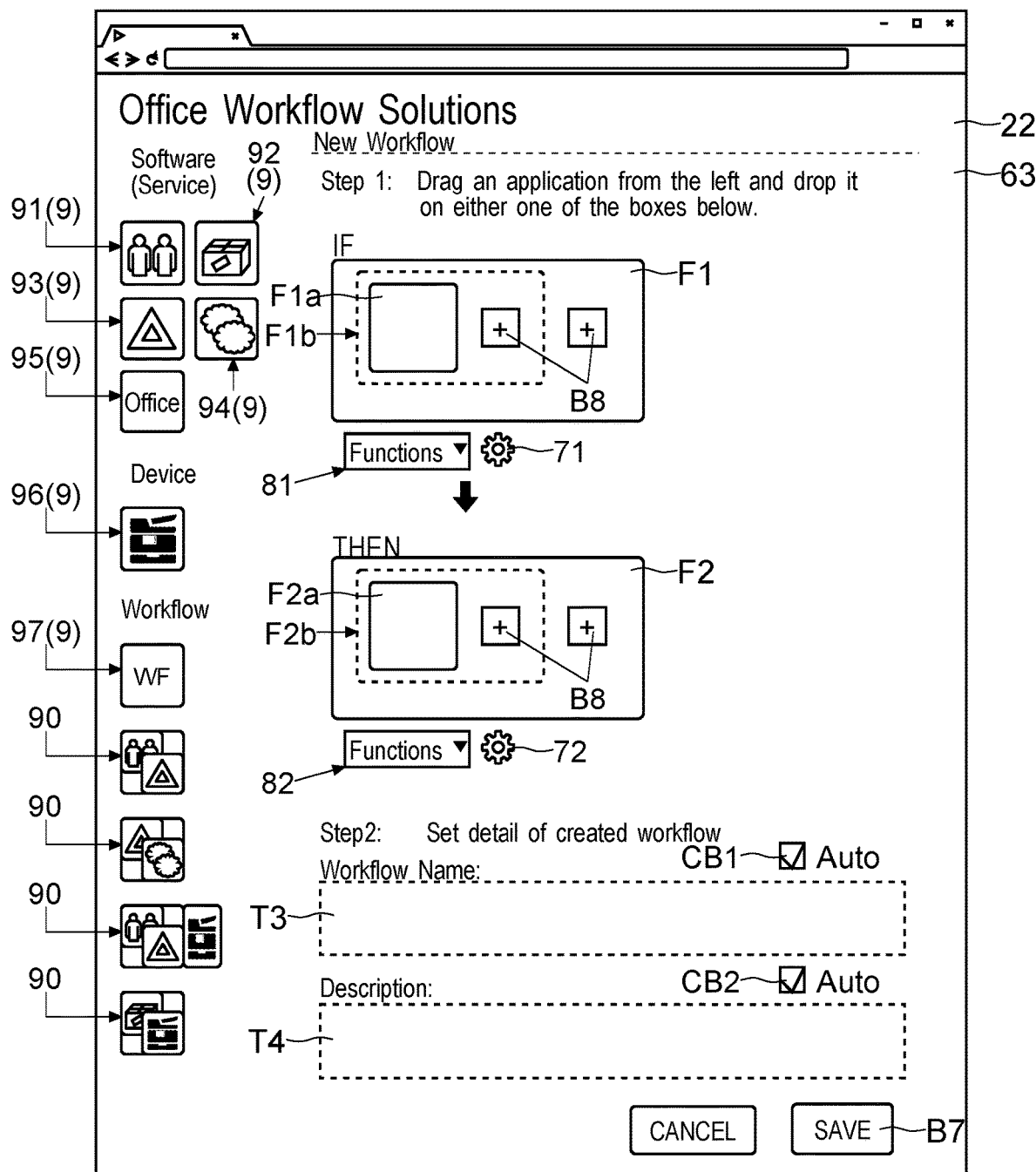
FIG. 54 is a diagram showing one example of a first modified example.

Next, with reference to FIG. 54, a first modified example will be described. FIG. 54 is a diagram showing one example of the first modified example.

The above description deals with an example where, as an icon image for selection of a workflow 5 on the creation screen 63, an icon image 9 that includes the letters "WF" is used. In the example described, when an icon image 9 including the letters "WF" is set as a first target area, a workflow 5 is selected on the trigger setting screen 64. In the example described, when an icon image 9 including the letters "WF" is set as a second target area, a workflow 5 is selected on the action setting screen 65.

In addition to an icon image 9 including the letters "WF", the information processing apparatus 1 (first controller 10) may display within the creation screen 63 the coupled image 90 of a registered workflow 5. When the first setting operation for a coupled image 90 is performed, the display input apparatus 2 (second controller 20) recognizes that the workflow 5 corresponding to the operated coupled image 90 is set as the first target. That is, an operation of dragging and dropping the coupled image 90 into a first target setting area F1*a* is handled as an operation of setting the corresponding workflow 5 as the first target.

On the other hand, when the second setting operation for a coupled image 90 is performed, the display input apparatus 2 (second controller 20) recognizes that the workflow 5 corresponding to the operated coupled image 90 is set as the second target. That is, an operation of dragging and dropping of the coupled image 90 into a second target setting area F2*a* is handled as an operation of setting the corresponding workflow 5 as the second target.

Second Modified Example

Next, with reference to FIG. 55, a second modified example will be described. FIG. 55 is a diagram showing one example of the second modified example.

The above description deals with an example where the information processing apparatus 1 generates a workflow 5. In the described example, the workflow 5 generated by the information processing apparatus 1 is stored. In the described example, the information processing apparatus 1 monitors whether or not the if-condition of a workflow 5 in the active state is met. In the described example, the information processing apparatus 1 makes the second target perform the second process.

The apparatus that generates workflows 5 may be separate from the information processing apparatus 1. For example, the information processing system 100 may include, separately from the information processing apparatus 1, a web server 4 (second information processing apparatus 1). In that case, the web server 4 is communicably connected to the information processing apparatus 1 and the display input apparatus 2. The web server 4 includes a server controller 40 and a server storage medium 41. On the web server 4 (server storage medium 41), a workflow management software 15 is installed. The web server 4 communicates with the display input apparatus 2. The web server 4 (server controller 40) provides a service for creating, editing, deleting, and managing the operation of a workflow 5.

For example, the web server 4 authenticates a user. The web server 4 makes the display input apparatus 2 display a top page 62 and a creation screen 63. The web server 4 generates a workflow 5. The web server 4 transmits the generated workflow 5 to the information processing apparatus 1. The information processing apparatus 1 stores the received workflow 5 in a in a non-volatile manner. The information processing apparatus 1 monitors whether or not the if-condition in the workflow 5 is met. The information processing apparatus 1 also makes a second target perform a second process.

As described above, according to one embodiment, an information processing system 100 includes a display input apparatus 2 and an information processing apparatus 1 communicating with the display input apparatus 2. The display input apparatus 2 accepts setting of a first target, a first process, a second target, and a second process. The display input apparatus 2 notifies the information processing apparatus 1 of the first target, the first process, the second target, and the second process that are set. The information processing apparatus 1 generates a workflow 5 which is a program for performing, when the condition that the notified first process has been performed using the notified first target is met, the notified second process using the notified second target on the data on which the notified first process has been performed. The information processing apparatus 1 stores the generated workflow 5 at a prescribed storage location in a non-volatile manner.

Simply by setting the first target, the first process, the second target, and the second process, it is possible to create a workflow 5 (program) that, when the first process using the first target has been performed, performs the second process using the second target. It is possible to easily create a workflow 5 in which an if-condition is set and that, when the if-condition is met, performs a predetermined process. The creator does not need to have expertise on the first target, the first process, the second target, and the second process. Nor does the creator need to have expertise on program development. Even without expertise on devices, software 25, services, and programming, it is possible to easily create a workflow 5 that coordinates those targets.

Simply by performing, of a series of tasks (tasks with a set sequence) involving a plurality of processes, the first process, it is possible to automatically perform the process (task) subsequent to the first process. The person in charge does not need to perform all the tasks involved in work one by one. This reduces the burden on the person in charge. It is possible to achieve increased processing efficiency. It is possible to achieve increased productivity at offices.

The first and second targets are each one of software 25, a service, and an image forming apparatus 3. The display input apparatus 2 accepts setting of software 25, a service, or an image forming apparatus 3 different from the first target as the second target. The information processing apparatus 1 generates a workflow 5 for performing, when the condition that the notified first process has been performed using the notified first target is met, the notified second process using the notified second target on the data used in the first process using the first target. Even when the first and second targets are different, it is possible to easily create a workflow 5 in which the second process is performed after the first process. For example, conventionally, in a case where, after a given process is performed, a subsequent process is performed using software 25 or hardware different from that for the given process, the person in charge needs to perform one by one. According to the present invention, it is possible to easily create a workflow 5 in which, after a process by given software 25, a process by other software 25 is automatically started. It is possible to easily create a workflow 5 that coordinates different targets despite differences among software 25, services, and devices.

When a display request for a creation screen 63 for a workflow 5 is received from the display input apparatus 2, the information processing apparatus 1 transmits data for displaying the creation screen 63 to the display input apparatus 2. The information processing apparatus 1 makes the display input apparatus 2 display the creation screen 63. The display input apparatus 2 notifies the information processing apparatus 1 of the first target, the first process, the second target, and the second process that are set on the creation screen 63. The user can, through entry on the creation screen 63, set the first target, the first process, the second target, and the second process. On the creation screen 63, it is possible to set the first target, the first process, the second target, and the second process intuitively and easily.

The information processing apparatus 1 makes the display input apparatus 2 display within the creation screen 63 an icon image 9 for selection of a usable processing target which is a target used for a process. The display input apparatus 2 accepts a prescribed first setting operation on the icon image 9 as an operation for setting the usable processing target corresponding to the icon image 9 as the first target. The display input apparatus 2 accepts a prescribed second setting operation on the icon image 9 as an operation for setting the usable processing target corresponding to the icon image 9 as the second target. Simply by operating the icon image 9, it is possible to set the first and second targets.

The information processing apparatus 1 makes the display input apparatus 2 display an If area F1 within the creation screen 63. The first setting operation is an operation of dragging and dropping the icon image 9 into the If area F1. The first setting operation is an operation of moving the icon image 9 into the If area F1. It is possible to set the first target easily.

The information processing apparatus 1 makes the display input apparatus 2 display a Then area F2 within the creation screen 63. The second setting operation is an operation of dragging and dropping the icon image 9 into the Then area F2. The second setting operation is an operation of moving the icon image 9 into the hen area F2. It is possible to set the second target easily.

The information processing apparatus 1 makes the display input apparatus 2 display within the creation screen 63 a first selection field 81 for selection of the first process. The information processing apparatus 1 makes the display input apparatus 2 display within the creation screen 63 a second selection field 82 for selection of the second process. The display input apparatus 2 accepts the process selected in the first selection field 81 as the first process. The display input apparatus 2 accepts the process selected in the second selection field 82 as the second process. Simply by selecting items in the selection fields, it is possible to set the first and second processes. It is possible to set the first and second processes intuitively and easily.

When software 25 or a service is set as the first target and the first selection field 81 is operated, the display input apparatus 2 displays one or more of adding, updating, deleting, and moving of data as a candidate for the first process. When software 25 or a service is set as the second target and the second selection field 82 is operated, the display input apparatus 2 displays one or more of adding, updating, deleting, and moving of data as a candidate for the second process. As each process, it is possible to select adding, deleting, or moving of data by the software 25, the service, or the image forming apparatus 3. It is possible to create a workflow 5 related to data processing.

The display input apparatus 2 accepts setting of a service as the first target. The display input apparatus 2 accepts setting of first account information A1. The display input apparatus 2 transmits the set first account information A1 to the information processing apparatus 1. The information processing apparatus 1 generates a workflow 5 including the received first account information A1. The first account information A1 is information for logging in to the service when monitoring whether the first process has been performed using the service. It is possible to set the account information needed to use the service that is set as the first target. It is possible to include in the workflow 5 the information needed to confirm that the first process has been performed.

The display input apparatus 2 accepts setting of a service as the second target. The display input apparatus 2 accepts setting of second account information A2. The display input apparatus 2 transmits the set second account information A2 to the information processing apparatus 1. The information processing apparatus 1 generates a workflow 5 including the received second account information A2. The second account information A2 is information for logging in to the service when performing the second process using the service. It is possible to set the account information needed to use the service that is set as the second target. It is possible to include in the workflow 5 the information needed to perform the second process using the second target.

The display input apparatus 2 accepts setting of an image forming apparatus 3 as the first target. The display input apparatus 2 accepts selection of an image forming apparatus 3 to be set as the first target. The display input apparatus 2 notifies the information processing apparatus 1 of first device information D1 indicating the selected image forming apparatus 3. The information processing apparatus 1 generates a workflow 5 including the notified first device information D1. It is possible to set a particular image forming apparatus 3 as the first target. It is possible to generate a workflow 5 in which software 25 or a service is executed in coordination with the first process on the image forming apparatus 3. It is possible to coordinate devices having different hardware and software.

The display input apparatus 2 accepts setting of an image forming apparatus 3 as the second target. The display input apparatus 2 accepts selection of an image forming apparatus 3 to be set as the second target. The display input apparatus 2 notifies the information processing apparatus 1 of second device information D2 indicating the selected image forming apparatus 3. The information processing apparatus 1 generates a workflow 5 including the notified second device information D2. It is possible to set a particular image forming apparatus 3 as the second target. It is possible to generate a workflow 5 that automatically makes, in coordination with the first process using software 25 or a service, the image forming apparatus 3 perform a process. It is possible to coordinate devices having different hardware and software.

The information processing system 100 further includes a workflow executor that performs processing based on a workflow 5. The workflow executor monitors whether the first process defined in the workflow 5 has been performed using the first target defined in the workflow 5. On recognizing that the first process defined in the workflow 5 has been performed using the first target defined in the workflow 5, the workflow executor performs the second process defined in the workflow 5, or controls such that it is performed, using the second target defined in the workflow 5. It is possible to make the workflow 5 function.

The display input apparatus 2 accepts selection of a plurality of first targets. For each selected first target, the display input apparatus 2 accepts setting of a first process. Notified of a plurality of first targets, the information processing apparatus 1 generates a workflow 5 for performing, when the condition that the notified first process has been performed using all or part of the first targets is met, the notified second process using the notified second target. The information processing apparatus 1 stores the workflow 5 at a prescribed storage location in a non-volatile manner.

With this configuration, simply by setting the first targets, the first processes, the second target, and the second process, it is possible to create a workflow 5 (program) that, when the first process is performed by all or part of the first targets, performs the second process. It is possible to easily create an elaborate workflow 5 includes a plurality of first targets and first processes.

The creator does not need to have expertise on first targets, first processes, and program development. Even without expertise on devices, software 25, services, and programming, it is possible to easily create an elaborate workflow 5 in which a plurality of first targets and first processes are defined.

The display input apparatus 2 accepts setting for putting one first target and another first target into an OR relationship. The display input apparatus 2 notifies the information processing apparatus 1 of the plurality of first targets put in an OR relationship. Notified of the plurality of first targets put in an OR relationship, the information processing apparatus 1 generates a workflow 5 that, when the condition that the corresponding first process has been performed with respect to one of the first targets in an OR relationship is met, performs the notified second process, or controls such that it is performed, using the notified second target. It is possible to create a workflow 5 that, when the first process of any one first target out of the plurality of first targets is performed, performs the second process, or controls such that it is performed. It is possible to easily create a complicate, elaborate workflow 5.

The information processing apparatus 1 transmits data for displaying a creation screen 63 to the display input apparatus 2. The information processing apparatus 1 makes the display input apparatus 2 display the creation screen 63. The information processing apparatus 1 includes within the creation screen 63 an icon image 9 for selection of a usable processing target which is a target used for a process, an If area F1, and an addition button (Plus button B8). The information processing apparatus 1 arranges a first target setting area F1a inside the If area F1. When the addition button is operated, the information processing apparatus 1 makes the display input apparatus 2 display a first target setting area F1a additionally. Having displayed a first target setting area F1a additionally, the information processing apparatus 1 makes the display input apparatus 2 display an Or button B9. The display input apparatus 2 accepts as a first target the usable processing target corresponding to the icon image 9 set in the first target setting area F1a. When the Or button B9 is operated, the display input apparatus 2 puts in an OR relationship the first target set in the first target setting area F1a added by the addition button and the first target set in the first target setting area F1a previous to the added first target in order. The user can, through entry on the creation screen 63, set a plurality of first targets intuitively and easily. It is possible to set an Or relationship intuitively and easily.

The display input apparatus 2 accepts setting for putting one first target and another first target into an AND relationship. The display input apparatus 2 notifies the information processing apparatus 1 of the plurality of first targets put in an AND relationship. Notified of the plurality of first targets put in an AND relationship, the information processing apparatus 1 generates a workflow 5 that, when the condition that the corresponding first processes have been performed with respect to all the first targets in an AND relationship is met, performs the notified second process, or controls such that it is performed, using the notified second target. It is possible to create a workflow 5 that, when the first processes of all the first targets are performed, performs the second process, or controls such that it is performed. It is possible to easily create a complicate, elaborate workflow 5.

The information processing apparatus 1 transmits data for displaying a creation screen 63 to the display input apparatus 2. The information processing apparatus 1 makes the display input apparatus 2 display the creation screen 63. The information processing apparatus 1 includes within the creation screen 63 an icon image 9 for selection of a usable processing target which is a target used for a process, an If area F1, and an addition button (Plus button B8). The information processing apparatus 1 makes the display input apparatus 2 display a first target setting area F1a inside the If area F1. When the addition button is operated, the information processing apparatus 1 makes the display input apparatus 2 display a first target setting area F1a additionally. Having displayed a first target setting area F1a additionally, the information processing apparatus 1 makes the display input apparatus 2 display an And button B10. The display input apparatus 2 accepts as a first target the usable processing target corresponding to the icon image 9 set in the first target setting area F1a. When the And button B10 is operated, the display input apparatus 2 puts in an AND relationship the first target set in the first target setting area F1a added by the addition button and the first target set in the first target setting area F1a previous to the added first target in order. The user can, through entry on the creation screen 63, set a plurality of first targets intuitively and easily on the creation screen 63. It is possible to set an And relationship intuitively and easily.

The display input apparatus 2 accepts setting for putting one first target and another first target into an OR relationship. The display input apparatus 2 notifies the information processing apparatus 1 of the plurality of first target put in an OR relationship. The display input apparatus 2 accepts setting for putting one first target and another first target into an AND relationship. The display input apparatus 2 notifies the information processing apparatus 1 of the plurality of first target put in an AND relationship. The information processing apparatus 1 transmit data for displaying a creation screen 63 to the display input apparatus 2. The information processing apparatus 1 makes the display input apparatus 2 display the creation screen 63. The information processing apparatus 1 includes within the creation screen 63 an icon image 9 for selection of a usable processing target which is a target used for a process, an If area F1, and an addition button (Plus button B8). The information processing apparatus 1 makes the display input apparatus 2 display a first target setting area F1a inside the If area F1. When the addition button is operated, the information processing apparatus 1 makes the display input apparatus 2 display a first target setting area F1a additionally. When the addition button is operated, the information processing apparatus 1 makes the display input apparatus 2 display between the first target setting areas F1a a relationship selection button for selection between an OR relationship and an AND relationship. The display input apparatus 2 accepts as a first target the usable processing target corresponding to the icon image 9 set in a first target setting area F1a. When the relationship selection button for an OR relationship is operated, the display input apparatus 2 puts the first targets set in the first target setting areas F1a on opposite sides of the relationship selection button into an OR relationship. When the relationship selection button for an AND relationship is operated, the display input apparatus 2 puts the first targets set in the first target setting areas F1a on opposite sides of the relationship selection button into an AND relationship. The user can, through entry on the creation screen 63, set an OR or AND relationship easily. Simply by operating an relationship selection button, it is possible to set an OR or AND relationship.

The information processing apparatus 1 transmits data for displaying the creation screen 63 to the display input apparatus 2. The information processing apparatus 1 makes the display input apparatus 2 display the creation screen 63. The information processing apparatus 1 includes within the creation screen 63 an icon image 9 for selection of a usable processing target which is a target used for a process, an If area F1, and an addition button (Plus button B8). The information processing apparatus 1 arranges the first target setting area F1a inside the If area F1. When an addition button is operated, the information processing apparatus 1 makes the display input apparatus 2 display an first target setting area F1a additionally. The display input apparatus 2 accepts as a first target the usable processing target corresponding to the icon image 9 set in the first target setting area F1a. When the addition button is operated twice or more, the information processing apparatus 1 makes the display input apparatus 2 display three or more first target setting areas F1a. A plurality of first target setting area F1a can be displayed within the creation screen 63. By setting a first target in each first target setting area F1a, it is possible to set a plurality of first targets easily.

The display input apparatus 2 accepts setting for determining a group of first targets. The plurality of first targets can be classified into groups so that they are in an OR or AND relationship as the user desires.

The information processing apparatus 1 generates the name of a workflow 5 automatically based on a prescribed rule. The information processing apparatus 1 stores the workflow 5 having been assigned the automatically generated name of the workflow 5 at a prescribed storage location in a non-volatile manner. It is possible to automatically assign a workflow 5 a name. The user does not need to think up a name for each workflow 5. The user does not need to enter the characters and symbols that are to be assigned as a name.

The information processing apparatus 1 automatically generates a name of the workflow 5 that includes a plurality of pieces of information on the workflow 5 and that has the plurality of pieces of information connected together with a prescribed symbol. It is possible to automatically assign a workflow 5 a name that suggests what processing will be performed.

The information processing apparatus 1 automatically generates a name of the workflow 5 that includes the name, or an abbreviation of it, of the first target defined in the workflow 5. It is possible to automatically include in the name of the workflow 5 character strings that indicate what is the first target. It is possible to assign a workflow 5 a name that suggests the function of the workflow 5.

The information processing apparatus 1 automatically generates a name of the workflow 5 that includes the name, or an abbreviation thereof, of the second target defined in the workflow 5. It is possible to automatically include in the name of the workflow 5 character strings that indicate what is the second target. It is possible to assign a workflow 5 a name that suggests the function of the workflow 5.

The information processing apparatus 1 automatically generates a name of the workflow 5 that includes the date and time of creation of the workflow 5. It is possible to automatically include in the name of a workflow 5 the date and time of creation of the workflow 5. It is possible to embed in the name of a created workflow 5 a hint that helps recall the content of the workflow 5. Based on the memory at the time of creation, the creator of a workflow 5 can recall the content of the workflow 5.

The display input apparatus 2 accepts entry of identification information for identifying a user. The display input apparatus 2 transmits the entered identification information to the information processing apparatus 1. On receiving the identification information from the display input apparatus 2, the information processing apparatus 1 determines the user corresponding to the identification information based on stored authentication information C1. The information processing apparatus 1 automatically generates a name of the workflow 5 that includes one or both of the name and the ID of the authenticated person who is the determined user. It is possible to automatically include in the name of a workflow 5 the name or the ID of the creator of the workflow 5. It is possible to automatically include in the name of a workflow 5 information on the creator of the workflow 5.

The display input apparatus 2 accepts entry of the name of the workflow 5. The display input apparatus 2 transmits the entered name of the workflow 5. On receiving the name of the workflow 5, the information processing apparatus 1 stores at the storage location the workflow 5 that has been assigned not the automatically generated name of the workflow 5 but the entered name of the workflow 5. It is possible to assign a workflow 5 not an automatically generated name but a name entered by the creator. The user can assign a workflow 5 a name that the user himself has thought up.

When accessed by the display input apparatus 2, the information processing apparatus 1 makes the display input apparatus 2 display a list screen including a list 7 of created workflows 5. The information processing apparatus 1 makes the display input apparatus 2 display, in the list 7, a coupled image 90 as an image representing a workflow 5. The coupled image 90 is an image resulting from combining together a first icon image 9a representing the first target and a second icon image 9b representing the second target. With the coupled image 90, it is possible to indicate what is the first target out of a plurality of first targets. With the coupled image 90, it is possible to indicate what is the second target out of a plurality of second targets. That is, with the coupled image 90, it is possible to indicate the content of the workflow 5.

The information processing apparatus 1 makes the display input apparatus 2 display a coupled image 90 in which the first icon image 9a is arranged to the left of the second icon image 9b. Customarily, the left side is often taken as the head side and the right side as the tail side (for example, the order in which characters are written in horizontal wiring, and the lapse of time in timing charts). It is possible to arrange, in conformity with the order of execution of processes in the workflow 5, the first icon image 9a at left and the second icon image 9b at right. This makes it possible to see intuitively which part of the coupled image 90 is the first icon image 9a and which part is the second icon image 9b.

The information processing apparatus 1 makes the display input apparatus 2 display a coupled image 90 in which the first icon image 9a is arranged above the second icon image 9b. Customarily, the top side is often taken as the head side and the bottom side as the tail side (for example, the order in which characters are written in vertical wiring, and the sequence of operations in flow charts). It is possible to arrange, in conformity with the order of execution of processes in the workflow 5, the first icon image 9a at top and the second icon image 9b at bottom. This makes it possible to see intuitively which part of the coupled image 90 is the first icon image 9a and which part is the second icon image 9b.

The information processing apparatus 1 makes the display input apparatus 2 display a coupled image 90 in which the first and second icon images 9a and 9b overlap with each other. The information processing apparatus 1 makes the display input apparatus 2 display a coupled image 90 in which the first icon image 9a is arranged in a layer lower than the second icon image 9b. It is possible to arrange, in conformity with the order of execution of processes in the workflow 5, the first icon image 9a in the lower layer and the second icon image 9b in the upper layer. This makes it possible to see intuitively which part of the coupled image 90 is the first icon image 9a and which part is the second icon image 9b.

The display input apparatus 2 accepts an operation on the coupled image 90. When the coupled image 90 is operated, the display input apparatus 2 displays a decoupled image 99 instead of the coupled image 90. In displaying the decoupled image 99, the display input apparatus 2 displays, between the first and second icon images 9a and 9b, an arrow pointing from the first icon image 9a to the second icon image 9b. The display input apparatus 2 accepts an operation on the decoupled image 99. When the decoupled image 99 is operated, the display input apparatus 2 displays the coupled image 90 instead of the decoupled image 99. The decoupled image 99 is an image resulting from splitting the coupled image 90 such that the first and second icon images 9a and 9b lie farther away from each other than in the coupled image 90. It is possible to change a coupled image 90 into a decoupled image 99. With an arrow, it is possible to indicate which icon image 9 is the first icon image 9a and which icon image 9 is the second icon image 9b.

The information processing apparatus 1 includes in a list 7 the name and the creator of a created workflow 5. With a list screen including the list 7, it is possible to know the name and the creator of a workflow 5.

The information processing apparatus 1 makes the display input apparatus 2 display an Add button B2 on the list screen. When the Add button B2 is operated, the information processing apparatus 1 makes the display input apparatus 2 display a creation screen 63 for a workflow 5. The display input apparatus 2 accepts, on the creation screen 63, setting of the first target, the first process, the second target, and the second process. By operating the Add button B2 on a top page 62, it is possible to create a new workflow 5. it is possible to easily start to create a workflow 5.

The information processing apparatus 1 makes the display input apparatus 2 display a Delete button B4 on the list screen. The display input apparatus 2 accepts selection of a workflow 5 included in the list 7. When a workflow 5 is selected and then the Delete button B4 is operated, the information processing apparatus 1 deletes the selected workflow 5 from the storage location. By selecting a workflow 5 on the top page 62 and operating the Delete button B4, it is possible to delete the selected workflow 5. It is possible to delete an unnecessary workflow 5.

The display input apparatus 2 accepts selection of a workflow 5 included in the list 7. The display input apparatus 2 accepts switching of the selected workflow 5 into the active state and into the inactive state. The display input apparatus 2 notifies the information processing apparatus 1 of the switching of the selected workflow 5 into the active state or the inactive state. The information processing apparatus 1 runs a workflow 5 switched to the active state. The information processing apparatus 1 stops a workflow 5 switched to the inactive state. The information processing apparatus 1 makes the display input apparatus 2 display whether a workflow 5 included in the list 7 is in the active state or in the inactive state. On the top page 62, it is possible to set whether or not to run a workflow 5. It is possible to run only part of created workflows 5. It is also possible to keep a particular workflow 5 among created workflows 5 from running.

When there is a registered workflow 5 that was generated previously, the display input apparatus 2 accepts setting for using the registered workflow 5 as the first target. The display input apparatus 2 notifies the information processing apparatus 1 of the workflow 5 set as the first target. Notified of the workflow 5 as the first target, the information processing apparatus 1 generates a workflow 5 for performing, when the condition that the notified first process has been performed using the notified first target is met, the notified second process using the notified second target. It is possible to set a particular workflow 5 (registered workflow 5) as the first target. It is possible to generate a workflow 5 that, in coordination with completion of the processing of the workflow 5 as the first target, makes software 25, a service, or the image forming apparatus 3 operate. It is possible to generate, by using a registered workflow 5, a workflow 5 that coordinates different devices and software 25.

The information processing apparatus 1 makes the display input apparatus 2 display within the creation screen 63 an icon image 9 for selection of a workflow 5. When a first setting operation is performed on an icon image 9 (seventh image 97) for selection of a workflow 5, the display input apparatus 2 displays a workflow selection screen for selection of a registered workflow 5. The display input apparatus 2 notifies the information processing apparatus 1 of the registered workflow 5 selected on the workflow selection screen as the first target. Simply by operating an icon image 9 for selection of a workflow 5 and selecting a registered workflow 5, it is possible to set the registered workflow 5 as the first target.

The information processing apparatus 1 makes the display input apparatus 2 display within the creation screen 63 a first selection field 81 for selection of a first target. When a registered workflow 5 is set as the first target, the information processing apparatus 1 makes the display input apparatus 2 display, as candidates for the first target in the first selection field 81, success of the registered workflow 5 and failure of the registered workflow 5. It is possible to generate a workflow 5 that performs, in coordination with completion of processing of the entire registered workflow 5 set as the first target, the second process by the second target, or to generate a workflow 5 that performs, in coordination with failure of processing of the entire registered workflow 5 set as the first target, the second process by the second target.

The display input apparatus 2 accepts setting for using a registered workflow 5 as the second target. The display input apparatus 2 notifies the information processing apparatus 1 of the workflow 5 set as the second target. Notified of the workflow 5 as the second target, the information processing apparatus 1 generates a workflow 5 for performing, when the condition that the notified first process has been performed using the notified first target is met, the notified second process with respect to the notified second target. It is possible to set a particular workflow 5 (registered workflow 5) as the second target. It is possible to generate a workflow 5 that, in coordination with completion of the first process by the first target, runs the registered workflow 5. It is possible to generate, by using a registered workflow 5, a workflow 5 that coordinates different devices and software 25.

The information processing apparatus 1 makes the display input apparatus 2 display within the creation screen 63 an icon image 9 for selection of a workflow 5. When a second setting operation is performed on an icon image 9 for selection of a workflow 5, the display input apparatus 2 displays a workflow selection screen for selection of a registered workflow 5. The display input apparatus 2 notifies the information processing apparatus 1 of the registered workflow 5 selected on the workflow selection screen as the second target. Simply by operating an icon image 9 for selection of a workflow 5 and selecting a registered workflow 5, it is possible to set the registered workflow 5 as the second target.

The information processing apparatus 1 makes the display input apparatus 2 display within the creation screen 63*a* a second selection field 82 for selection of a second target. When a registered workflow 5 is set as the second target, the information processing apparatus 1 makes the display input apparatus 2 display, as candidates for the second target in the second selection field 82, starting of operation of the registered workflow 5 and stopping of operation of the registered workflow 5. It is possible to generate a workflow 5 that, in coordination with completion of processing of the first target, starts operation of the registered workflow 5 (brings it into the active state), or to generate a workflow 5 that, in coordination with completion of processing of the first target, stops operation of the registered workflow 5 (brings it into the inactive state).

As in the first modified example, the information processing apparatus 1 may display a creation screen 63 including a coupled image 90. In that case, when a first setting operation is performed on the coupled image 90, the display input apparatus 2 recognizes as the first target the registered workflow 5 corresponding to the coupled image 90 on which the first setting operation has been performed. The display input apparatus 2 notifies the information processing apparatus 1 of the recognized first target. The coupled image 90 is an image resulting from combining together a first icon image 9*a* and a second icon image 9*b* respectively representing the first and second targets of the registered workflow 5. With the coupled image 90, it is possible to indicate the content of the workflow 5. Simply by operating the coupled image 90, it is possible to set a registered workflow 5 as a first target.

When a second setting operation is performed on the coupled image 90, the display input apparatus 2 may recognize as a second target the registered workflow 5 corresponding to the coupled image 90 on which the second setting operation has been performed. The display input apparatus 2 notifies the information processing apparatus 1 of the recognized second target.

The display input apparatus 2 accepts selection of a plurality of second targets. For each of the selected second targets, the display input apparatus 2 accepts setting of a second process. When notified of a plurality of second targets, the information processing apparatus 1 generates a workflow 5 which is a program for performing, when the condition that the notified first process has been performed using the notified first target is met, the respective second processes of the plurality of notified second targets concurrently or sequentially.

Simply by setting a first target, a first process, a second target, and a second process, it is possible to create a workflow 5 (program) that, when the first process of the first target is performed, performs a plurality of second processes concurrently or sequentially. It is possible the easily create a workflow 5 that, after fulfilment of an If-condition, performs a plurality of second targets and second processes.

The creator does not need to have specialized expertise on second targets and second processes. Nor does the creator need to have expertise on advanced program development to have second processes performed concurrently or sequentially. That is, even without specialized expertise on software 25, services, and programming, it is possible to easily create an elaborate workflow 5 that has a plurality of second targets and second processes performed concurrently or sequentially.

The display input apparatus 2 accepts setting for putting one first target and another second target into a concurrent relationship. The display input apparatus 2 notifies the information processing apparatus 1 of the plurality of second targets put into a concurrent relationship. Notified of the plurality of second targets put in the concurrent relationship, the information processing apparatus 1 generates a workflow 5 for performing, when the condition that the first process of the notified first target has been performed is met, the respective second processes of the second targets in a concurrent relationship. It is possible to create a workflow 5 that, when the first process using the first target has been performed (when an if-condition is fulfilled), makes the plurality of second targets perform their respective second processes concurrently. It is possible to easily create a complicate, elaborate workflow 5.

The information processing apparatus 1 includes within the creation screen 63 an icon image 9 representing a usable processing target which is a target used for a process, a Then area F2, and an addition button (Plus button B8). The information processing apparatus 1 arranges a second target setting field F2*a* inside the Then area F2. When the addition button is operated, the information processing apparatus 1 makes the display input apparatus 2 display a second target setting field F2*a* additionally. Having displayed a second target setting field F2*a* additionally, the information processing apparatus 1 makes the display input apparatus 2 display a With button B11. The display input apparatus 2 accepts as a second target the usable processing target corresponding to the icon image 9 set in the second target setting field F2*a*. When the With button B11 is operated, the display input apparatus 2 puts the second target set in the second target setting field F2*a* added by the addition button and the second target set in the second target setting field F2a previous to the added second target setting field F2a into a concurrent relationship. The user only needs to enter on the creation screen 63. It is possible to set a plurality of second targets intuitively and easily. It is possible to set a concurrent relationship intuitively and easily.

The display input apparatus 2 accepts setting for putting a plurality of second targets into a sequential relationship with respect to the time points of their respective execution. The display input apparatus 2 notifies the information processing apparatus 1 of the plurality of second targets put into a sequential relationship. Notified of the plurality of second targets put in the sequential relationship, the information processing apparatus 1 generates a workflow 5 for performing, when the condition that the notified first process has been performed using the notified first target is met, first the second process of the second target set to operate first is completed and then the second process of the second target set to operate subsequently. It is possible to create a workflow 5 in which, when an if-condition is fulfilled, first a second process is performed using one second target and subsequently another second process is performed using another second target. It is possible to easily create a complicate, elaborate workflow 5.

The information processing apparatus 1 includes within the creation screen 63 an icon image 9 representing a usable processing target which is a target used for a process, a Then area F2, and an addition button (Plus button B8). The information processing apparatus 1 arranges a second target setting field F2a inside the Then area F2. When the addition button is operated, the information processing apparatus 1 makes the display input apparatus 2 display a second target setting field F2a additionally. Having displayed a second target setting field F2a additionally, the information processing apparatus 1 makes the display input apparatus 2 display a Wait button B12. The display input apparatus 2 accepts as a second target the usable processing target corresponding to the icon image 9 set in the second target setting field F2a. When the Wait button B12 is operated, the display input apparatus 2 sets the second target set in the second target setting field F2a previous to the added second target setting field F2a to operate first, and sets the second target set in the second target setting field F2a added by the addition button to operate subsequently. The user only needs to enter on the creation screen 63. It is possible to set a plurality of second targets intuitively and easily. It is possible to set a sequential relationship intuitively and easily.

When the addition button (Plus button B8) is operated, the information processing apparatus 1 makes the display input apparatus 2 display a second target setting field F2a additionally. The display input apparatus 2 accepts as a second target the usable processing target corresponding to the icon image 9 set in the second target setting field F2a. When the addition button is operated twice or more, the information processing apparatus 1 makes the display input apparatus 2 display three or more second target setting fields F2a.

The display input apparatus 2 accepts setting for determining a group of second targets. The plurality of second targets can be classified into groups so that they are in an OR or AND relationship as the user desires.

When there is a registered workflow 5 that was created previously, the display input apparatus 2 accepts selection of a template workflow to be used as a template out of registered workflows 5. The display input apparatus 2 notifies the information processing apparatus 1 of the selected template workflow. Notified of the template workflow, the information processing apparatus 1 makes the display input apparatus 2 display a creation screen 63 for a new workflow 5. For a prescribed item, the information processing apparatus 1 makes the display input apparatus 2 display a creation screen 63 on which the same contents as the template workflow are already set. It is possible to use a registered workflow 5 as a template. It is possible to reduce the amount of work required to create a new workflow 5. It is possible to reduce the burden on the creator. It is possible to easily create a workflow 5 similar to a registered workflow 5.

The prescribed items include a first target, a first process, a second target, and a second process. Thus, in some cases, it is possible to generate a workflow 5 without setting a first target, a first process, a second target, and a second process.

The information processing apparatus 1 extracts, out of registered workflows 5, the workflows 5 that an authenticated person, who is a verified user, can use. The information processing apparatus 1 makes the display input apparatus 2 display a template list screen 68 that includes a list of the extracted workflows 5. The display input apparatus 2 accepts, as an operation for selecting a template workflow, an operation of selecting a registered workflow 5 included on the template list screen 68. It is possible to include only use-permitted registered workflows 5 on the template list screen 68. It is possible to allow selection of only a use-permitted workflow 5 as a template.

The information processing apparatus 1 extracts the workflows 5 created by the authenticated person. It is possible to include on the template list screen 68 the workflows 5 created by the authenticated person. It is possible to allow selection of a workflow 5 created by an authenticated person.

The information processing apparatus 1 stores authentication information C1 in which the departments to which respective users belong are defined. The information processing apparatus 1 extracts the workflows 5 created by users belonging to the same department as the authenticated person. It is possible to include on the template list screen 68 the workflows 5 created by persons belonging to the same department (group) as the authenticated person. It is possible to allow selection, as a template, of a workflow 5 created by a person belonging to the same department.

The display input apparatus 2 accepts setting of a permitted user of a workflow 5. The display input apparatus 2 notifies the information processing apparatus 1 of set permitted users. The information processing apparatus 1 generates a workflow 5 to which information indicating the notified permitted user is attached. On receiving the identification information from the display input apparatus 2, the information processing apparatus 1 extracts, out of registered workflows 5, a use-permitted workflow which is a workflow 5 of which the authenticated person is a permitted user. It is possible to include on the template list screen 68 the workflows 5 of which the use is specially permitted by the creator. It is possible to allow selection, as a template, of a workflow 5 of which the use is specially permitted.

The display input apparatus 2 accepts setting of a password. The display input apparatus 2 transmits the set password to the information processing apparatus 1. The information processing apparatus 1 generates a workflow 5 to which the set password is attached. On being notified of a template workflow, the information processing apparatus 1 checks whether or not the template workflow is a use-permitted workflow. When the template workflow is a use-permitted workflow, the information processing apparatus 1 requests the display input apparatus 2 for a password. On receiving a password from the display input apparatus 2 in response to the request, the information processing apparatus 1 checks whether or not the received password matches the password attached to the use-permitted workflow. If the passwords match, the information processing apparatus 1 makes the display input apparatus 2 display a creation screen 63 on which the first target, the first process, the second target, and the second process are already set. If the passwords do not match, the information processing apparatus 1 transmits to the display input apparatus 2 a notification of refusal of use of the use-permitted workflow. On receiving the notification of refusal of use, the display input apparatus 2 displays refusal of use of the selected use-permitted workflow.

The display input apparatus 2 accepts setting of a permitted user of a workflow 5 and his or her password. The display input apparatus 2 transmits the set permitted user and password to the information processing apparatus 1. The information processing apparatus 1 generates a workflow 5 to which the set permitted user and password are attached. For a registered workflow 5, it is possible to set a permitted user. It is also possible to set a password required when that registered workflow 5 is used as a template.

The display input apparatus 2 accepts sharing setting for sharing a workflow 5. The display input apparatus 2 notifies the information processing apparatus 1 that sharing setting has been done. The information processing apparatus 1 attaches sharing setting information to the workflow 5 for which sharing setting has been done. It extracts workflows 5 to which sharing setting information is attached out of registered workflows 5. It is possible to include on the template list screen 68 workflows 5 set by the creator to be shared (to be usable by any one). It is possible to allow selection of a shared workflow 5 as a template.

The information processing system 100 can be understood as an invention directed to an information processing method and an information processing apparatus 1. An information processing method and an information processing apparatus 1 provide effects similar to those provided by the information processing system 100.

Specifically, an information processing method according to an embodiment includes: accepting setting of a first target, a first process, a second target, and a second process; notifying an information processing apparatus 1 of the first target, the first process, the second target, and the second process that are set; making the information processing apparatus generate a workflow 5 which is a program for performing, when the condition that the notified first process has been performed using the notified first target is met, the notified second process using the notified second target; and storing the generated workflow 5 at a prescribed storage location in a non-volatile manner.

An information processing method includes: accepting a plurality of first targets; for each of the selected first targets, accepting setting of a first process; and, when notified of the plurality of first targets, making an information processing apparatus 1 generate a workflow 5 which is a program for performing, when the condition that the notified first process has been performed using all or part of the notified first targets is met, the notified second process using the notified second target on the data on which the first process has been performed.

An information processing method includes: generating the name of a workflow 5 automatically based on a prescribed rule; and storing the workflow 5 having been assigned the automatically generated name of the workflow 5 at a prescribed storage location in a non-volatile manner.

An information processing method includes: displaying a list screen including a list 7 of created workflows 5; and displaying, in the list 7, a coupled image 90 as an image representing a workflow 5, wherein the coupled image 90 is an image resulting from combining together a first icon image 9a representing a first target and a second icon image 9b representing a second target.

An information processing method includes: when there is a registered workflow 5 that was generated previously, accepting setting for using the registered workflow 5 as a first target; notifying the registered workflow 5 set as the first target; when notified of the registered workflow 5 as the first target, making the information processing apparatus 1 generate a workflow 5 for performing, when the condition that the notified first process has been performed using the notified workflow 5 is met, the notified second process using the notified second target.

An information processing method includes: accepting selection of a plurality of second targets; for each of the selected second targets, accepting setting of a second process; when notified of the plurality of second targets, making an information processing apparatus 1 generate a workflow 5 which is a program for performing, when the condition that the notified first process has been performed using the notified first target, the respective second processes of the notified plurality of second targets concurrently or sequentially.

An information processing method includes: when there is a registered workflow 5 which is a workflow 5 that was generated previously, accepting selection of a template workflow to be used as a template out of registered workflows 5; notifying an information processing apparatus 1 of the selected template workflow; when notified of the template workflow, displaying a creation screen 63 for a new workflow 5; and displaying a creation screen 63 on which the first target, the first process, the second target, and the second process of the template workflow are already set.

An information processing apparatus 1 according to an embodiment includes: a communication portion (first communication circuit 12) and a controller (first controller 10). The communication portion communicates with a display input apparatus 2. The controller generates a workflow 5. When the communication portion receives a notification of a first target, a first process, a second target, and a second process that are set on the display input apparatus 2, the controller generates a workflow 5 which is a program for performing, when the condition that the notified first process has been performed using the notified first target is met, the notified second process using the notified second target. The controller stores the generated workflow 5 at a prescribed storage location (first storage medium 11) in a non-volatile manner.

When notified of a plurality of first targets, the controller generates a workflow 5 which is a program for performing, when the condition that the notified first process has been performed using all or part of the notified first targets is met, the notified second process using the notified second target on the data on which the first process has been performed.

The controller generates the name of the workflow 5 automatically based on a prescribed rule. The controller stores the workflow 5 having been assigned the automatically generated name of the workflow 5 at a prescribed storage location in a non-volatile manner.

The controller makes the display input apparatus 2 display, in the list 7, a coupled image 90 as an image representing the workflow 5. The coupled image 90 is an image resulting from combining together a first icon image 9a representing the first target and a second icon image 9b representing the second target.

When there is a registered workflow 5 that was generated previously and the information processing apparatus 1 is notified of the registered workflow 5 as the first target, the controller generates a workflow 5 for performing, when the condition that the notified first process has been performed using the notified workflow 5 is met, the notified second process using the notified second target.

When notified of a plurality of second targets, the controller generates a workflow 5 which is a program for performing, when the condition that the notified first process has been performed using the notified first target, the respective second processes of the notified plurality of second targets concurrently or sequentially.

The controller generates a workflow 5 which is a program for performing, when the condition that the notified first process has been performed using the notified first target is met, the notified second process using the notified second target with respect to the data on which the notified first process has been performed. The controller stores the generated workflow 5 at a prescribed storage location in a non-volatile manner. When there is a registered workflow 5 that was generated previously and in addition the communication portion is notified of a template workflow which is a workflow 5 selected as a template out of registered workflows 5, the controller makes the display input apparatus 2 display a creation screen 63 for a new workflow 5. The control unit makes the display input apparatus 2 display a creation screen 63 for a workflow 5 in which the first target, the first process, the second target, and the second process of the template workflow are already set.

The embodiments by way of which the present invention has been described above are in no way meant to limit the scope of the invention, and can be implemented with any modifications made within the spirit of the present invention.

INDUSTRIAL APPLICABILITY

The present invention finds applications in information processing systems that include an information processing apparatus and an display input apparatus.

The invention claimed is:

1. An information processing system comprising an information processing apparatus and a display input apparatus communicating with the information processing apparatus, wherein
the display input apparatus
accepts setting of a first target, a first process, a second target, and a second process and
notifies the information processing apparatus of the first target, the first process, the second target, and the second process that are set,
the information processing apparatus
generates a workflow which is a program for performing, when a condition that the notified first process has been performed using the notified first target is met, the notified second process using the notified second target,
stores the generated workflow at a prescribed storage location in a non-volatile manner,
monitors whether or not an if-condition that the first process defined in the workflow has been performed using the first target defined in the workflow is met, and
when the if-condition is met, performs the second process defined in the workflow using the second target defined in the workflow.

2. The information processing system according to claim 1, wherein
the first and second targets are each one of software, a service, and an image forming apparatus,
the display input apparatus accepts setting of software, a service, or an image forming apparatus different from the first target as the second target,
the information processing apparatus generates the workflow for performing, when the if-condition that the notified first process has been performed using the notified first target is met, the notified second process using the notified second target on data used in the first process using, the first target.

3. The information processing system according to claim 1, wherein
when a display request for a creation screen for the workflow is received from the display input apparatus,
the information processing apparatus
transmits data for displaying the creation screen to the display input apparatus and
makes the display input apparatus display the creation screen,
the display input apparatus
notifies the information processing apparatus of the first target, the first process, the second target, and the second process that are set on the creation screen and
makes the display input apparatus display an If area, a first selection field, a Then area, and a second selection field within the creation screen,
the If area being an area for setting the first target,
the first selection field being for selecting the first process,
the Then area being an area for setting the second target,
the second selection field being for selecting the second process, and
the display input apparatus notifies the information processing apparatus of the first target, the first process, the second target, and the second process that are set on the creation screen.

4. The information processing system according to claim 3, wherein
the information processing apparatus makes the display input apparatus display on the creation screen an icon image for selection of a usable processing target which is a target used for a process, and
the display input apparatus
accepts a prescribed first setting operation on the icon image as an operation for setting the usable processing target corresponding to the icon image as the first target and
accepts a prescribed second setting operation on the icon image as an operation for setting the usable processing target corresponding to the icon image as the second target.

5. The information processing system according to claim 4, wherein
the first setting operation is an operation of dragging and dropping the icon image into the If area.

6. The information processing system according to claim 4, wherein
the second setting operation is an operation of dragging and dropping the icon image into the Then area.

7. The information processing system according to claim 3, wherein
the display input apparatus accepts a process selected in the first selection field as the first process and accepts a process selected in the second selection field as the second process.

8. The information processing system according to claim 7, wherein the display input apparatus, when software or a service is set as the first target and the first selection field is operated, displays one or more of adding, updating, deleting, and moving of data as a candidate for the first process and, when software or a service is set as the second target and the second selection field is operated, displays one or more of adding, updating, deleting, and moving of data as a candidate for the second process.

9. The information processing system according to claim 1, wherein the display input apparatus accepts setting of a service as the first target, accepts setting of first account information, and transmits the set first account information to the information processing apparatus, the information processing apparatus generates the workflow including the received first account information, and the first account information is information for logging in to the service when monitoring whether the first process has been performed using the service.

10. The information processing system according to claim 1, wherein the display input apparatus accepts setting of a service as the second target, accepts setting of second account information, and transmits the set second account information to the information processing apparatus, the information processing apparatus generates the workflow including the received second account information, and the second account information is information for logging in to the service when performing the second process using the service.

11. The information processing system according to claim 1, wherein the display input apparatus accepts setting of an image forming apparatus as the first target, accepts selection of the image forming apparatus to be set as the first target, notifies the information processing apparatus of first device information indicating the selected image forming apparatus, and the information processing apparatus generates the workflow including the notified first device information.

12. The information processing system according to claim 1, wherein the display input apparatus accepts setting of an image forming apparatus as the second target, accepts selection of the image forming apparatus to be set as the second target, notifies the information processing apparatus of second device information indicating the selected image forming apparatus, and the information processing apparatus generates the workflow including the notified second device information.

13. The information processing system according to 1, further comprising a workflow executor that performs processes based on the workflow, wherein the workflow executor monitors whether the first process defined in the workflow has been performed using the first target defined in the workflow, and, on recognizing that the first process defined in the workflow has been performed using the first target defined in the workflow, performs the second process defined in the workflow, or controls such that the second process defined in the workflow is performed, using the second target defined in the workflow.

14. An information processing method comprising:

accepting setting of a first target, a first process, a second target, and a second process;

notifying an information processing apparatus of the first target, the first process, the second target, and the second process that are set;

making the information processing apparatus generate a workflow which is a program for performing, when a condition that the notified first process has been performed using the notified first target is met, the notified second process using the notified second target;

storing the generated workflow at a prescribed storage location in a non-volatile manner, monitoring whether or not an if-condition that the first process defined in the workflow has been performed using the first target defined in the workflow is met, and when the if-condition is met, performing the second process defined in the workflow using the second target defined in the workflow.

15. An information processing apparatus comprising:

a communication portion that communicates with a display input apparatus; and a controller that generates a workflow, wherein the controller, when the communication portion receives a notification of a first target, a first process, a second target, and a second process that are set on the display input apparatus, generates a workflow which is a program for performing, when a condition that the notified first process has been performed using the notified first target is met, the notified second process using the notified second target, stores the generated workflow at a prescribed storage location in a non-volatile manner, monitors whether or not an if-condition that the first process defined in the workflow has been performed using the first target defined in the workflow is met, and, when the if-condition is met, performs the second process defined in the workflow using the second target defined in the workflow.

* * * * *